(12) United States Patent
Maeda et al.

(10) Patent No.: US 6,262,961 B1
(45) Date of Patent: Jul. 17, 2001

(54) DISK LOADING DEVICE AND DISK CARTRIDGE

(75) Inventors: Shinichi Maeda; Akira Kurozuka; Yasuhisa Fukushima; Kozo Ezawa, all of Osaka; Makoto Fujita, Nara; Yoshiaki Nakatsuka; Yoshiyuki Hashimoto, both of Osaka, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/193,124

(22) Filed: Nov. 17, 1998

(30) Foreign Application Priority Data

Nov. 18, 1997 (JP) .................................................. 9-316786
Nov. 20, 1997 (JP) .................................................. 9-319348
Apr. 13, 1998 (JP) ................................................. 10-100773

(51) Int. Cl.$^7$ ............................ G11B 17/03; G11B 17/04
(52) U.S. Cl. ........................................ 369/77.2; 369/75.2
(58) Field of Search ................................. 369/75.1, 75.2, 369/77.1, 77.2

(56) References Cited

U.S. PATENT DOCUMENTS

| | | | | |
|---|---|---|---|---|
| 5,533,000 | * | 7/1996 | Koizumi ................................ | 369/270 |
| 5,572,498 | * | 11/1996 | Choi ...................................... | 369/77.2 |
| 5,590,113 | * | 12/1996 | Choi ...................................... | 369/77.2 |
| 5,724,332 | * | 3/1998 | Ogusu .................................... | 369/77.2 |
| 5,737,293 | * | 4/1998 | Kawamura et al. ................... | 369/77.1 |
| 5,768,240 | * | 6/1998 | Hiraga ................................... | 369/75.2 |
| 5,812,511 | * | 9/1998 | Kawamura et al. ................... | 369/77.2 |
| 5,867,338 | * | 2/1999 | Ohira et al. .......................... | 369/75.2 |
| 5,933,400 | * | 8/1999 | Kabasawa ............................. | 369/77.2 |
| 6,009,062 | * | 12/1999 | Nishimoto et al. ................... | 369/77.2 |

FOREIGN PATENT DOCUMENTS 63-201950 * 8/1988 (JP) .
64-33762 * 2/1989 (JP) .
5-303816 * 11/1993 (JP) .

* cited by examiner

Primary Examiner—David L. Ometz
(74) Attorney, Agent, or Firm—Wenderoth, Lind & Ponack, L.L.P.

(57) ABSTRACT

To present a disk loading device reduced in the thickness of the entire device, capable of loading plural types of cartridge and bare disk commonly, easy to handle in horizontal or vertical position, and particularly excellent in dust-proof performance or manual insertion and discharge performance of tray in power off state, a holder 100 moved back and forth by transfer means provided inside includes a detecting switch 114 of a shutter opener 103 and a detecting switch 115 of a disk holder 104, and these two detecting switches are combined, while a dust-proof member such as dust-proof cover 42 is provided in a passage to the disk and optical head 7 in an external air stream in the device, and therefore, immediately after putting the media into the holder 100, the type and state of the media can be detected, and breakage of device due to insertion of plural types of cartridge in wrong direction or wrong side can be prevented, and also contamination of the disk or optical head 7 by suction of dust or smoke can be also prevented. Moreover, the worm gear provided in a drive gear train 112 of the holder 100 is designed to exclude the axial force in the opposite direction of the loading motor 111, and meshing with the wheel 112 can be freely cleared, and therefore the loaded media can be easily discharged and taken out in power off state.

11 Claims, 51 Drawing Sheets

FIG. 11

| XCTL | XOP | Type of media | State of media | Loading action |
|---|---|---|---|---|
| 0 | 0 | Bare disk | Bare disk remains put in holder | Stop |
| | | No media | ----- | |
| 0 → 1 → 0 | 0 | Bare disk | Bare disk is put in holder | Stop |
| 0 → 1 → 0 | 0 → 1 → 0 | Bare disk | Bare disk is put in holder | Holder loading action starts |
| 0 → 1 | 0 | Bare disk | Bare disk is being put in holder | Prohibit |
| | | Cartridge | Cartridge is being put in holder | |
| | | | Cartridge is inserted in holder in wrong direction | |
| | | | Cartridge is inserted in holder in wrong side | |
| 0 → 1 | 0 → 1 | Cartridge | Cartridge is completely put in holder | Holder loading is permitted or action starts |

0:SW OFF   1:SW ON

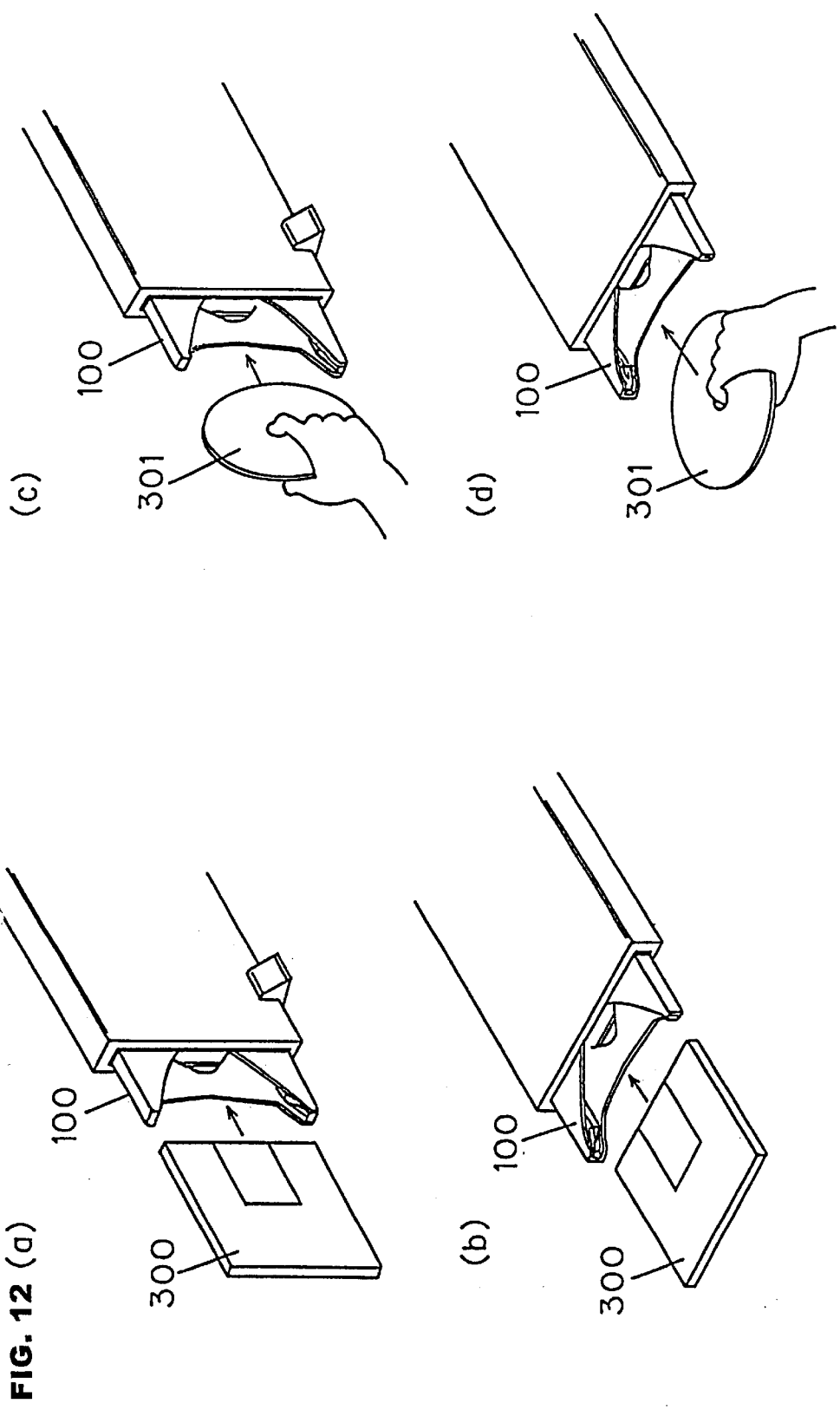

FIG. 13
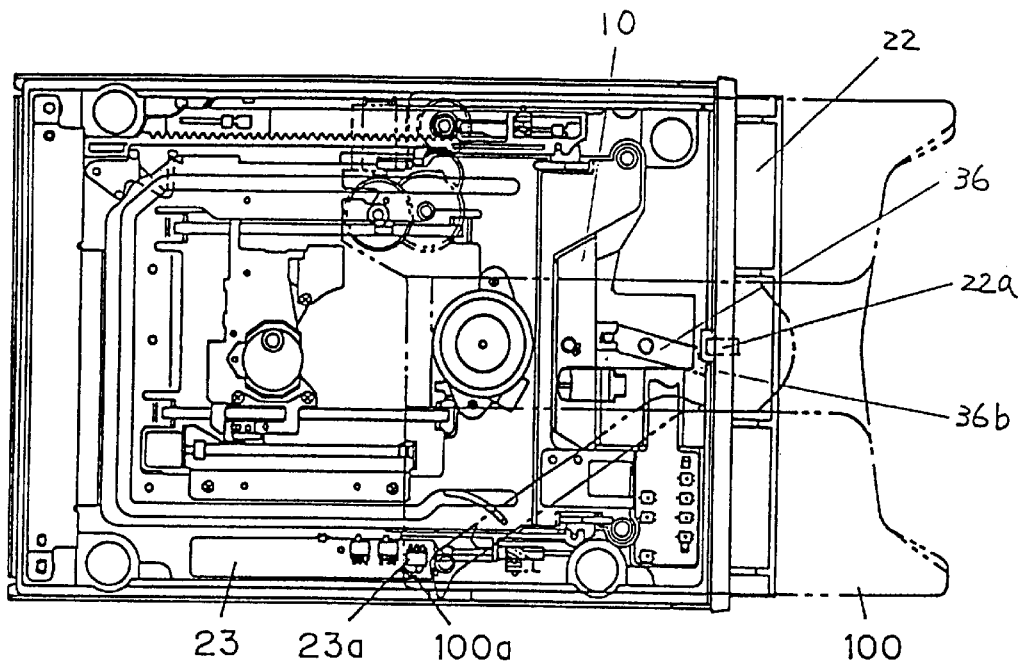
(a)
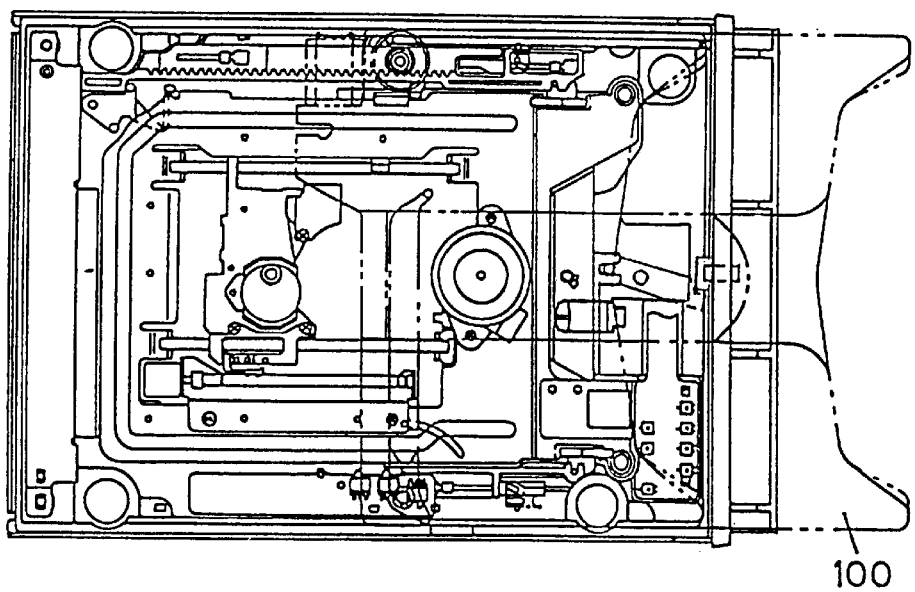
(b)

FIG. 14
(a)
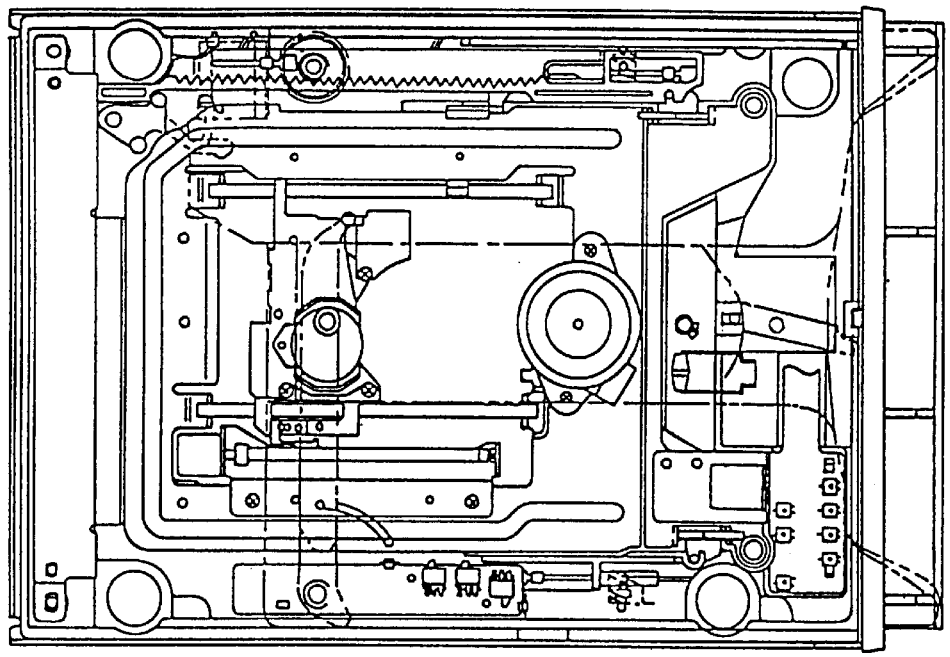
(b)
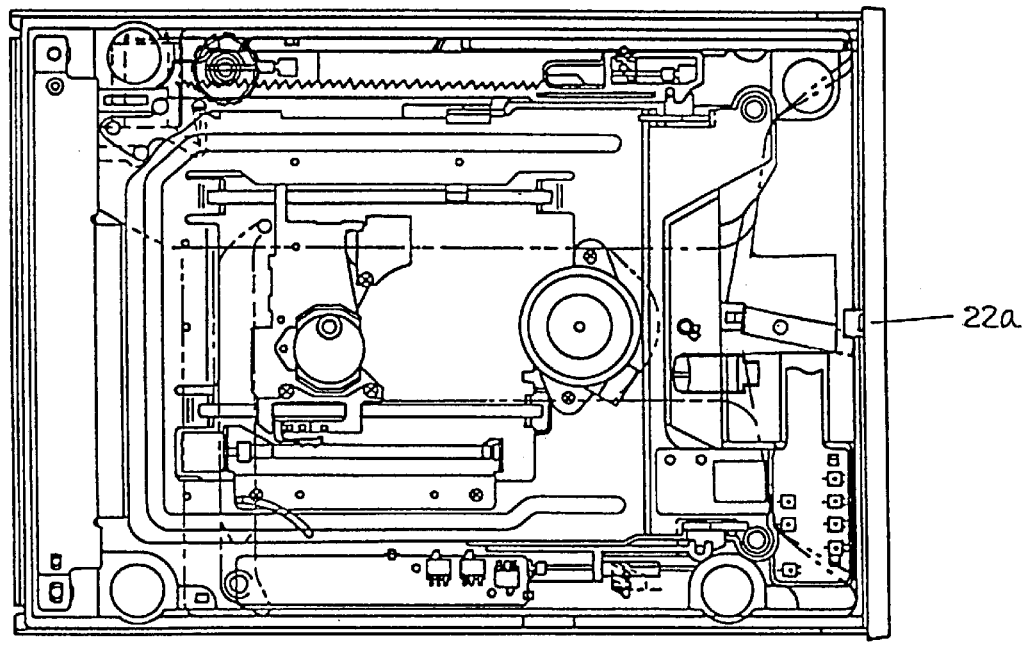

FIG. 21
(a)
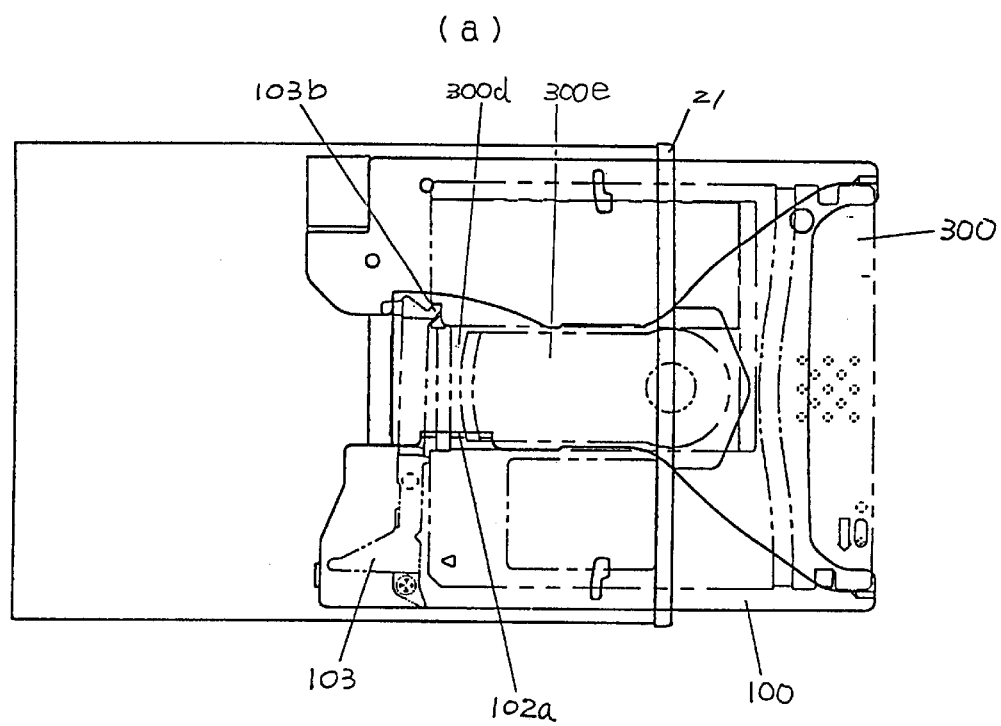
(b)
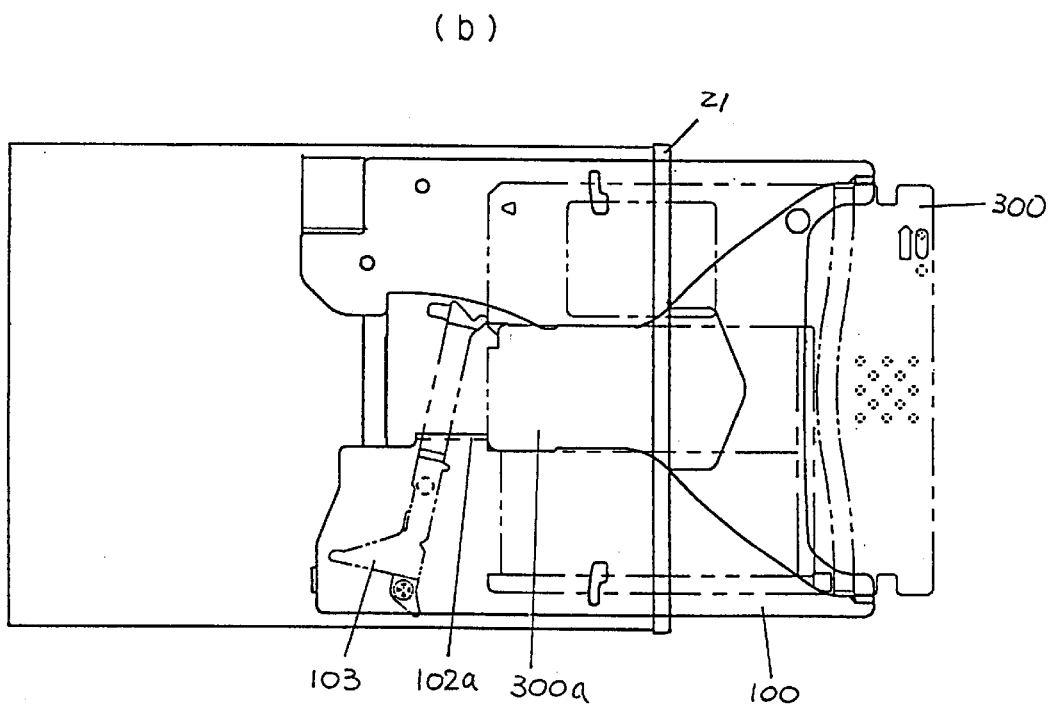

FIG. 23
(a)
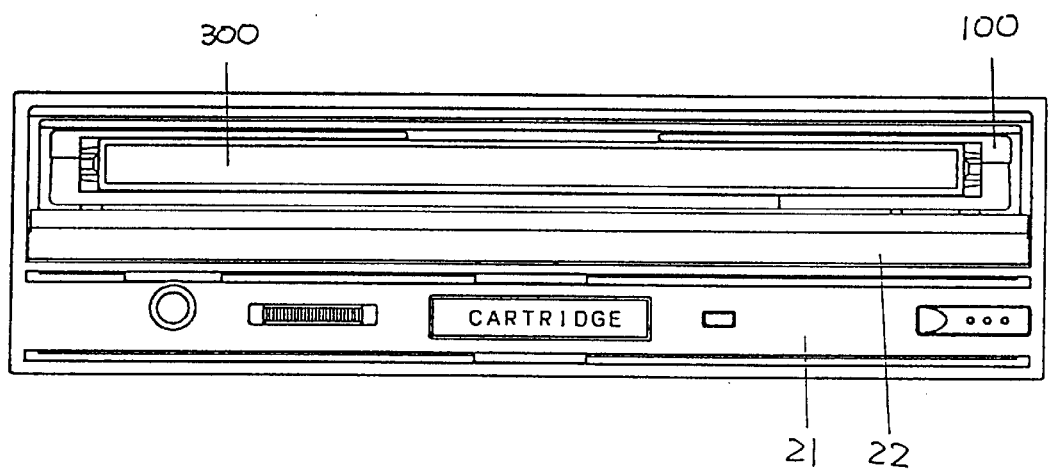
(b)
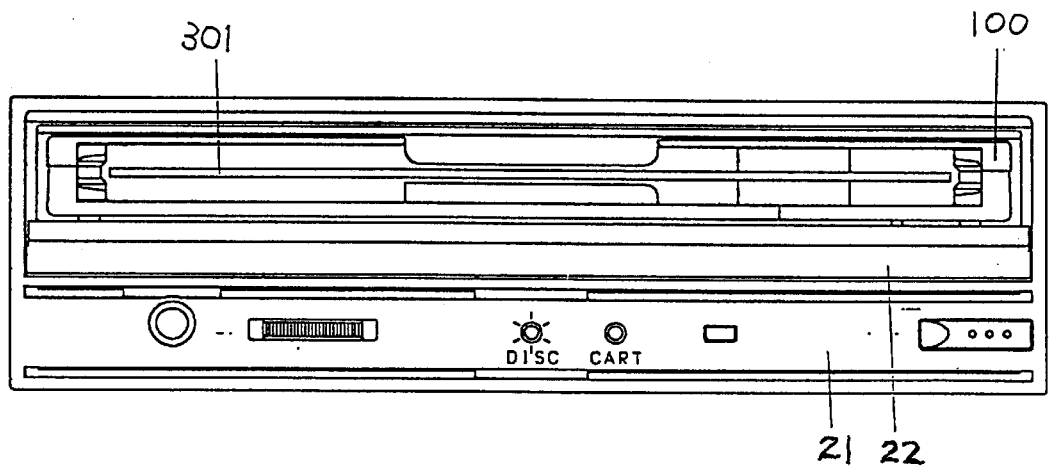

DISK LOADING DEVICE AND DISK CARTRIDGE

BACKGROUND OF THE INVENTION

1. Field of the Invention

The present invention relates to a disk loading device and a cartridge of an apparatus for recording and reproducing information in a recording medium such as a disk by using optical means.

2. Description of the Related Art

Recently, optical disk apparatuses are being widely used for audio discs, video discs and computer data memory devices.

Optical disks are classified into those contained in a cartridge to be recording and reproduced, used mainly in data storage, and disks to be reproduced only, used in a bare state, such as music CD and CD-ROM. Along with the progress of the multimedia, digitization of AV appliances and enhancement of AV functions in computer are advanced simultaneously, and the optical disks are required to function as a digital disk to be used widely in AV appliances and computers alike.

Further, not only the AV appliances but also personal computers are more and more reduced in size, and thus the optical disk apparatus is demanded to be further thinner.

In this background, regarding the optical disk apparatus, a thin type apparatus applicable to multiple formats of media is strongly demanded.

Hitherto, however, between the disk contained in the cartridge and the bare disk, the loading method for loading the disk into the apparatus is different, and various exclusive devices were needed.

Conventional devices are described below while referring to the drawings.

First, the loading mechanism of an optical disk apparatus for a cartridge used mainly as data memory device is explained with reference to the accompanying drawings.

Generally, in such optical disk apparatus, after inserting a cartridge into the apparatus, this cartridge must be moved in the direction of a spindle motor and an optical pickup, and the disk must be put on the turntable to be set in a recording or a reproducing state.

FIG. 49 is a prior art perspective view showing a structure of a disk loading mechanism, FIG. 50 is a side view showing its operation, and FIG. 51 is a schematic view showing the dimensional relation in the thickness direction within the device.

In FIG. 49 and FIG. 50, a cartridge 201 is inserted into a cartridge holder 202 from the front side of the disk loading device (hereinafter called the device). At this time, a shutter 201a of the cartridge 201 slides as being engaged with a shutter opener 210 assembled in the cartridge holder 202, and the recording and reproducing region of the disk in the cartridge 201 is exposed. At both sides of the cartridge holder 202, four guide rollers 203 are provided, and they are inserted into guide grooves 205 provided at both sides of a slider 204, so as to be movable by dimension d only in the vertical direction along a guide pole 207 planted on a chassis 206.

The slider 204 is provided so as to be slidable by dimension S in the direction of arrow A along a guide pin 208 planted on the chassis 206 in such a shape as to nip the cartridge holder 202 from beneath. The slider 204 is always thrust against the chassis 206 in direction A by means of a slider spring 209, and it is arrested, in initial state, by a lock arm (not shown) so that the slider spring 209 may be stopped in the maximum extended state (see FIG. 50(a)).

A damper 214 is rotatably held by a support arm 215, and is disposed at a position of an upper central opening 202a of the cartridge holder 202, so as to confront a turntable 212 on a disk motor 211. The damper 214 and turntable 212 attract each other by the attracting force of a magnet and a magnetic piece incorporated respectively.

The support arm 215 is rotated by a cam (not shown) provided in the slider 204 depending on its position, and moves up and down the damper 214. In initial state, the damper 214 is lifted to a position so as not to interfere with the cartridge 201 to be inserted (see FIG. 50(a)).

The lock arm is, when the cartridge 201 is inserted, pushed by a corner of the cartridge and is released. When the lock arm is released, the slider 204 slides in direction A by means of the slider spring 209, and the guide roller 203 moves along the guide groove 205, so that the cartridge holder 202 is moved by dimension d only in the direction (arrow B) of the chassis 206. At the same time, the support arm 215 is rotated by the slider 204, and the damper 214 is moved in the direction of the turntable 212. As the cartridge 201 descends, the disk in the cartridge 201 is put on the turntable 212, and is attracted by the damper 214 from above to be installed in a rotatable state, and is brought closer to the optical pickup 213 within a distance for recording and reproducing (see FIG. 50(b)).

When taking out the cartridge 201 from the device, the slider 204 is pulled back against the pulling force of the slider spring 209 by means of a loading motor 216, and the clamper 214 and cartridge holder 202 are raised to the position of the initial state. As a result, the disk is separated from the turntable 212, so that it is ready to take out the cartridge 201.

As shown in FIG. 51, when inserting the cartridge 201, a distance more than the thickness of the cartridge 201 (dimension D) is required between the turntable 212 and clamper 214.

Next, a loading mechanism of a prior art optical disk apparatus for bare disks such as music CD or CD-ROM is described while referring to FIG. 52 and FIGS. 53(a)–(c).

In FIG. 52 and FIG. 53, reference numeral 253 is a main chassis, which comprises a disk motor 256, a turntable 258 mounted on its shaft, a center cone 258a on the turntable 258 engaged with a central hole 245a of a disk 245 which is a recording disk, a head 243 mounting a coil 243a for linear motor slidably disposed in Y1–Y2 direction by a guide shaft 255, and a magnetic yoke 254 for linear motor. A hole 253b for rotary support point is provided at one end 253a of the main chassis 253, and a rotary support shaft 251 is passed in this hole 253b.

Similarly, at one end 247a of the clamp lever 247, a hole 247b for rotary support point is provided, and the rotary support shaft 251 is also passed in this hole 247b, and this rotary support shaft 251 is fixed on a protrusion 252 in a casing 242.

A tray 241 is provided inside of the casing 242 so as to move parallel in Y1–Y2 direction by motion in engagement between a rack 241a formed on the back side and an output gear of a loading motor 257 in which a reduction gear unit is provided. In the tray 241, moreover, a pan-shaped dent 246 is formed for mounting and holding the disk 245. When this dent 246 is formed in two steps, a small disk 260 can be also mounted.

Further, a cam 250 is engaged with the rear parts of the main chassis 253 and clamp lever 247. This cam 250 is driven by a geared motor 249. Depending on the position of rotation of the cam 250, the main chassis 253 and clamp lever 247 are designed to rotate about the rotary support shaft 251 to approach or depart each other. Reference numeral 240 is an insert port, 241b is an opening, and 248 is a clamper. The operation of the loading motor 257 and geared motor 249 is executed by ordinary microcomputer control. The position of the cam 250 or tray 241 driven by each motor is detected by an ordinary microswitch or the like. Their detail is not illustrated and explanation is omitted.

FIGS. 53(a), (b), (c) show the operation of the disk loading device of this prior art.

That is, when using the disk 245 in a disk recording and reproducing apparatus, when an eject/load switch 261 is pressed, the tray 241 is moved in Y2 direction by driving force of the loading motor 257 by microcomputer control, and comes out of the casing 242 to be in a state as shown in FIG. 53 (a). At this time, the clamp lever 247 and main chassis 253 are at mutually departed positions from the rotary support shaft 251.

In this state, when the disk 245 is put in the dent 246 of the tray 241 and the eject/load switch 260 is pressed, the tray 241 is transferred parallel into the casing 242 through the insert port 240 by driving force of the loading motor 257 to be in a state as shown in FIG. 53(b).

Consequently, the cam 250 rotates, and the clamp lever 247 and main chassis 253 approach each other on the rotary support shaft 251 as shown in FIG. 53(c), and the disk 245 is nipped between the damper 248 and the turntable 258 of the disk motor 256, and is engaged with the center code 258a to be in rotatable state. In this state, information in the disk 245 is reproduced or recorded by the head.

When taking out the disk 245 from the device, the operation in exactly reverse procedure is carried out.

In the disk loading device of such conventional disk apparatus, however, the loading device is exclusive for cartridge in the first prior art, and exclusive for the bare disk in the second prior art, and the following problems occur in the disk loading device handling both cartridge and bare disk (collectively called media hereinafter).

That is, immediately after loading of media in the loading device, it cannot be judged whether it is cartridge or bare disk, or if it is loaded correctly in the device, so loading operation is required before driving it, and the device may be broken due to insertion of foreign matter or wrong insertion.

Generally, since prevention of insertion of cartridge in wrong direction or wrong side depends on the shape of the cartridge, in the loading device capable of mounting plural types of cartridges, it is difficult to prevent wrong insertion of a cartridge.

Besides, if the shutter provided in the panel has no regulation of opening, when a bare disk is stored in the opening of the tray or cartridge holder provided for attaching or detaching the cartridge, if the shutter is opened, it is likely to touch the bare disk rotating at high speed, and the user may be injured.

Further, due to the effect of deflection of the shutter provided in the cartridge, the distance between the disk contact part of the cartridge opening and the disk stored in the cartridge is shortened, and there is a possibility of contact with the cartridge during rotation of the disk.

Recently, on the other hand, aside from the recording and reproducing apparatus having the exclusive disk tray and the recording and reproducing apparatus having the exclusive cartridge tray, a recording and reproducing apparatus having a tray capable of mounting disks and cartridges selectively has been proposed.

In this recording and reproducing apparatus (hereinafter called the compatible loading device), a disk mounting section and a cartridge mounting section are disposed on the tray, and when the cartridge is put on the tray, it is desired that the tray is firmly held in the loading device, and when pushing in the tray, it is desired to be manipulated by a small effort. When forcing out the media by force in a power off state, it is desired that the tray discharge force is small.

In the conventional compatible loading device, however, since such tray manipulating load is determined by the gear ratio of the drive system of the loading device and the loading motor, it was difficult to optimize the tray manipulating load depending on the type of the media, and the power on or off state.

In the compatible loading device, moreover, since the casing (fixed side) mounted on the personal computer and the recording and reproducing unit of cartridge and built-in disk (movable side) are separated by a damper, and when mounting on the personal computer, a gap is opened to absorb vibration due to impact between the opening of the casing and the movable side due to restriction of the outer structure of the device, and invasion of dust into the loading device is admitted, and also the pressure is negative inside the device due to rotation of the disk motor (spindle motor or the like), and dust or smoke is sucked toward the center of the motor, and such dust or smoke causes contamination of the recording and reproducing side of the disk or the lens over a long period of time.

Generally, in the drive system gear train of the tray, it is desired to use spur gears in consideration of the gear transmission efficiency, and when a spur gear train is used, the reduction ratio must be higher, and a spur gear of relatively large diameter must be used, but when a spur gear of large diameter is used, it is hard to reduce the size and thickness of the disk loading device. Accordingly, a worm gear is used in order to obtain a high reduction ratio in a narrow space.

In such a conventional disk loading device, however, aside from transfer of tray by driving the loading motor in the driving source, the tray may be transferred by a driving source other than the loading motor (transfer by manual operation), and the loading motor and the drive system may be operated by force by this driving source, and in this case, by such operation, arrest of rotation of the loading motor or damage may be induced by the force in reverse axial direction from the direction applied to the worm gear.

If trouble occurs in rotary motion in the loading motor or around the drive system, it is necessary to draw out the tray smoothly so that the media in the loaded state may be taken out easily.

Still more, for further reduction in size and thickness of the disk loading device, there were problems in optimization of the shape of the worm gear and engagement with the drive gear, and reduction of structural space of the drive gear train.

SUMMARY OF THE INVENTION

In order to solve the aforesaid problems, it is an object of the invention to present a disk loading device capable of reducing the thickness of the entire device without making a large excessive space in the device, capable of loading both bare disk and cartridge, and usable in both horizontal position and vertical position.

It is a second object of the invention to judge the type of the loaded media, and prevent insertion of cassette in wrong direction or side.

It is a third object of the invention to prevent the user from touching easily the fast rotating disk in the device.

It is a fourth object of the invention to avoid contact of the disk in the cartridge with the cartridge due to distortion of the shutter of the cartridge during rotation.

It is a fifth object of the invention to optimize the load when manipulating the tray, depending on the type of the media, or power on or off state, allowing to hold the tray firmly in the loading device when the cartridge is mounted on the tray, push in the tray with a small force of manipulation, and discharge the tray with a small force when discharging the media by force in power off state.

It is a sixth object of the invention to prevent contamination of recording and reproducing side of the disk or the lens in a long time course by preventing invasion of dust or smoke through the gap when mounting or an air flow inlet even when the loading device is mounted on a personal computer or the like.

It is a seventh object of the invention to prevent arrest of rotation or damage of the loading motor by controlling the force in a reverse axial direction from the direction applied to the worm gear, whether the loading motor in the driving source is driven to transfer the tray, or the tray is transferred by a drive source other than the loading motor (transfer by manual operation) and the loading motor and the drive system are operated by force by this driving source, in the tray transfer means using the worm gear.

It is an eighth object of the invention to take out the loaded media easily, by moving the tray smoothly, even if faulty operation or rotation trouble occurs in the loading motor or around its drive.

To achieve the first to fourth objects, the disk loading device of the invention comprises a holder for holding a cartridge or a bare disk, shutter opening means of the cartridge and its position detecting means, holding means of bare disk and its posture detecting means in the holder, transfer means for moving the holder in and out through an opening at the front side of the disk loading device, and rotary driving means of a recordable disk, in which the action specification of the transfer means or the rotary driving means is changed depending on the results of detection by judging the type of the cartridge or bare disk immediately after contained in the holder by these two detecting means, and detecting whether the media are normally mounted or not.

The disk loading device is combined with display means such as LED or liquid crystal panel for displaying the results of detection of the type and state of the media, or output means for delivering to an external display device such as a monitor or TV.

The holder includes defining means for impeding mounting of the cartridge in other than a specified direction, which is provided in an opening of the cartridge appearing when the cartridge is mounted on the holder in the specified direction.

Further, in the opening at the front side of the device of this disk loading device, a device shutter, and a stopper of limiting means for abutting against the device shutter by collaboration with the transfer means are provided, and depending on the holder containing state, the holder transfer state and the opening state of the device shutter are limited through the relative position of the stopper and the shutter.

The cartridge of the present invention is designed to form a gap near the opening of the cartridge abutting against the shutter of the cartridge when opening the cartridge.

In the invention, inside of the holder for holding the cartridge or bare disk, shutter opening means for a cartridge and its position detecting means, and holding means for a bare disk and its posture detecting means are provided, and it is intended to judge whether the media contained in the holder is a cartridge or a bare disk, and whether the media is installed normally or not by the two detecting means of the position detecting means and posture detecting means, and therefore it is instantly judged whether the media is installed correctly in the device or not, so that entry of foreign matter or wrong insertion may hardly occur.

In the present invention, the device further comprises transfer means for moving the holder in and out through an opening at the front side of the device and rotary driving means of the recordable disk, and therefore immediately after being contained in the holder, the type of cartridge or bare disk is judged and whether the media is installed normally or not is detected, and the action specification of the transfer means or rotary driving means is varied depending on the result of detection, so that entry of foreign matter or wrong insertion may hardly occur.

In the present invention, the device further comprises display mans for displaying the type or state of the media installed in the holder or output means for delivering outside, and therefore immediately after being contained in the holder, the type of cartridge or bare disk being judged and whether the media is installed normally or not are displayed by the LED or liquid crystal panel, or displayed in an external display device such as an external monitor or TV, so that it is immediately judged whether normally contained in the device or not.

In the present invention, when the cartridge is inserted into the holder, the shutter of the cartridge is opened by the shutter opening means provided in the holder, and defining means for impeding mounting of cartridge in other than a specified direction is provided in the opening of the cartridge appearing when the cartridge is installed in the holder in the specified direction, and therefore entry of foreign matter or insertion in a reverse direction or insertion of a cartridge of the type not applicable in the device hardly occurs.

The present invention comprises a holder for holding a cartridge or a bare disk, transfer means for moving the holder in or out of the device through an opening at the front side of the disk loading device, a device shutter provided in the opening, and a stopper as limiting means for abutting against the device shutter in collaboration with the transfer means, and when the holder is put in the disk loading device, the stopper and the protrusion provided in the device shutter are at confronting positions while maintaining a specified gap, and when the holder is discharged from the disk loading device, the stopper and the protrusion of the device shutter depart from each other, and therefore when the bare disk is put in the opening of the holder provided for attaching or detaching the cartridge, if the device shutter is opened, it is not likely to touch the bare disk rotating at a high speed.

The present invention comprises a holder for holding a cartridge or a bare disk, transfer means for moving the holder in or out of the device through an opening at the front side of the disk loading device, a device shutter provided in the opening, and a stopper as limiting means for abutting against the device shutter in collaboration with the transfer means, and when the holder is put in the disk loading device, the stopper and the protrusion provided in the device shutter are at confronting positions while maintaining a specified gap, and when the holder is discharged from the disk loading device, the stopper and the protrusion of the device shutter depart from each other, and moreover when the closing action of the device shutter is blocked in the midst of entry of the holder into the disk loading device, the protrusion of the device shutter is positioned on the track of the stopper in holder entry process, and therefore when the bare disk is put in the opening of the holder provided for attaching or detaching the cartridge, if the device shutter is opened, it is not likely to touch the bare disk rotating at high speed.

In the present invention, when composing the device shutter and the stopper through an elastic member such as vibration absorbing rubber, the abutting distance between the device shutter and the limiting means is provided with a variation portion of the posture due to the elastic element, and therefore when the bare disk is put in the opening of the holder provided for attaching or detaching the cartridge, if the device shutter is opened, it is not likely to touch the bare disk rotating at high speed.

In the present invention, especially relating to the cartridge, by reducing the thickness of the cartridge or shutter near the opening of the cartridge abutting against the shutter when opening the shutter of the cartridge, a gap is provided therein, and therefore the distance between the inside of the opening of the cartridge and the disk in the cartridge is shortened due to the effect of deflection of the shutter of the cartridge, so that contact with the cartridge during rotation of the disk is avoided.

To achieve the fifth and sixth objects, the present invention comprises a holder for holding a media such as a cartridge or a bare disk, shutter opening means of the cartridge, detecting means of its position, holding means for holding the bare disk, detecting means of its posture, all being disposed in the holder, and immediately after the media is put in the holder, the two detecting means judges whether the media is a cartridge or a bare disk, and detects whether the media is installed correctly or not, thereby changing the drive specification of the transfer means, so that the arresting force of the holder is optimized depending on the media.

Further, comprising disk rotating means for the media, a casing having an opening and containing the holder, and a dust-proof member provided between the opening and the disk rotating means. Thus, dust or smoke is prevented from being sucked into the disk of the casing due to rotation of the disk rotating means, and contamination of the recording and reproducing surface of the disk or lens is avoided.

The present invention comprises a holder for holding media, transfer means for moving the holder in or out of the device through an opening at the front side of the device, shutter opening means for the cartridge, detecting means of its position, holding means for holding a bare disk, detecting means of its posture, all being disposed in the holder, and immediately after being put in the holder, the two detecting means judge whether the media is a cartridge or a bare disk, and detects whether the media is installed correctly or not, thereby changing the drive specification of the transfer means, so that the arresting force of the holder is optimized depending on the media.

In the present invention, the device is intended to change the arresting force of the holder by the transfer means when media is not mounted and when media is mounted, and therefore the sense of stability when mounting the media on the holder is increased, and it feels light when manipulating the holder after mounting of the media.

In the present invention, preferably, a mechanical restraining mechanism is used in the arresting mechanism of the transfer means.

In the present invention, preferably, an electromagnetic restraining mechanism by shorting both ends of the drive motor of the transfer means is used as the arresting mechanism of the transfer means.

The present invention comprises a holder for holding media, transfer means for transferring the holder, and a casing holding the disk rotating means of media, and having an opening for moving in and out and containing the holder by the transfer means, and a ventilation hole is provided in the top lid at the opening side of the casing, and this casing is assembled into the main body of a personal computer, so that dust and smoke entering through the opening can be discharged out of the casing through the ventilation hole, by making use of an air stream of the fan incorporated in the personal computer, stronger than the air stream caused by pressure difference between inside and outside of the casing by rotation of the disk.

The present invention comprises a holder for holding media, transfer means for transferring the holder, disk rotating means for rotating the media, a casing having an opening for containing the holder, and a dust-proof member disposed between the opening and the disk rotating means, and therefore by rotating the disk by the rotating means, the pressure becomes negative in the loading device, so as to suck dust and smoke toward the center of the motor. And thus, contamination of the recording and reproducing side of the disk and the lens can be prevented by the dust-proof member disposed in this passage.

In the present invention, an elastic material is preferably used in the dust-proof member, and therefore contamination of the recording and reproducing side of the disk and the lens over the course of time can be prevented without impeding the action of the transfer means.

In the present invention, a material of low gas permeability or a filter is preferably used as the dust-proof member, so that the passage of dust or smoke into the recording and reproducing side of the disk and the lens can be shut off.

To achieve the seventh and eighth objects, the invention comprises driving means containing a worm gear at least in one position of the motor and drive system in order to transfer a disk tray mounting a disk, and an outer shell member for installing the disk tray and the driving means, in which the worm gear is freely supported in the center of rotation of the worm gear and in the rotating direction on the worm gear rotary shaft for obtaining a driving force from another driving source, and comprises driving force transmitting means fixed in the rotating direction and axial direction on the worm gear rotary shaft for defining the force in the axial direction in one direction only in the axial direction of the worm gear, and engaged with the worm gear for transmitting the driving force of the worm gear rotary shaft, and axial direction defining means for defining the force in the axial direction of the worm gear at the opposite side of the side defined by the driving force transmitting means, whereby the rotation is transmitted to the worm gear during rotation and driving of the worm gear rotary shaft, and the axial direction defining means prevents its action from being transmitted to the worm gear rotary shaft during movement of the worm gear only in a specific direction in the axial direction.

That is, the present invention comprises a disk tray mounting a disk for transferring it, driving means containing a worm gear at least in one position of the motor and drive system in order to transfer the disk tray, and an outer shell member for installing the disk tray and the driving means, in which the worm gear is freely supported in the center of rotation of the worm gear and in the rotating direction on the worm gear rotary shaft for obtaining a driving force from other driving source, and comprises driving force transmitting means fixed in the rotating direction and axial direction on the worm gear rotary shaft for defining the force in the axial direction in one direction only in the axial direction of the worm gear, and engaged with the worm gear for transmitting the driving force of the worm gear rotary shaft, and axial direction defining means for defining the force in the axial direction of the worm gear at the opposite side of the side defined by the driving force transmitting means, whereby the rotation is transmitted to the worm gear during rotation and driving of the worm gear rotary shaft, and the axial direction defining means prevents its action from being transmitted to the worm gear rotary shaft during move of the worm gear only in a specific direction in the axial direction, and therefore the rotary shaft of the motor does not receive the axial force at the projecting side from its casing, thereby preventing breakage of the motor or an increased driving load of the motor if not leading to breakage.

In the present invention, the worm gear is movable in the axial direction up to the position of clearing engagement with the driving force transmitting means, and includes thrusting means for thrusting in the axial direction in the direction toward the position of engagement from the position of clearing the engagement between the worm gear and the driving force transmitting means, and when a large torque is required for driving the motor rotary shaft from outside due to trouble of the motor or the like, the disk tray unit can be discharged smoothly in the power off state.

In the present invention, at least one terminal end of the teeth of the worm gear is in a smooth state of a tooth tip curve, the height of the teeth becomes lower, and the teeth are terminated, and therefore, in order to reduce the size and thickness of the disk loading device, if the space efficiency is enhanced by setting the engagement position of the worm gear and worm wheel near the terminal end of the teeth at the dedendum of the worm gear, when the worm wheel is engaged with the worm gear, they are not engaged at other than a specified tooth surface, and failure of normal gear meshing is avoided. Therefore, increasing of driving load is avoided without spoiling smooth transmission of the driving force.

In the present invention, the driving means includes a first gear and a second gear engaged with each other, having a rotary shaft aligned in a direction nearly vertical to the disk on the disk tray, and the first gear further includes moving means movable in the axial direction up to the clearing position for clearing engagement with the second gear, for moving the first gear up to the clearing position in the rotary shaft direction of the first gear, and thrusting means for thrusting the first gear in the direction of rotary shaft in the direction of the position of engagement with the second gear. Further, preferably, the driving means includes a first gear and a second gear engaged with each other, having a rotary shaft aligned in a direction nearly vertical to the disk on the tray, and the first gear further includes moving means movable in a direction of a plane orthogonal to the rotary shaft up to the clearing position for clearing engagement with the second gear, for moving the gears up to the clearing position in the direction of the plane orthogonal to the rotary shaft of the first gear, and thrusting means for thrusting the first gear in the direction of the plane orthogonal to the rotary shaft in the direction of the position of engagement with the second gear, and therefore the disk tray can be discharged smoothly in power off state, regardless of increase in the driving load, even if the gear is broken or abnormality occurs in the drive system.

BRIEF DESCRIPTION OF THE DRAWINGS

FIG. 11 is a diagram for judging media contained in the holder when ejecting in the disk loading device.

FIGS. 12(a), (b), (c), and (d) are perspective outline views showing the mode of inserting media in the disk loading device.

FIG. 13 to FIGS. 15, (a) and (b) each, are see-through plan views showing a time series state of loading action in the disk loading device.

FIG. 21(a) and (b) and FIG. 22 are plan views when inserting a cartridge in the holder of the disk loading device.

FIGS. 23(a) and (b) are front views of a disk loading device in embodiment 2 of the invention.

DESCRIPTION OF THE PREFERRED EMBODIMENTS (Embodiment 1)

A disk loading device in embodiment 1 of the invention is described below while referring to the accompanying drawings.

The disk loading device (or simply the device hereinafter) of the embodiment is usable in both horizontal and vertical position, but in the following description, the disk loading device is set in horizontal position for the sake of convenience.

The recording media handled by the disk loading device of the invention include the disk alone such as music CD or CD-ROM of 12 cm in diameter or 8 cm disk alone such as music CD (hereinafter called bare disk), and the type of the disk contained in a cartridge (hereinafter called cartridge). These two types of recording media are collectively called the media. What is considered in the loading mechanism is the type of the media, and the recording and reproducing system and recording density are not limited to the illustrated example alone.

First the entire constitution of the disk loading device is explained, and then the constitution of individual parts is described in succession.

(Entire Constitution of Disk Loading Device)

Figure 1:
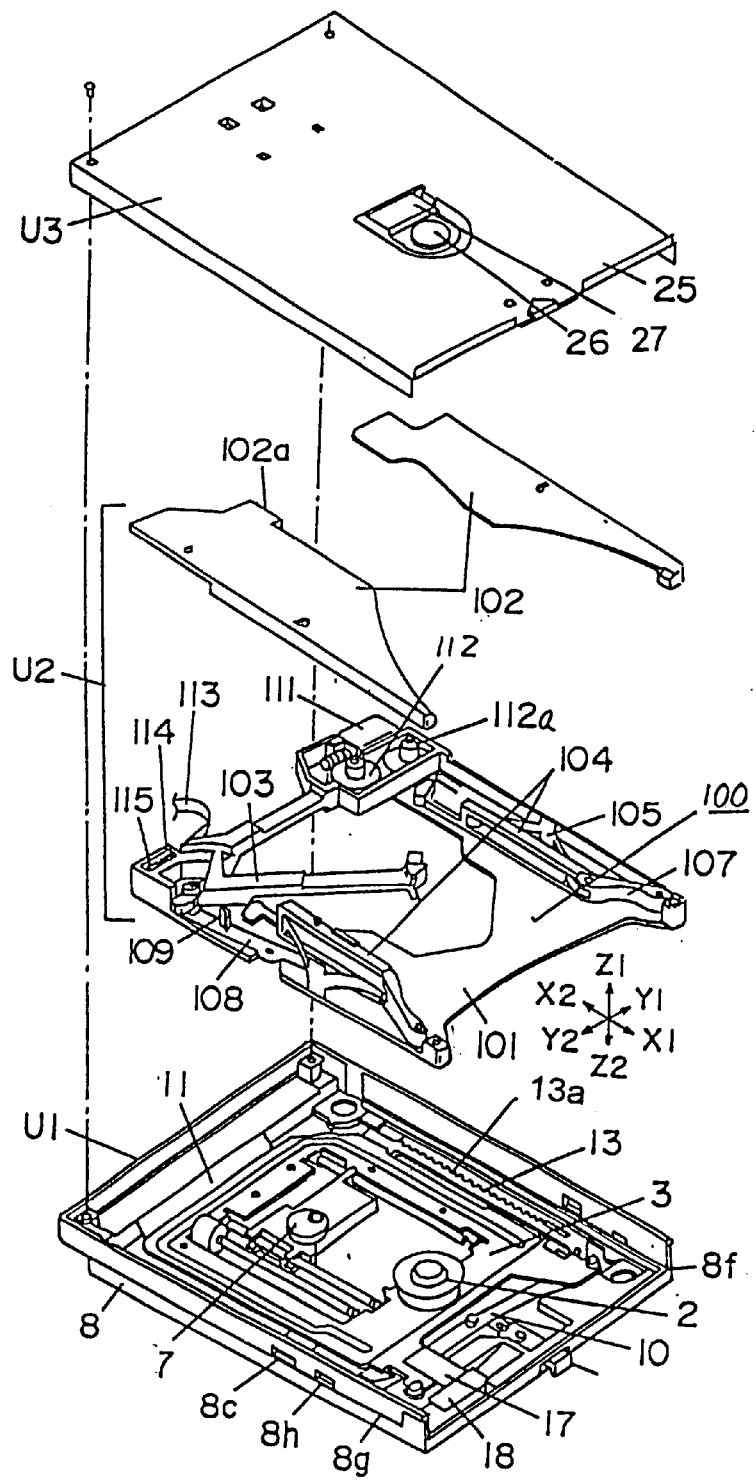
FIG. 1 is a perspective exploded view showing a constitution of a disk loading device in embodiment 1 of the invention.
Figure 2:
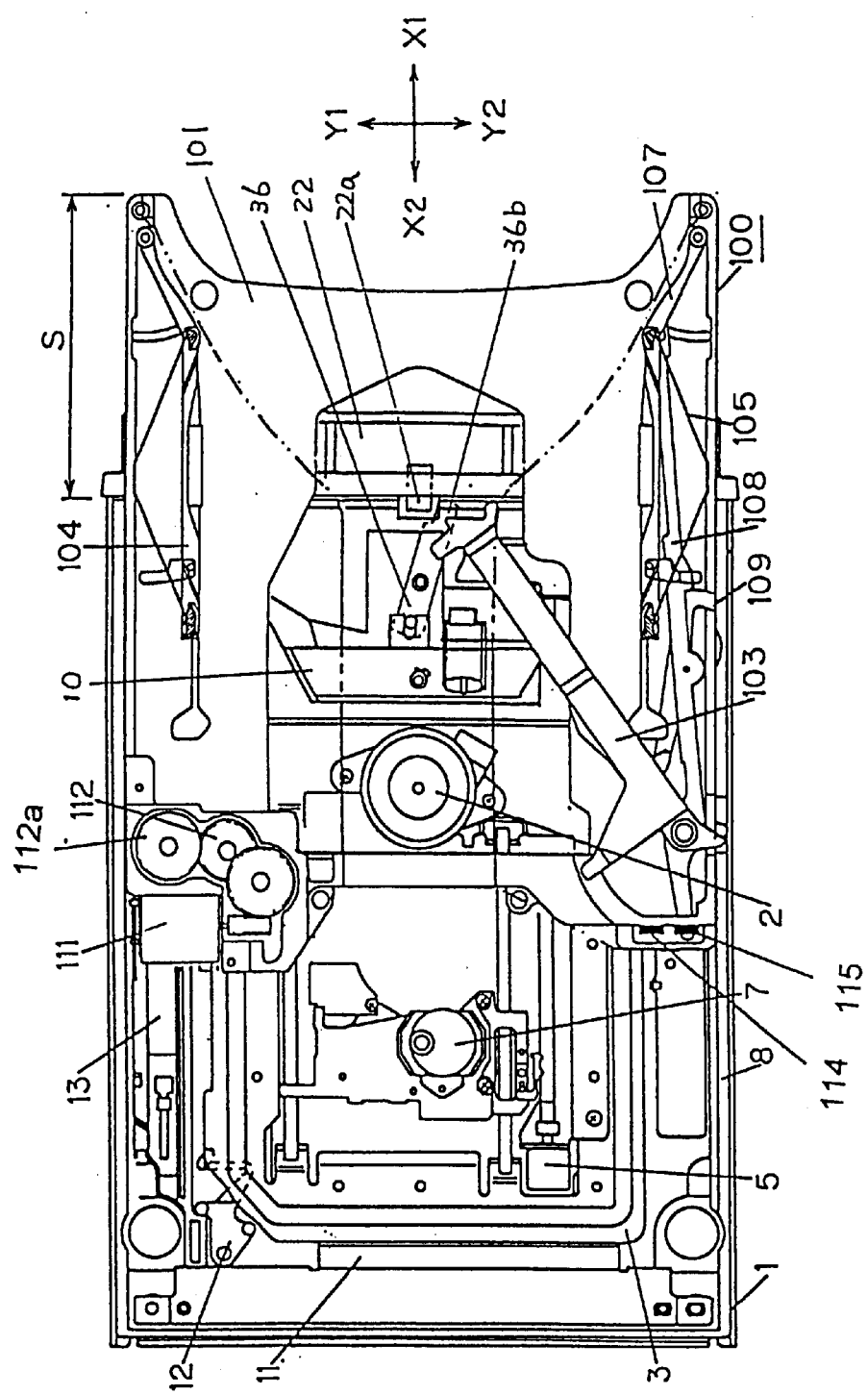
FIG. 2 is a plan view showing an internal constitution of the disk loading device, and FIGS. 3(a), (b), and (c) are perspective views of a cartridge and a bare disk.
Figure 3:
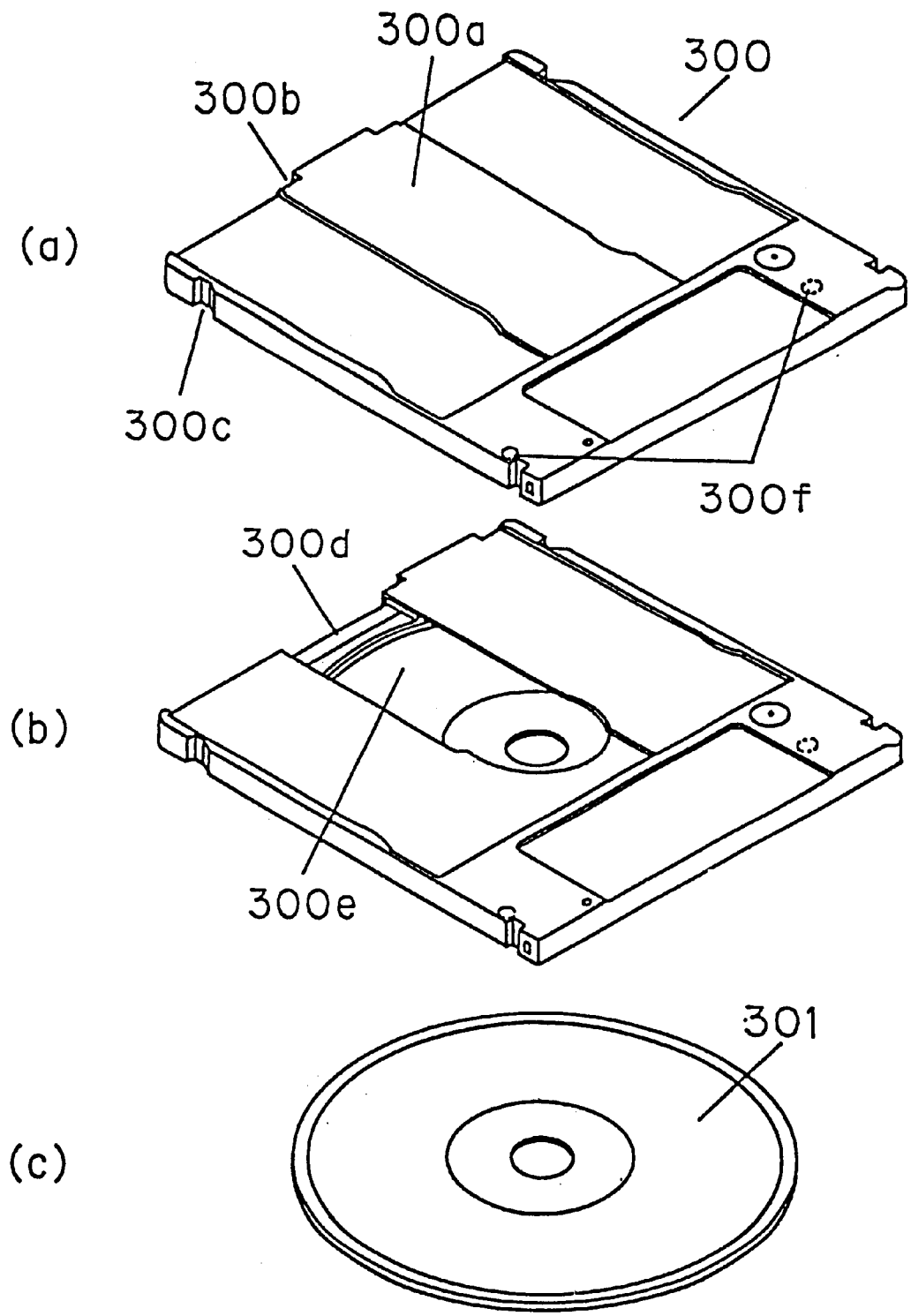

FIG. 1 is a perspective exploded view showing a constitution of the disk loading device in embodiment 1 of the invention, FIG. 2 is a plan view showing its internal constitution, and FIG. 3 is a perspective view of cartridge and bare disk.

In FIG. 1, the disk loading device in embodiment 1 of the invention is composed of a base unit U1, a holder unit U2, and a clamp unit U3.

In the system of coordinates showing the direction in the diagram, the depth direction of the device is indicated by X, the width direction by Y, and the height direction by Z.

In the base unit U1, a chassis 3 mounting an optical head 7 and a turntable integrated disk motor 2 on a base 8, and an elevating mechanism of raising and lowering it are assembled. A holder 100 shown in FIG. 2 is mounted on a guide 8*f* at the side in the base 8, and a top plate 25 is put thereon.

In the top plate 25, a clamp lever 27 having a damper 26 is provided to compose the clamp unit U3.

In the holder 100 of the holder unit U2, a loading motor 111 and a gear train 112 are assembled, and a gear 112*a* of final stage of the gear train 112 is meshed with a rack 13*a* provided in a slide rack 13 provided in the base 8, so that the holder 100 is driven in the X1–X2 direction. The driving current of the loading motor 111 is supplied from the base side from a flexible printed circuit board (hereinafter called flexible board) 113.

In the holder 100, moreover, a pair of right and left disk holding mechanism for guiding and holding the bare disk, a shutter opener 103 for opening and closing the shutter of the cartridge, a lock mechanism of cartridge, a lock mechanism of holder, and a cartridge thrusting spring are assembled.

The flexible board 113 contains a switch 114 and a switch 115, which are respectively turned on or off by the shutter opener 103 and a linkage plate 108.

FIG. 2 is a plan view of the state of assembling the holder unit U2 in the base unit U1.

The holder 100 is pulled out in the direction of X1 by distance S as shown in FIG. 2, by means of the assembled loading motor 111 so that the held disk may be exposed by about half, and comes into waiting state for media exchange.

(Media to be Used)

FIG. 3(*a*) is a perspective view of a cartridge 300 in a closed state of a shutter 300*a*, in which a holding notch 300*c* and a positioning hole 300*f* are provided at the side.

In the midst of inserting the cartridge 300 into the holder 100, the leading end of the shutter opener 103 of the holder 100 is engaged with a recess 300*b* at the leading end of the shutter 300*a*, and when further inserted into the depth, the shutter 300*a* is opened to be in state as shown in FIG. 3(*b*), and the disk 300*e* contained therein is exposed. At the same time, the linkage part 300*d* thinner than the thickness of the cartridge 300 is exposed, too. The shutter 300*a* may be either of one-side opening or both-side opening type. FIG. 3(c) is an appearance drawing of the bare disk 301.

The constitution of individual parts of the disk loading device is specifically described below.

(Constitution of Holder Unit)

The constitution of the holder 100 is described in the first place.

Figure 4:
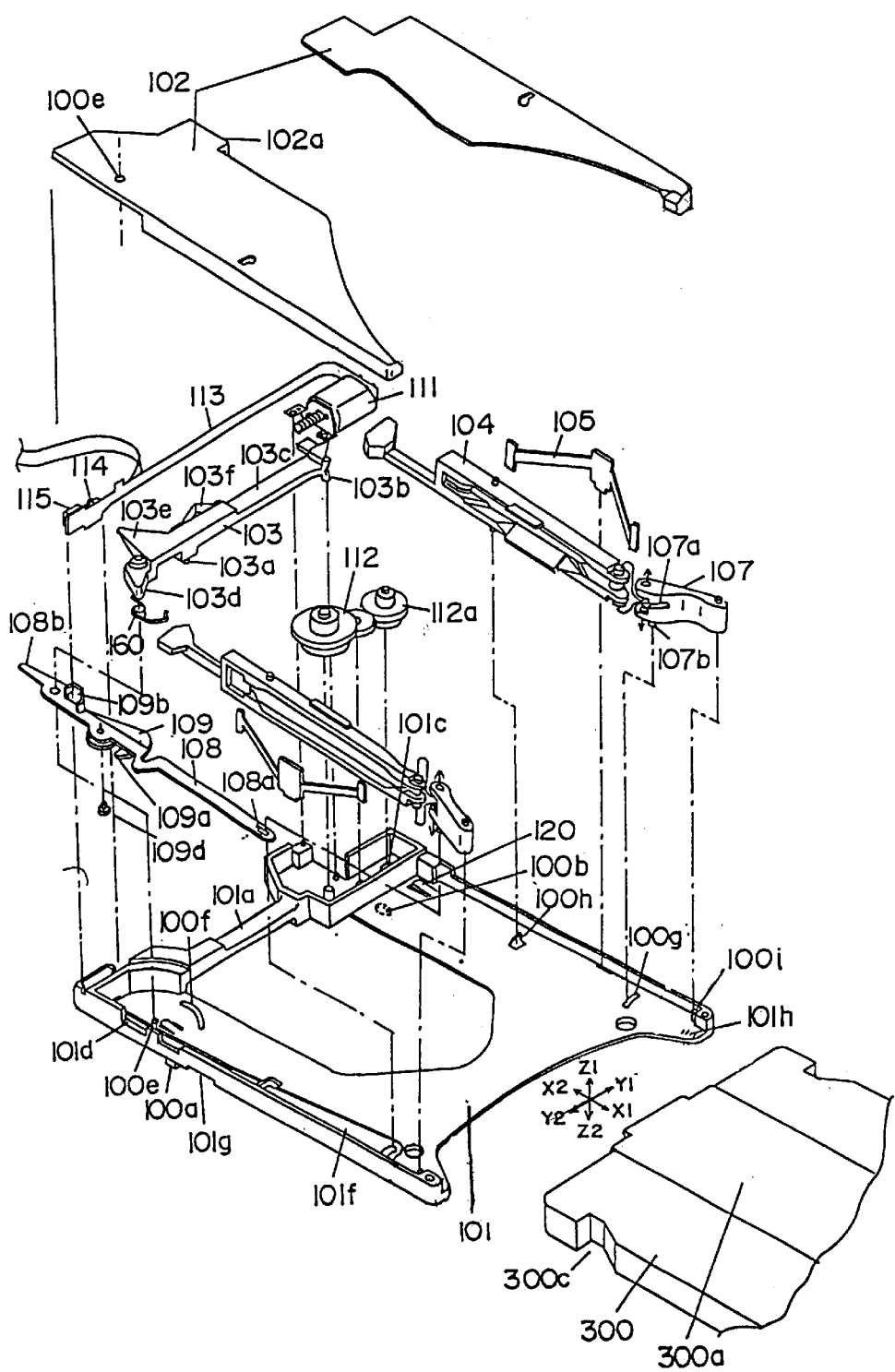
FIG. 4 is a perspective exploded view showing an internal constitution of a holder of the disk loading device.
Figure 5:
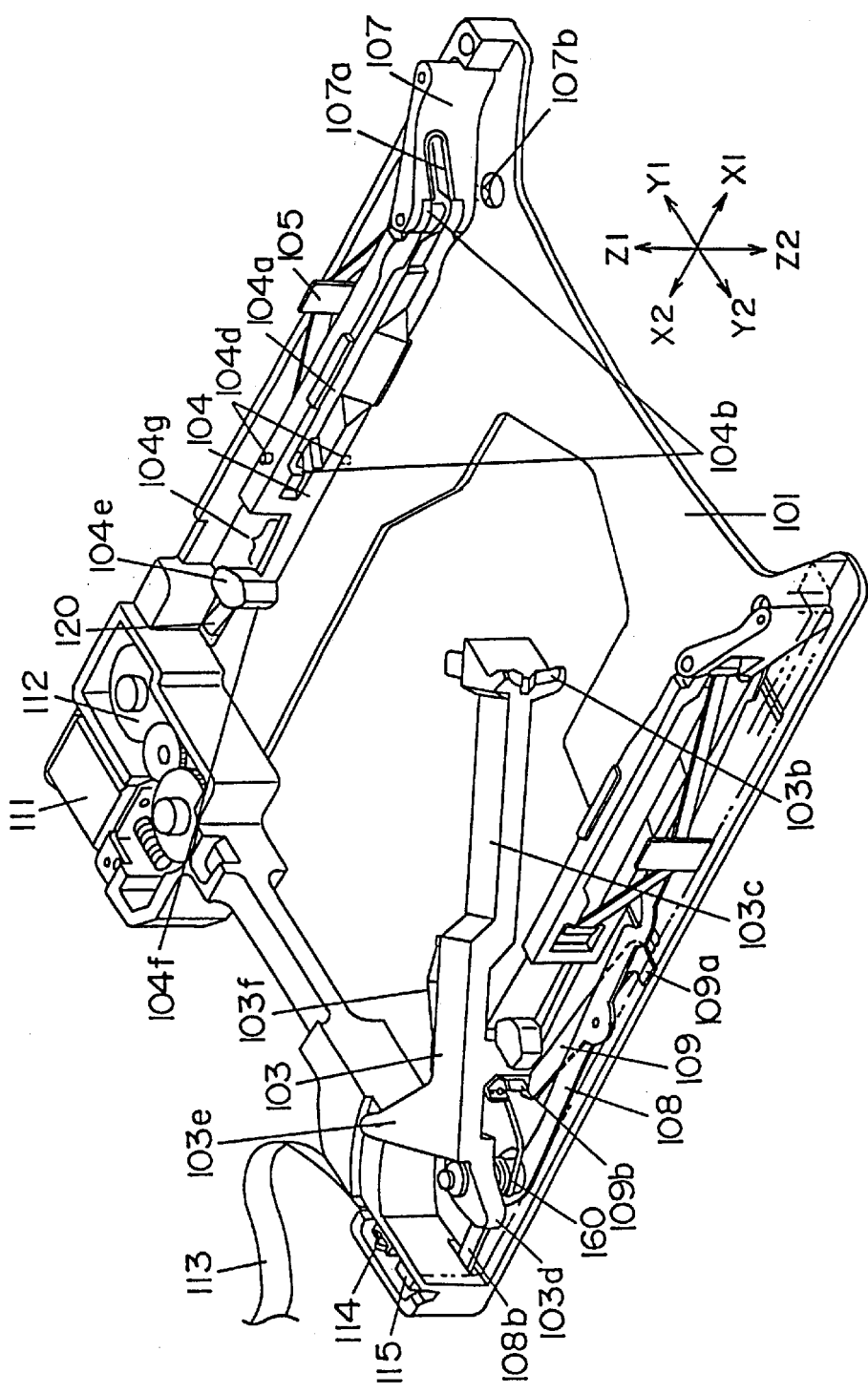
FIG. 5 is a see-through perspective view of the assembled state of the holder.

FIG. 4 is a perspective exploded view showing an internal constitution of the holder 100, and FIG. 5 is a see-through perspective view of the assembled state.

In FIG. 4, a holder cover 102 is provided on a holder case 101, and the box-shaped holder 100 is composed, and the X1 side opening is a media inlet, and the media is inserted in the direction of X2. The height of its internal height is the sum of the thickness of the cartridge 300 and a proper clearance, and the width is the sum of the width of the cartridge 300 and an escaping allowance for a holding mechanism (holding means) of the bare disk 301. The bottom of the holder case 101 has an opening in which an optical head is inserted from beneath, and the innermost center is notched from above and beneath to form a thin linkage part 101a. The holder cover 102 is divided into right and left sections, and a space is formed in the holder center in the same width as the linkage part 101a. A reverse insertion preventive rib 102a of the cartridge 300 is provided in the holder cover 102.

The cartridge inlet shape of the holder case 101 and of the holder cover 102 is specified so that the both right and left ends project in the direction of X1, with a recess formed in the center. In only the right and left protrusions, the bottom of the holder case 101 is extended to the inside from the holder cover 102, and a receiving part 101h is provided, and when inserting the cartridge 300, insertion is easy by once putting the leading end of the cartridge 300 on this receiving part 101h.

At the inner end of the holder 100, there are a mounting portion of the loading motor 111 and driving gear train 112, a mounting portion of the shutter opener 103, and a mounting portion of the linkage plate 108 and holder lock 109, and two protrusions 100a, 10b are provided at the lower side of the bottom, and all others are symmetrical on right and left side.

A gear 112a of the final stage of the gear train 112 projects to the holder lower side from the bottom hole 101c of the holder case 101, and cooperates with the drive mechanism assembled in the base 8. The operation of the gear 112a and two protrusions 100a, 100b is described later.

The shutter opener 103 is rotatably assembled around a shaft 100e formed of the holder case 101, and a hole and a boss at the same position as the holder cover 102, and a protrusion 103a is engaged with an arc groove 100f that is concentric with the shaft 100e, so that the angle of rotation is defined. When thrust to the media inlet side of the arc groove 100f by a spring 160, the leading end 103b comes into the position for abutting against the recess 300b of the shutter 300a of the inserted cartridge 300. The leading end 103b of the shutter opener 103 has a cylindrical form of which the height is nearly equal to the thickness of the cartridge 300, and the media inserting side is notched, except for the upper and lower ends. Accordingly, an end face of an inserted bare disk, abutting against the leading end 103b, is prevented from dislocating by sliding up or down.

The protrusion 103d at the opposite side of the shutter opener 103 projects to the side from the side hole 101d of the holder case 101, and when the shutter opener 103 rotates to the inner side, it is contained in the holder. When the holder 100 is ready to exchange media pulled out of the device, by forming a relief hole (not shown) in the side wall of the base 8 at the position corresponding to this protrusion 103d, when the holder 100 is pulled in, the shutter opener 103 is designed to rotate promptly to the holder inner end.

An arm 103c of the shutter opener 103 is notched from above and beneath, and its thickness is nearly the same as the linkage part 101a at the inner end of the holder case 101.

A protrusion 103e of the shutter opener 103 turns on a switch 114 provided in the flexible board 113 at a specific angle position of the shutter opener 103.

An opener plate spring 103f of the shutter opener 103 abuts against the inner end wall of the holder case 101 at the terminal end of the rotary action of the shutter opener 103, and provides the shutter opener 103 with a thrusting force.

The holder lock mechanism is described below.

The holder lock mechanism is formed of an inlet lever 107, a linkage plate 108, and a holder lock 109.

The holder lock 109 has a hook 109a and a riser 109b at both ends, and installed on the lower side of the linkage plate 108 so as to be rotatable about a shaft 109d. The linkage plate 108 is provided rotatably about a shaft 100e in a dent or recess 101f provided in the bottom of the holder case 101. The holder lock 109 is thrust in a direction of the riser 109b moving toward the holder inner side by means of a spring 160.

A slot 108a at the leading end of the linkage plate 108 is engaged with a protrusion 107b at the leading end of the inlet lever 107 to cooperate therewith. The inlet lever 107 is rotatably mounted around a shaft 100i in a range of an arc groove 100g, and is thrust to the holder inner side, together with the disk holder 104, by the spring (holder plate spring) 105. Immediately after the cartridge 300 is inserted, the inlet lever 107 is pushed open in the outer direction of the holder, and the linkage plate 108 also rotates to the outside, and a hook 109a of the holder lock 109 projects outside of the holder from the side hole 101g of the holder case 101. In this state, the riser 109b of the holder lock 109 invades into the path of the cartridge 300, and when the cartridge 300 reaches up to the inner side, it is pushed open to the outside, and the hook 109a rotates reversely to the inside to be contained in the holder. That is, only in the midst of insertion of the cartridge 300, the hook 109a is designed to project outside of the holder 100.

The protrusion 108b of the linkage plate 108 normally turns on the switch 115 provided in the flexible board 113, and immediately turns off the switch 115 when the linkage plate 108 rotates due to rotation of the inlet lever 107.

The cartridge lock mechanism is described below.

The rear end of the disk holder 104 has an elastic structure, as shown in FIG. 5, composed of protrusions 104e, 104f and an arm 104g. When the cartridge 300 is inserted, the inside protrusion 104f is pushed open by the side surface of the cartridge 300, and the outside protrusion 104e once projects to the side of the holder 100. When the notch 300c of the cartridge 300 reaches up to the position of the protrusion 104f, the protrusion 104f gets into the notch 300c, and the protrusions 104e, 104f return to the original position by the elasticity of the arm 104g.

Finally, the disk holding mechanism for guiding and holding the bare disk is described.

The disk holding mechanism is composed of the disk holder 104, holder plate spring 105, and inlet lever 107.

The disk holder 104 is a member for defining the position of the bare disk 301 in the height direction by means of a slit 104a having a slope opposite to the holder inside, and defining the position of the bare disk 301 in the radial direction by means of holding parts 104b at both ends of the slit 104a.

The disk holder 104 is rotatably engaged with the inlet lever 107 at the leading end, and protrusions 104d provided at upper and lower positions are inserted into guide grooves 100h (FIG. 4) respectively.

The inlet lever 107 is rotatably provided about a shaft 100i (FIG. 4), and the protrusion 107b is inserted into the arc groove 100g (FIG. 4), and is thrust in the inner direction of the holder 100 together with the disk holder 104 by means of the holder plate spring 105. Normally, the protrusions 104d, 107b are stopped at positions abutting against the terminal end of the holder inside of the guide groove 100h and arc groove 100g. At this time, the pair of right and left disk holders 104 are held parallel in the direction of X, and their spacing interval is set smaller than the diameter of the bare disk 301 to be inserted. The inserted bare disk 301 abuts against the leading end of the shutter opener 103, and pushes open the leading end of the inlet lever 107 and disk holder 104 while rotating the shutter opener 103 in the inner side, and moves into the slit 104a, so that the disk holder 104 returns to the original position.

At this time, the shutter opener 103 is abutting against the bare disk 301 while the switch 114 is still in the off position. From this position, when the bare disk 301 is pushed in slightly so as to extend the rear end of the disk holder 104, the protrusion 103e of the shutter opener 103 turns on the switch 114. When the bare disk 301 is released, the disk holder 104 returns to the original position.

By setting the four abutting portions 104b wider than the diameter of the bare disk 301 to maintain a certain gap relative to the outer circumference of the disk, and also setting the width of the slit 104a at a specific gap relative to the thickness of the disk, the disk can be rotated while the disk holder 104 remains at the original position.

When the cartridge 300 is inserted, a corner of the cartridge 300 tilts the inlet lever 107 toward the inner side of the holder. A dent 107a is formed in the abutting surface, so that it is possible to push and tilt smoothly. When the inlet lever 107 rotates, the disk holder 104 also moves, and the leading end of the disk holder 104 opens widely. Further, when the cartridge 300 is inserted, the disk holder 104 is also pushed and tilted by the cartridge 300, and the disk holder 104 and inlet lever 107 are linearly stored at the right and left sides of the holder 100, so that the path for the cartridge 300 is cleared.

In this construction, the disk holder 104 is waiting at a position capable of holding the bare disk 301, and when the cartridge 300 is inserted, the inlet lever 107 is pushed by its corner, and the disk holder 104 is stored at the right and left sides of the holder In the holder case 101, a cartridge thrusting spring 120 is assembled, and the leading end corner of the inserted cartridge 300 is pushed in a direction toward the holder cover 102 (direction of Z1).

The construction of the clamp unit is described below.

Figure 6:
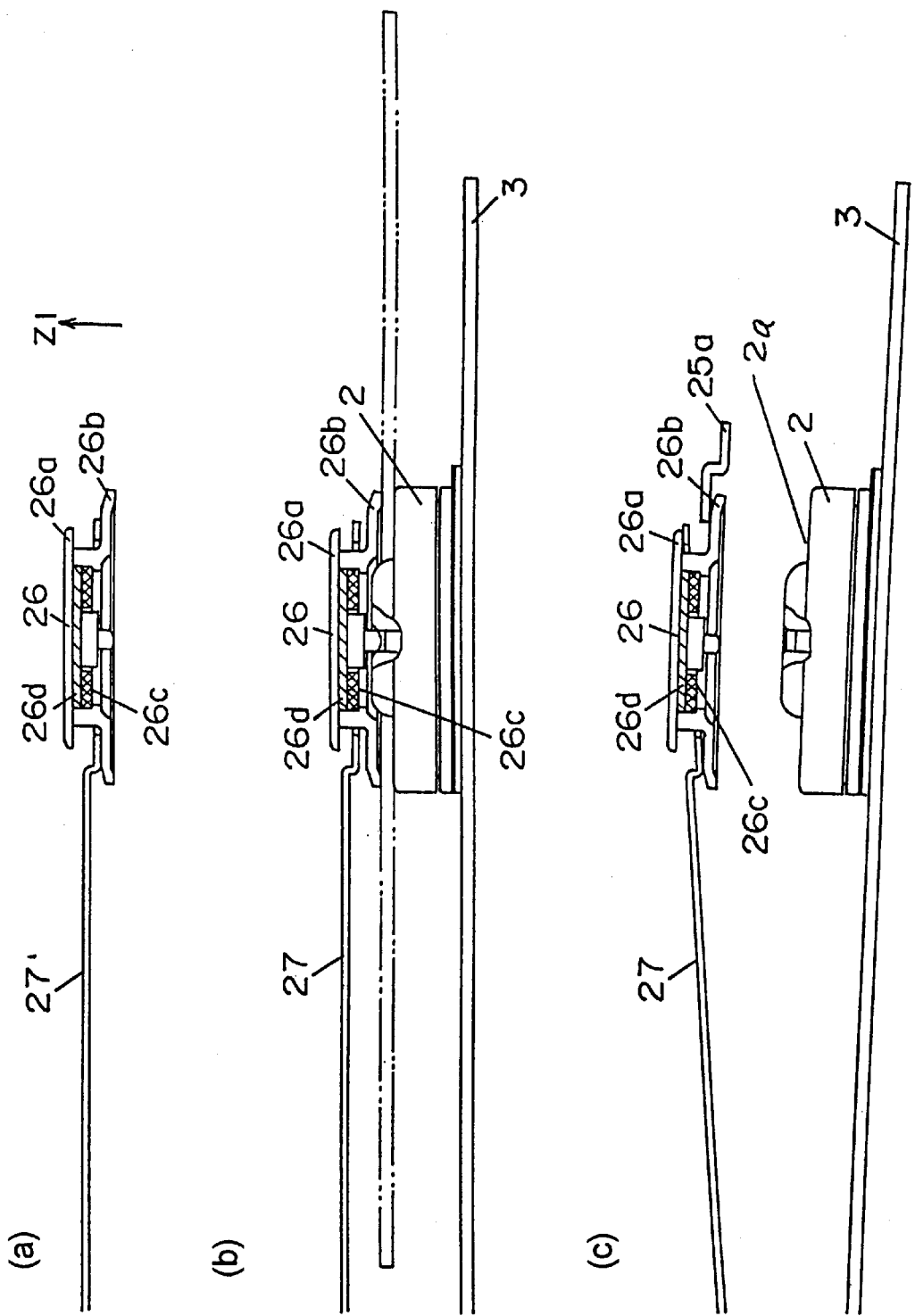
FIGS. 6(a), (b), and (c) are sectional views of essential parts of a damper of the disk loading device.

FIG. 6(a) shows a construction of a damper 26. In a damper body 26b positioned in the central hole of a clamp lever 27 made of a magnetic material, a magnet 26c is contained together with a magnetic member 26d, and fixed by a clamp cover 26a. In this state, the damper 26 is magnetically stable in relation to the clamp lever 27, and the magnetic member 26d and the clamp lever 27 float magnetically in departing directions on both sides of the magnet 26c.

FIG. 6(b) shows the disk motor 2 is near the damper 26, in which the damper 26 is attracted by the magnetic member of the disk motor 2, and magnetic flotation with the clamp lever 27 is cleared, and in the presence of the disk, it is attracted magnetically onto the turntable of the disk motor 2 by means of the damper 26.

FIG. 6(c) shows the disk motor 2 having the magnetic member near the damper is not present near the damper 26, in which the bent portion 25a of the top plate 25 abuts against the damper 26, and the damper 26 is magnetically stable in relation to the clamp lever 27, and floats magnetically to depart from the disk motor 2.

Figure 7:
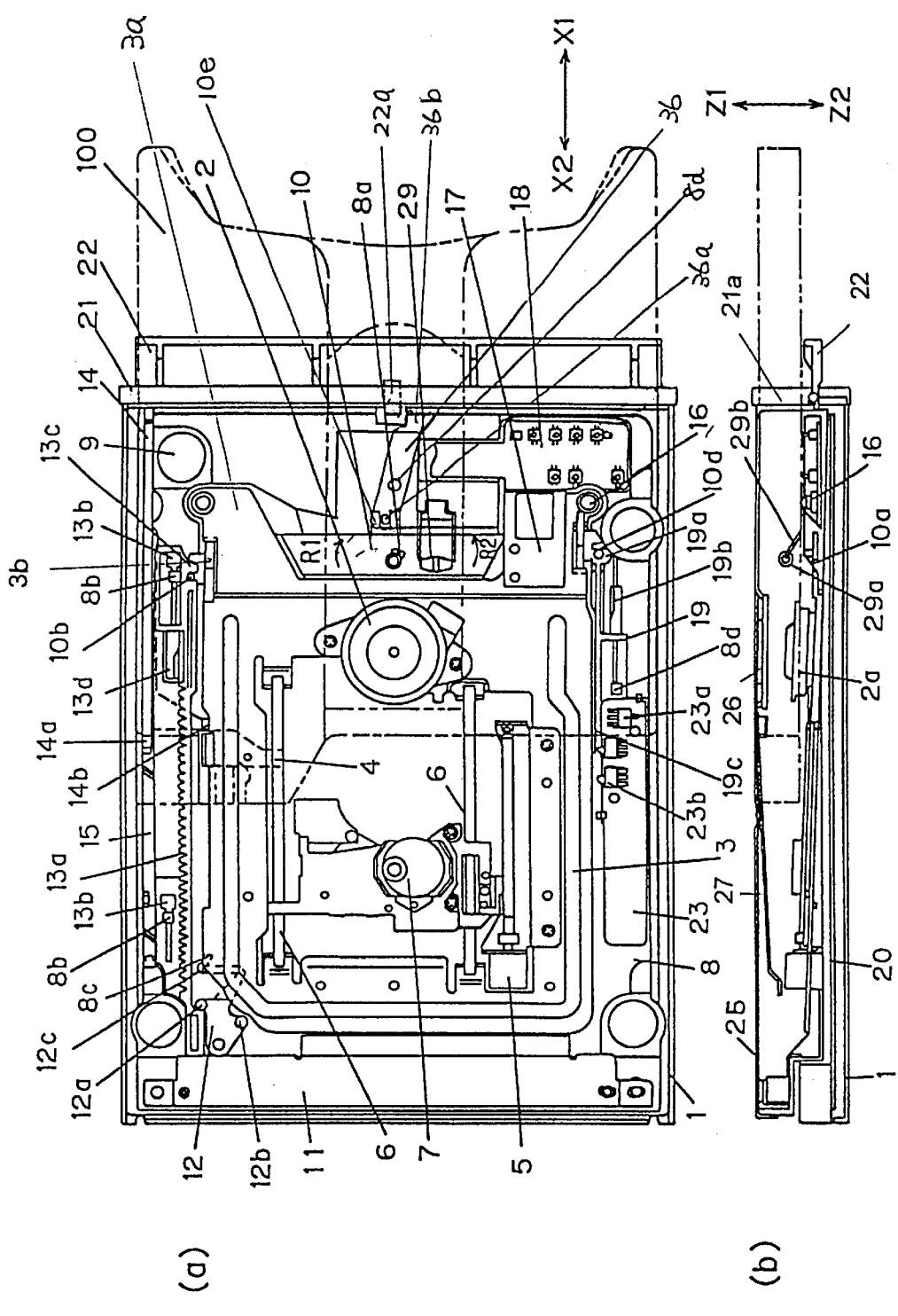
FIG. 7(a) is a plan view showing a constitution of the base unit of the disk loading device.
FIG. 7(b) is its side view.

FIG. 7 is a diagram showing the base unit of the disk loading device of the invention, in which FIG. 7(a) is a plan see-through view showing only the base unit, and FIG. 7(b) is a side sectional view.

Figure 8:
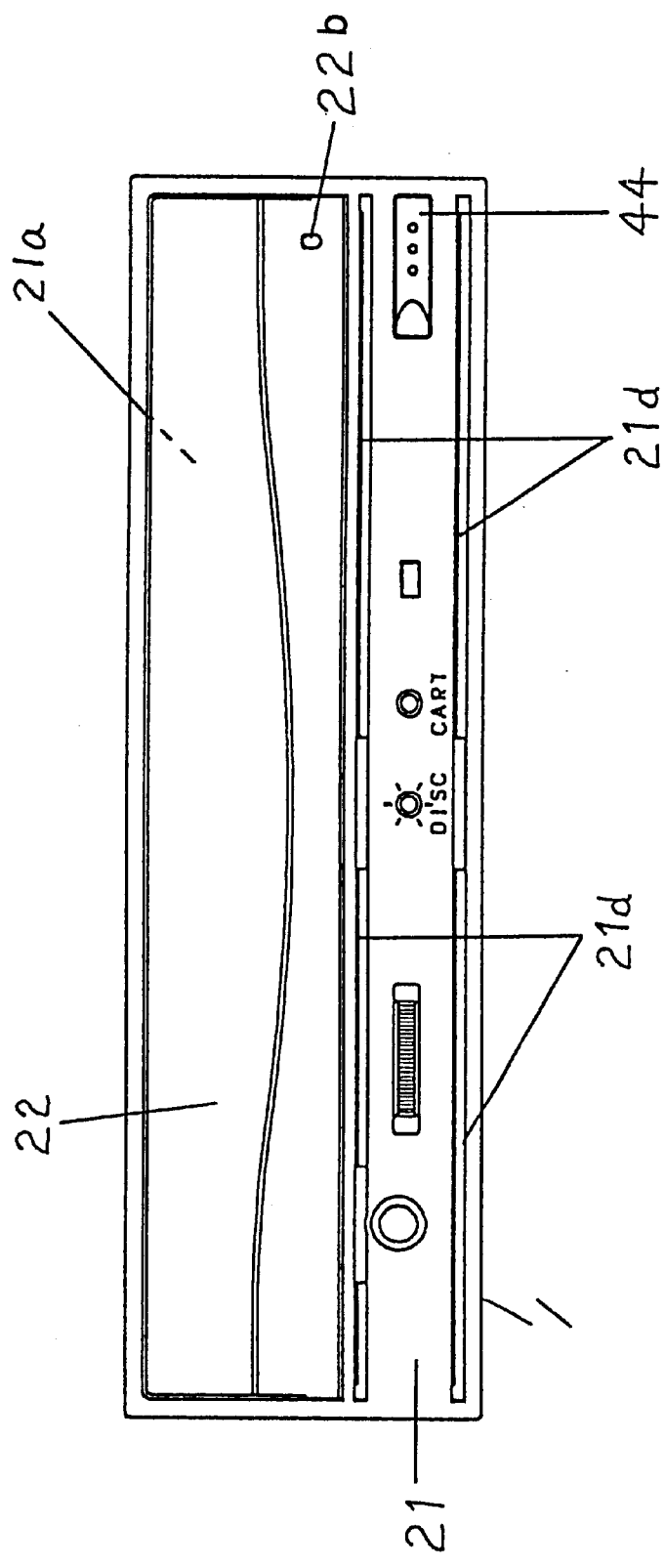
FIG. 8 is a front view of the casing of the base.

FIG. 8 is a front view of a casing of the disk loading device.

In FIG. 7(a), reference numeral 1 is a casing of the disk loading device, which comprises a printed circuit board 20 mounting circuit parts for recording and reproducing, a panel 21, and a shutter 22 for closing a front opening 21a of the casing 1 when storing the holder 100.

Reference numeral 8 is a base, which is elastically supported on the casing 1 through a damper 9 in order to lessen the vibration or impact from outside. A chassis 3 is provided with a torsion leaf 11, and the torsion leaf 11 is attached to the base 8 so that the leading end 3a of the chassis 3 may be always thrust in the direction of Z2.

At the front side of the casing 1 shown in FIG. 8, the panel 21 and the shutter 22 for closing the front opening 21a of the casing 1 when storing the holder 100 are provided. The panel 21 includes an eject button 44 for loading and unloading the holder 100, and a cooling air inlet hole 21d for the circuit board 20 mounting circuit parts for recording and reproducing. The shutter 22 has a forced eject hole 22b for taking out the cartridge 300 or bare disk 301 in power off state.

As shown in FIGS. 7(a) and(b), an elevating cam 10 is rotatably supported by a shaft 8a of the base 8, and when the elevating cam 10 is rotated in the direction of arrow R1 by driving means composed of a reduction gear (gear train) 112 provided in the holder 100 and loading motor 111 (see FIG. 2), it is engaged with a slit 3b of the chassis 3 by an inclined rib (slope) 10a, and the leading end 3a of the chassis 3 is pushed up in the direction of Z1 by overcoming the spring thrusting force of the torsion leaf 11, so that the chassis 3 is set nearly horizontal. At this time, the chassis 3 is supported on the horizontal surface of the end of the slope 10a. When the elevating cam 10 is rotated in the direction of arrow R2, along the slope 10a of the elevating cam 10, the chassis 3 is inclined from the horizontal position to the direction of Z2 by the spring thrusting force of the torsion leaf 11. Between the elevating cam 10 and the base 8, a head unit thrusting spring 40 (not shown) is provided, and the holder 100 is thrust by spring against the top plate 25 through the chassis 3.

A slide rack 13 has a rack 13a to be meshed with the driving gear 112a (see FIG. 2) provided at its upper surface, and is engaged with the protrusion 8b of the base 8 to be held slidably in the direction of X, and is engaged with a pin 10b of the elevating cam 10 at a groove 13c. When the slide rack 13 is fixed by the engagement between a pawl 12c of the clutch 12 and the protrusion 8c of the base 8, the holder 100 is movable, and when the engagement between the pawl 12c of the clutch 12 and the protrusion 8c of the base 8 is cleared, the slide rack 13 slides and the elevating cam 10 is rotatable.

Figure 9:
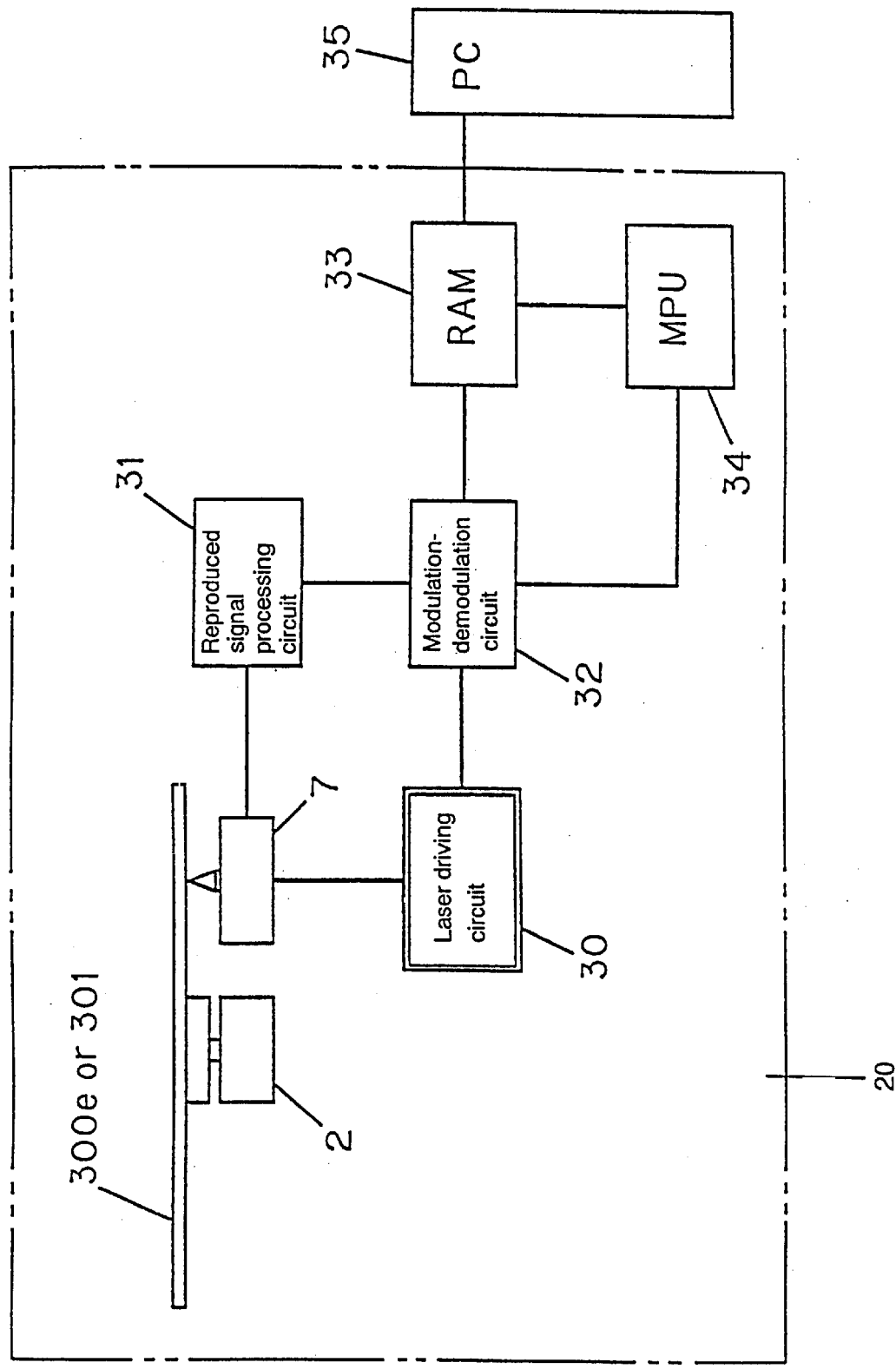
FIG. 9 is a block diagram of the disk loading device.

The inclined rib 10a of the elevating cam 10 abuts against the switch 23b for drive detection upon completion of loading operation when the holder 100 is stored completely and the chassis 3 is nearly horizontal, and a microprocessing unit (MPU) 34 shown in FIG. 9 commands stopping of the driving means.

A stopper 36 is rotatably supported on the shaft 8d of the base 8, and a shaft 36a at one end is engaged with a guide groove 10e of the elevating cam 10 to compose a link mechanism. A rib 36b at other end is at a position confronting the protrusion 22a of the shutter 22, and during loading operation for putting the holder 100 into the device, in the closed state of the shutter 22, the protrusion 22a is apart from the rib 36b, and therefore rotation of the elevating cam 10 and stopper 36 is not impeded, and in the open state of the shutter 22, the protrusion 22a abuts against the rib 36b of the stopper 36, thereby impeding the rotation of the elevating cam 10 and stopper 36.

A forced eject lever 14 is thrust in the direction of X1 by means of a forced eject spring 15, and is held slidably in the direction of X between the base 8 and the slide rack 13, and has a pawl 14a to be engaged with the lower engaging portion (not shown) of the holder 100 at its leading end. When taking out the media contained in the holder 100 in the device during power failure or power off state, a pin is inserted into a forced eject hole of the panel 21 (indicated by 22b in FIG. 8) in the direction of X2 while compressing the forced eject spring 15, and when the pawl 14a is engaged with the lower engaging portion of the holder 100, the holder 100 is discharged from the device by overcoming the load in the drive system. Thereafter, when the holder 100 is pulled by hand up to the discharge position, the cartridge 300 or bare disk 301 contained in the holder 100 can be taken out.

A disk defining member 29 is composed of a roller 29a made of rubber of lower hardness than polycarbonate of the disk material, and a coil spring 29b, and contacts with the bare disk 301 contained in the holder 100 and the disk 300e in the cartridge 300, between the discharge completion position and storage completion position of the holder 100, defines the position of the chassis 3 obliquely thrust to the base 8 and these disks to be nearly parallel to each other, and prevents contact with the turntable 2 on the chassis 3. When the holder 100 is completely stored in the disk loading device, the lower surface (not shown) of the holder 100 and the roller 29a contact with each other, and the disk defining member 29 is stored in the base 8, and definition of these disks by the disk defining member 29 is cleared.

The base 8 further includes a clutch 12 for changing over the motion of the slide rack 13, and a drive detecting circuit board 23 comprising a switch 23a for detecting completion of discharge of the holder 100 and a switch 23b for detecting completion of storage of the holder 100.

The operation of the drive mechanism is described in detail later.

The chassis 3 includes the integral type disk motor 2 having the turntable 2a (in FIG. 6), guide shaft 6, feed motor 5, cartridge detection circuit board 18 elastically supported through a switch circuit board support 17, and positioning pin 16 for the cartridge 300. On the surface of the turntable 2a confronting the damper 26, a magnetic element (not shown) is provided, and an attracting force is created against the magnet 26c in the clamper 26.

On the guide shaft 6, a head transfer lever 4 is provided so as to be movable in the direction toward the chassis 3, with one end abutting to the optical head 7 and other end to the forced eject lever 14.

The optical head 7 is mounted on the guide shaft 6, and is moved back and forth in the direction of X1 and X2 by means of the feed motor 5, and includes a laser emitting unit for recording and reproducing, and a detecting unit for receiving the reflected light from the disk (300e or 301).

Inside of the damper 26 provided in the top plate 25, a magnet 26c for holding the disk is attached to the turntable 2a. The clamp 26 is thrust in a direction departing from the turntable 2a by a clamp pressure spring (not shown) through the clamp lever 27 projecting from the top plate 25 to the holder 100 side. The top plate 25 is attached to the base 8 by means of mounting means such as stopping pawl, and when the holder 100 moves from the discharge completion position to the storage completion position, the clamp lever 27 is pressed by an operating piece (linkage part) 101a of the holder 100, and the clamp 26 rotates by overcoming the clamp pressure spring to press each disk to the center cone of the turntable 2a. On the other hand, when the holder 100 begins to move toward the discharge position side, the operating piece 101a departs from the clamp lever 27, so that the damper 26 departs from the turntable 2a. In the case of the type, meanwhile, having a magnetic metal hub at the disk side, having a magnet at the turntable 2a side, and holding the disk by attracting the metal hub by this magnet, the damper 26 is not necessary, and therefore necessary mechanism may be added depending on each type.

FIG. 9 is a block diagram of the main chassis 3 and circuit board 20 of the disk loading device of the embodiment. That is, a laser drive circuit 30 operates, and the optical head 7 emits laser to the disk (300e or 301), the detecting unit of the optical head 7 receives the signal from the disk, and it is processed in a reproduction signal processing circuit 31. Reference numeral 32 is its modulation-demodulation circuit, 33 is a RAM of memory, 34 is a micro-processing unit (MPU), and 35 is a personal computer (PC).

Figure 10:
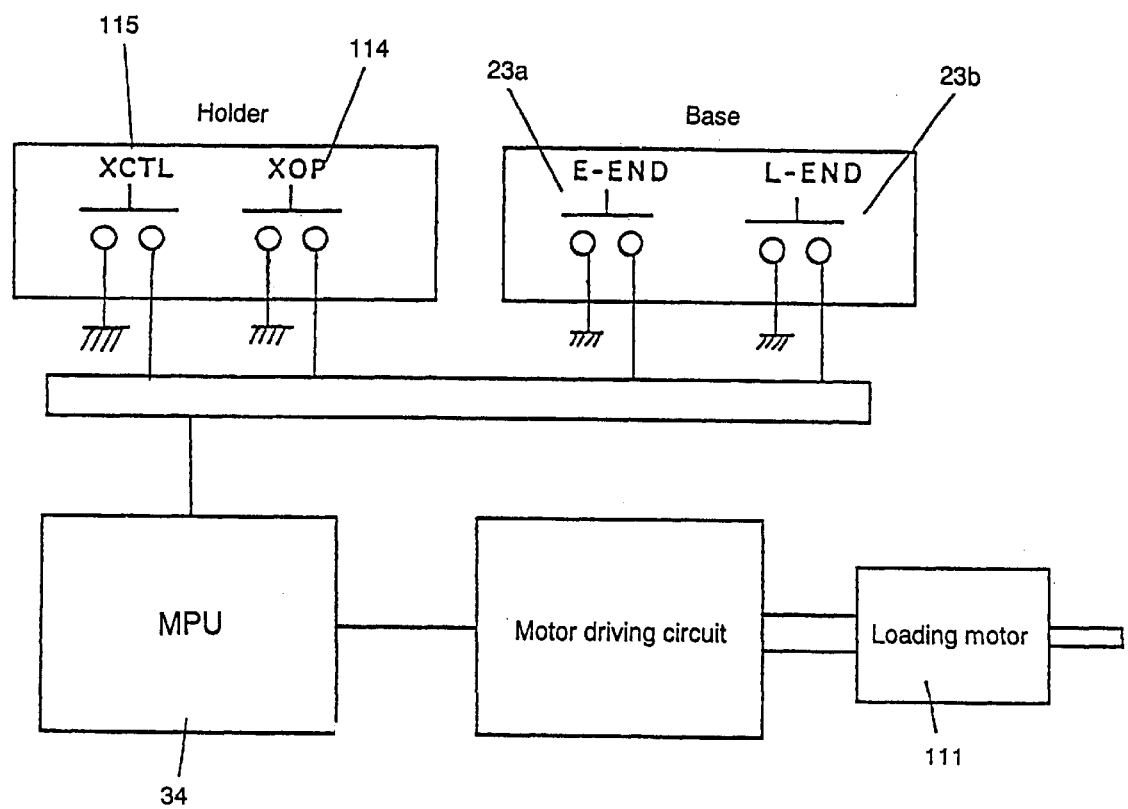
FIG. 10 is a wiring diagram of the switch.

FIG. 10 is a structural diagram showing each switch wiring of the holder 100 and base 8. Switches 114 and 115 of the holder 100 are monitored, together with the switches 23a, 23b of the base 8, by the micro-processing unit 34.

FIG. 11 shows the method of judging the type and state of the media stored in the holder 100 by using the two switches, 114 and 115, in the eject state of the holder 100 without moving the media into the device. Therefore, immediately after storing the media in the holder 100, the lens of the optical head can be changed over, or the starting procedure may be changed depending on the disk, so that the loading time is shortened. Moreover, abnormality can be detected, and by prohibiting driving of the loading disk 111, breakage of the device can be prevented.

In the constructed disk loading device, the operation thereof is described below.

FIG. 12 is a perspective view showing the mode of media insertion. By the construction of the holder 100 described above, the loading mechanism can be used in both vertical and horizontal positions. FIGS. 12(a) and (b) show the insertion of cartridge, and (c) and (d) show the insertion of bare disk 301.

When the eject button 44 (see FIG. 8) provided on the front side of the device is pressed, the holder 100 is pulled up to the position shown in the diagram to be postponed in the waiting state for insertion of media. In this state, when the eject button 44 is pressed again, or the holder 100 is pushed in, the holder 100 is drawn into the device.

a) Loading action when media is not installed in the holder.

FIG. 13(a) to FIG. 15(b) are plan views of the loading operation when media is not installed in the holder 100, and (a) and (b) in each show the action state in the time series.

Figure 15:
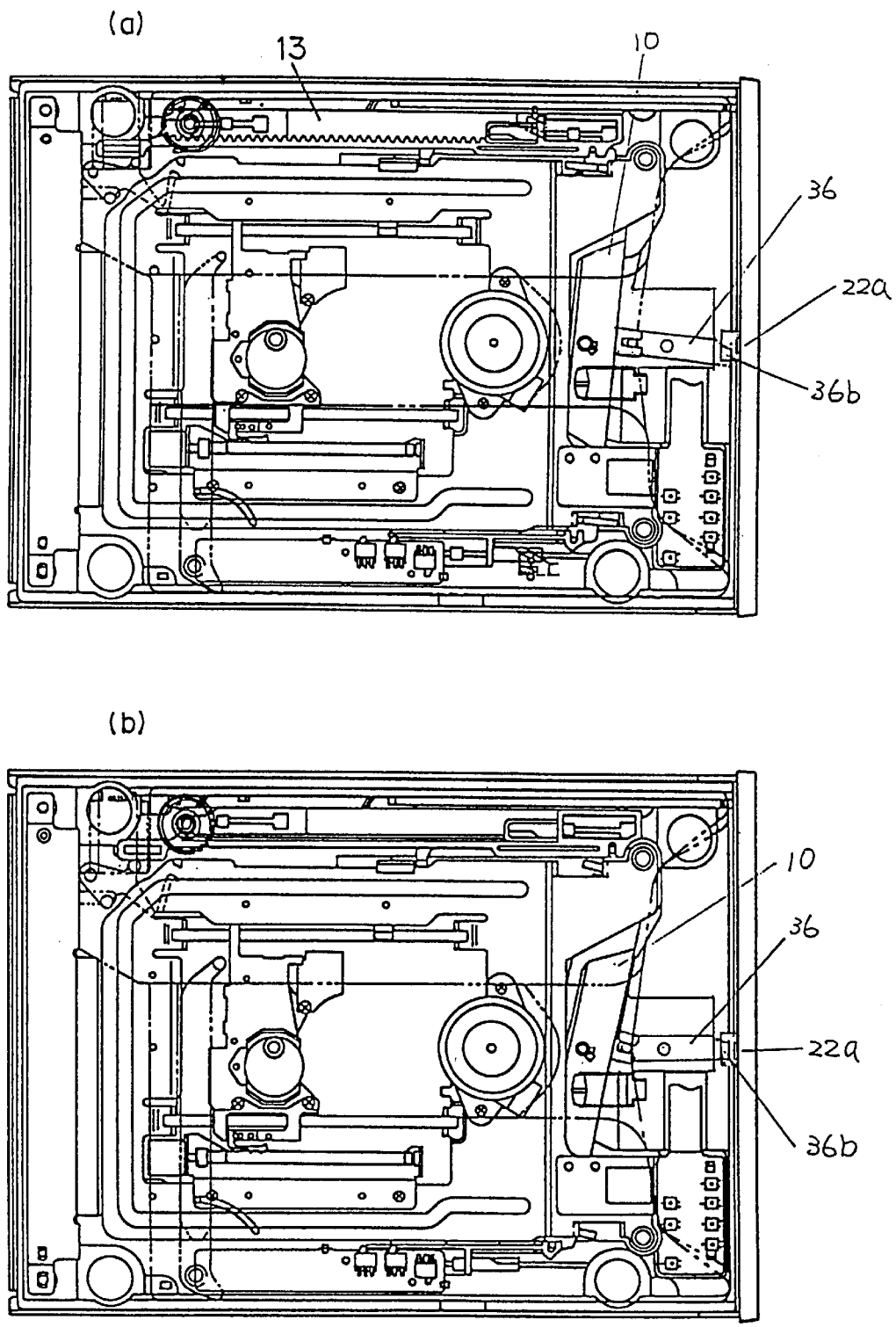

FIGS. 16(a)–(c) and FIGS. 17(a)–(c) are detailed plan views of the upper part of the disk loading device while media is not installed in the holder 100, and (a) to (c) in each correspond to the symbols in FIG. 13 to FIG. 15, respectively.

Figure 18:
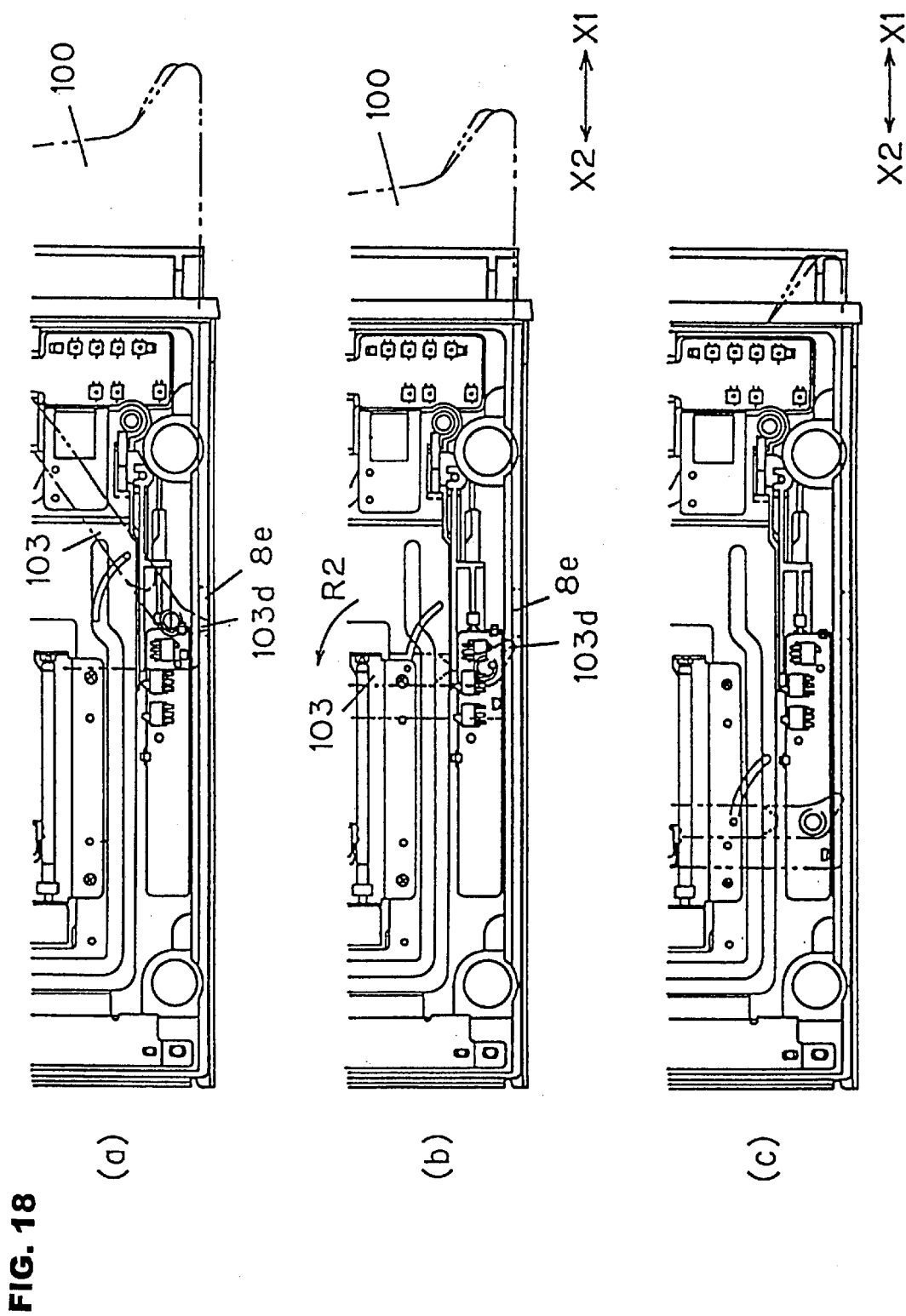
FIG. 18 and FIGS. 19, (a) to (c) each, are see-through plan views showing a time series state of loading action in the lower part of the disk loading device, and FIGS. 20(a), (b), (c), and (d) are side sectional views showing a time series state of the loading action.
Figure 19:
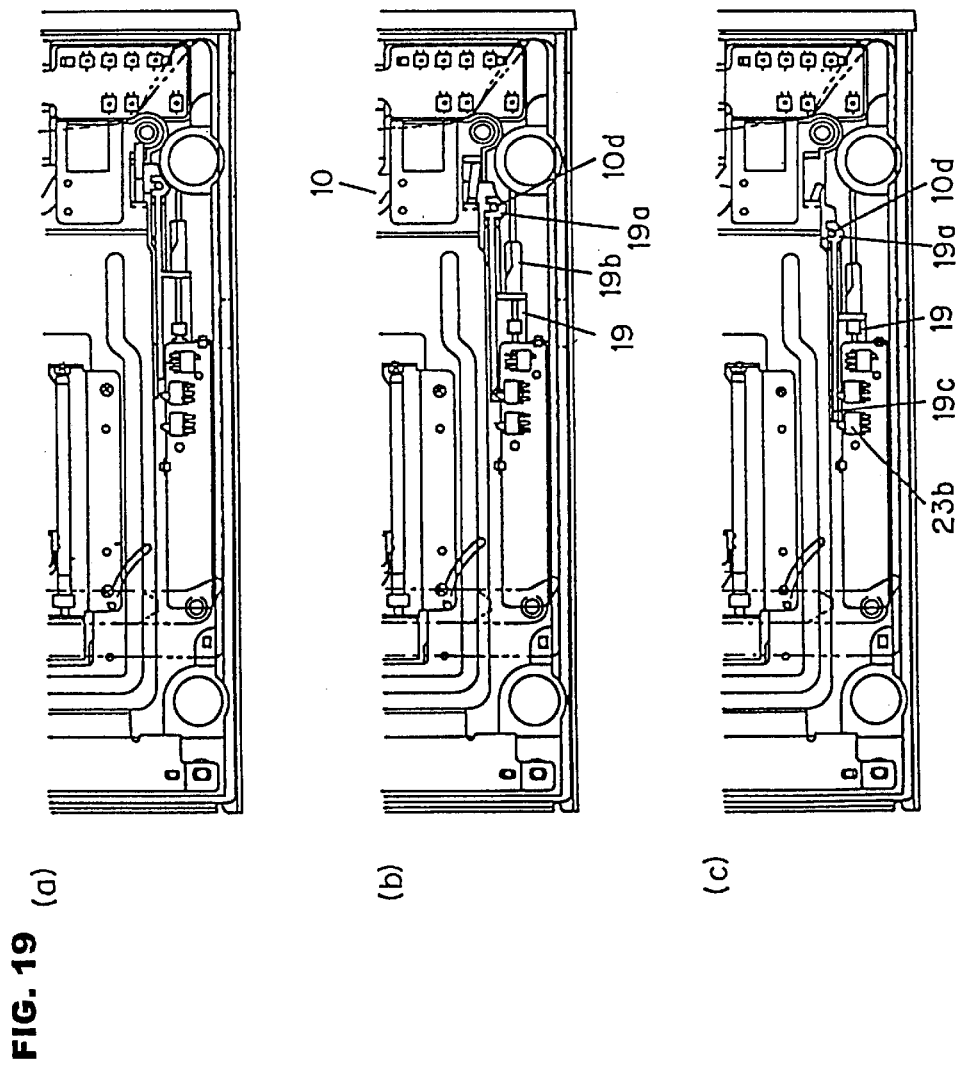

FIG. 18 and FIG. 19 are detailed plan views of the lower part of the disk loading device while media is not installed in the holder 100, and (a) to (c) in each correspond to the symbols in FIG. 13 to FIG. 15, respectively.

Figure 20:
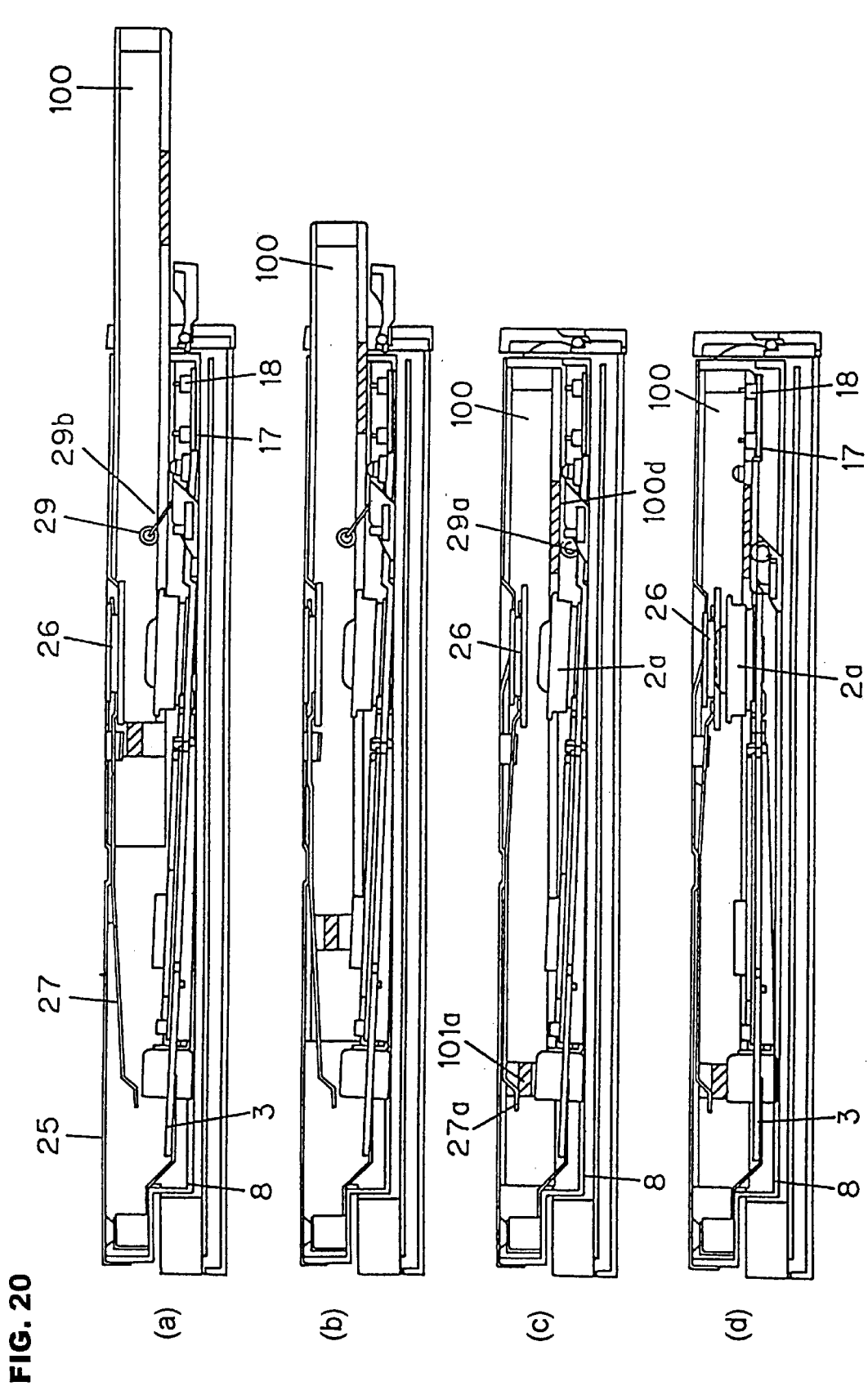

FIG. 20 is a side sectional view of loading operation when media is not installed in the holder 100. In the diagram, (a) to (d) show the time series actions.

Figure 16:
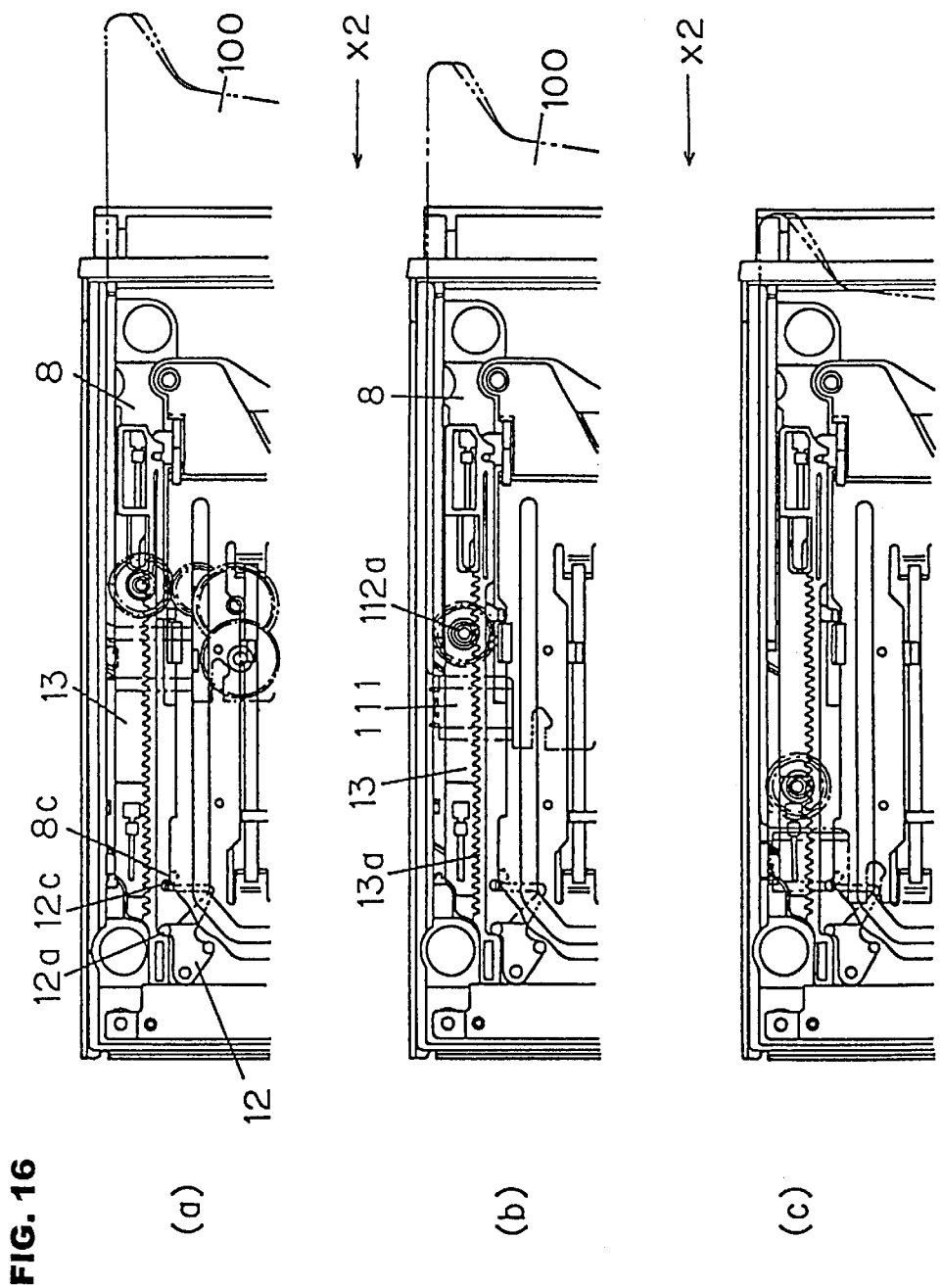
FIG. 16 and FIGS. 17, (a) to (c) each, are see-through plan views showing a time series state of loading action in the upper part of the disk loading device.

FIG. 13(a) shows the discharge completion state of the holder 100. The protrusion (or rib) 100a at the lower side of the holder 100 abuts against the switch 23a on the drive detection switch circuit board 23, and stops accurately at the discharge position of the holder 100. In this state, either the bare disk or the cartridge is installed selectively. In the state in FIG. 13(a), as shown in FIG. 16(a), the pawl 12c of the clutch 12 is engaged with the rib 8c of the base 8, and the boss 12a defines sliding of the side rack 13, and is fixed on the base 8. Also, as shown in FIG. 18(a), the protrusion 103d of the shutter opener 103 is provided rotatably, in coincidence with the relief hole 8e of the side of the base 8. When the cartridge 40 is put in the holder 100, the shutter opener 103 rotates depending on the insertion of the cartridge 300 into the holder 100, so that the shutter 22 can be opened.

In this state, as shown in FIG. 20(a), the chassis 3 obliquely abuts against the base 8, and the damper 26 is pressed against the top plate 25 through the clamp lever 27 by the thrusting force of the clamp pressure spring. The cartridge detection circuit board 18 is pressed against the bottom side of the base 8 by the thrusting force of the switch circuit board support 17. The disk defining member 29 is lifted from the base 8 to the central opening in the holder 100 by the returning force of the coil spring 29b.

The rib 36b of the stopper 36 composing the link mechanism as being engaged with the guide groove 10e of the elevating cam 10 and the protrusion 22a of the shutter 22 are at separate positions, so that the action from the open state to the closed state of the shutter 22 may not be impeded.

FIG. 13(b) shows the storage start state of the holder 100. As shown in FIG. 16(b), when the eject button 44 (see FIG. 8) of the panel 21 is pressed and the loading motor 111 in the holder 100 is put into rotation, the driving force is transmitted from the gear group (gear train) 112 to the driving gear 112a, and it is engaged with the rack 13a of the slide rack 13 fixed on the base 8, so that the holder 100 begins to move in the direction of X2. At this time, as shown in FIG. 18(b), the protrusion 103d of the shutter opener 103 departs from the side hole 8e of the base 8, and when the bare disk 301 is installed in the holder 100 or media is not installed yet, the shutter opener 103 rotates in the direction of R2 up to the position not interfering with the bare disk 301. In this state, as shown in FIG. 20(b), the holder 100 is gradually put into the device.

FIG. 14(a) shows a state of the holder 100 being further stored into the disk loading device.

Figure 17:
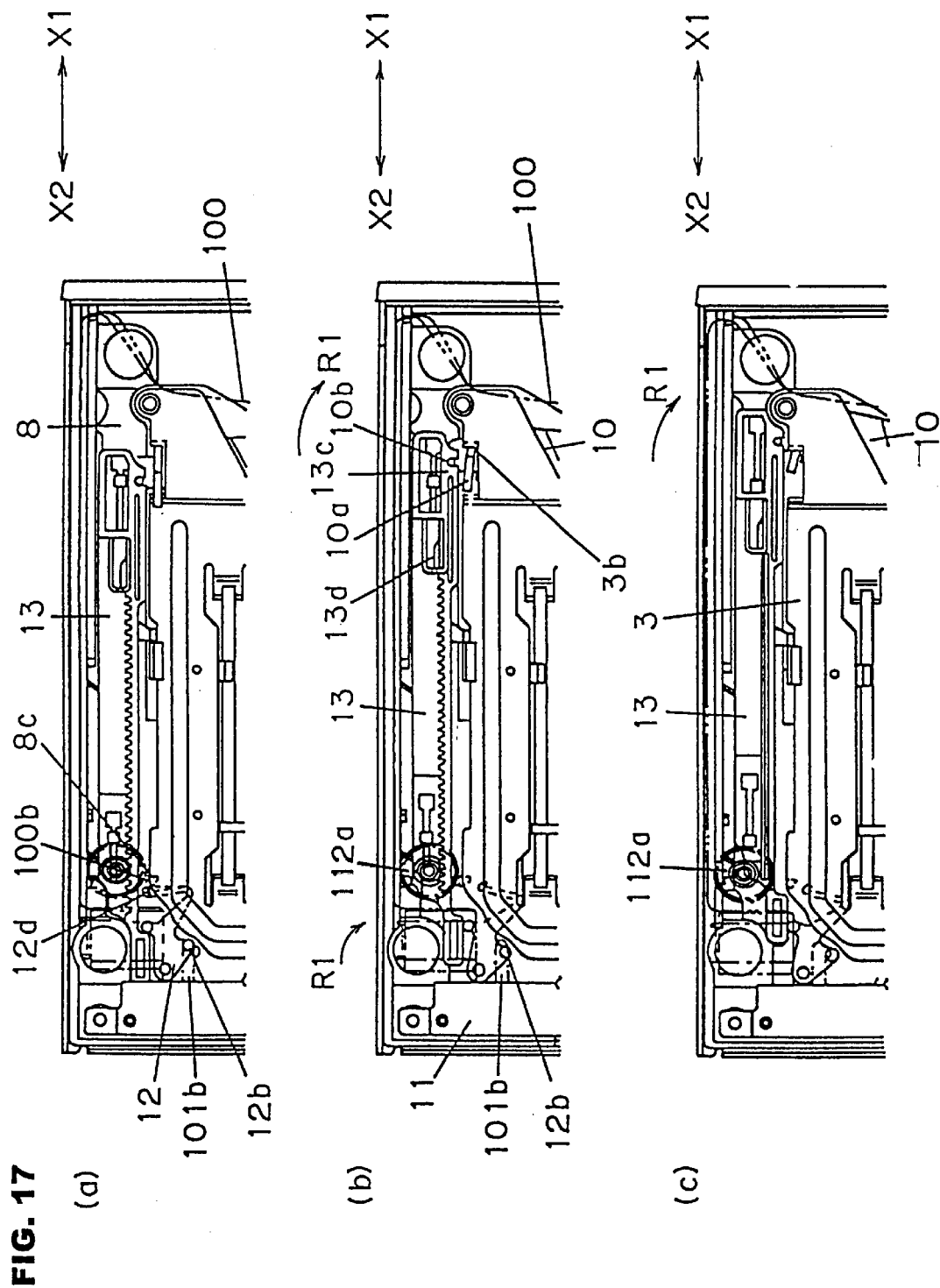

FIG. 14(b) shows the storage completion state of the holder 100 in the disk loading device. As shown in FIG. 17(a), the rib 100b at the lower side of the holder 100 abuts against the pawl 12d of the clutch 12, and clears engagement with the rib 8c of the base 8. As a result, restraint by the clutch 12 of the slide rack 13 is released, and thereafter it is allowed to slide in the direction of X1. At this time, the shutter 22 is closed, but the rib 36b of the stopper 36 and the protrusion 22a of the shutter 22 are still at separate positions.

At the same time, an irregular hole 101b of the holder 100 and the boss 12b of the clutch 12 are engaged with each other as shown in FIG. 17(a). In this state, as shown in FIG. 20 (c), the rib (linkage part) 101a of the holder 100 and the end 27a of the clamp lever 27 abut against each other, and the clamp lever 27 rotates about the clamp pressure spring, and the damper 26 descends to the position confronting the turntable 2a.

The roller 29a of the disk defining member 29 abuts against the lower side of the holder 100, and the disk defining member 29 is stored in the base 8.

FIG. 15(a) shows the action of the slide rack 13 after completion of storage of the holder 100 in the disk loading device. As shown in FIG. 17(b), the slide rack 13 slides in the direction of X1 owing to the driving force of the driving gear 12a, and the boss 12b of the clutch 12 engaged with the slide rack 13 rotates in the direction of R1 to define the action in the direction of the holder 100 within the irregular hole 101b of the holder 100, so that the holder 100 is held in the specified position of the base 8. Along with the motion of the slide rack 13 in the direction of X1, when the elevating cam 10 engaged with the pin 10b and groove 13c of the slide rack 13 rotates in the direction of R1 about the shaft 8a of the base 8, the chassis 3 abuts against the inclined rib 10a in the groove (slit) 3b of the chassis 3, and is gradually lifted from the inclined state to a nearly horizontal state along with the rotation of the elevating cam 10 while resisting the thrusting force of the torsion leaf 11.

At the same time, along with the rotation of the elevating cam 10, the stopper 36 also rotates, and the rib 36b comes closer to the confronting position from the position remote from the protrusion 22a of the shutter 22. At this time, if the shutter 22 is intentionally opened, the rib 36b of the stopper 36 and the protrusion 22a of the shutter 22 abut against each other, and the action of the elevating mechanism 10 forming the link mechanism together with the stopper 36 is arrested, so that loading is not completed. By the micro-processing unit 34, when the loading motor 111 is stopped or inverted, the risk of touching the rotating bare disk 301 can be avoided.

FIG. 15(b) shows the moving completion state of the slide rack 13. As shown in FIG. 17(c), the movement of the slide rack 13 in the direction of X1 by the driving force of the driving gear 112a is completed, and the chassis 3 rides on the horizontal surface of the inclined rib 10a by the rotation of the elevating cam 10 in the direction of R1, so that the chassis 3 is nearly in horizontal state. The inclined rib 10a of the elevating cam 10 abuts against the drive detection switch 23b upon completion of loading action when the chassis 3 is nearly horizontal, and the micro-processing unit (MPU) 34 stops the loading motor 111. In this state, as shown in FIG. 20(d), when the rotation of the chassis 3 is complete, the chassis 3 is nearly horizontal, and the turntable 2a on the chassis 3 ascends to the position confronting the damper 26, and the cartridge detection circuit board 18 is raised from the base 8 by the returning force of the switch circuit board support 17 to reach the specified position in the holder 100, thereby completing the loading operation.

At the same time, the stopper 36 rotates along with rotation of the elevating cam 10, and the rib 36b stops at a position confronting the protrusion 22a of the shutter 22 at a specified distance. When the shutter 22 is at the fixed side and the stopper 36 is at the movable side through the damper 9, an impact variation portion must be taken into consideration as the abutting distance of the two. In this state, since the rib 36b and the protrusion 22a are close to each other, if an individual attempts to open the shutter 22 intentionally within this abutting distance, it is not opened widely, and the opening gap is too small to admit a finger, and thus the risk of touching the rotating bare disk 301 can be avoided.

Figure 22:
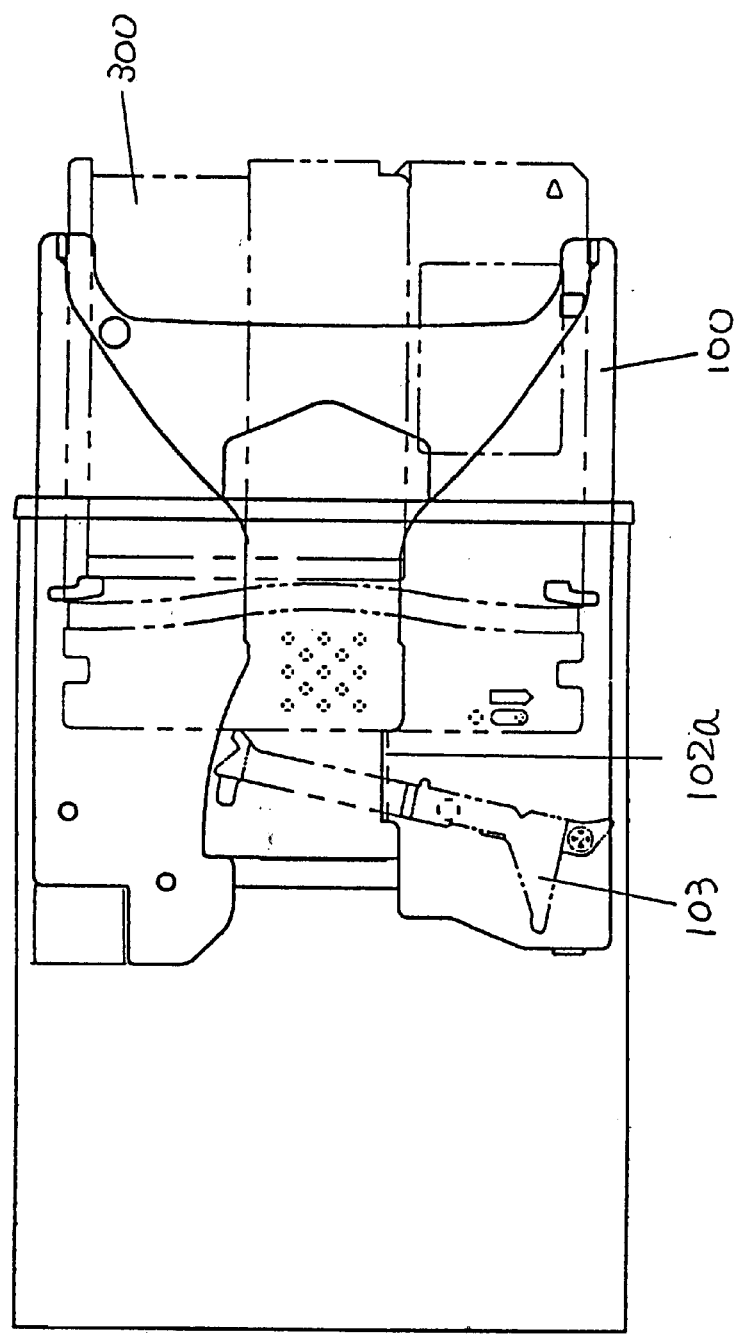

The discharge action of the holder 100 is performed in the completely reverse procedure of the above operation. When the loading motor 111 rotates in the reverse direction, the slide rack 13 moves in the direction of arrow X2, and the elevating cam 10 rotates in the direction of R2, while the chassis 3 rotates in the direction of Z2. When moving of the slide rack 13 in the direction of X2 is complete, the holder 100 begins to move in the direction of X1 by the driving force of the driving gear 112a, and the boss 12b of the clutch 12 restraining the holder 100 by the irregular hole 101b of the holder 100 begins to rotate in the direction of R2. By rotation of the clutch 12 in the direction of R2, the pawl 12c of the clutch 12 is engaged with the boss (protrusion) 8b of the base 8, and the slide rack 13 is fixed to the base 8 through the boss 12a of the clutch 12. Thereafter, the holder 100 is discharged from the disk loading device until the rib 100a at the lower side of the holder 100 abuts against the switch 23a of the drive detection circuit board 23, and stops at the holder discharge completion position shown in FIG. 13(a).

b) Loading action when cartridge is inserted in the holder in wrong direction or wrong side FIG. 21(a) shows insertion of the cartridge 300 in the holder 100 in the normal position, FIG. 21(b) shows insertion of the cartridge 300 in the holder 100 on the wrong side, and FIG. 22 shows insertion of the cartridge 300 in the holder 100 in the wrong direction.

As shown in FIG. 21(a), a reverse insertion preventive rib 102a is disposed so as not to contact with the opening (linkage part) 300d of the cartridge 300 inserted in normal position, and the stored disk 300e.

As shown in FIG. 21(b), when the cartridge 300 is inserted in the holder 100 in wrong side, in the case of the both-side opening type in which the shutter engaging portion 300b and the leading end (rib) 103b of the shutter opener 103 abut against each other on the face and back sides of the cartridge 300, the cartridge 300 is put into the holder 100 without problem.

When the cartridge 300 of one-side opening type or the both-side opening type other than mentioned above is inserted into the holder 100, the shutter opener 103 rotates without opening the shutter 300a. In the mist of rotation of the shutter opener 103, when the reverse insertion preventive rib 102a abuts against the shutter 300a, insertion of the cartridge 300 is impeded, and complete insertion into the holder 100 is not realized. In this state, the cartridge 300 is inserted halfway in the holder 100, and at the rear end of the disk holder 104, the inside protrusion 104f is pushed open by the side of the cartridge 300, and the outside protrusion 104e projects to the side of the holder 100 to be engaged with the side hole 8h of the base 8, so that the movement of the holder 100 into the device is restrained.

When the cartridge 300 is pulled out of the holder 100, the restraint of the holder 100 is released in the reverse procedure of this operation.

Also, as shown in FIG. 22, when the cartridge 300 is inserted into the holder 100 in wrong direction, by the insertion of the holder 100, the shutter opener 103 rotates without opening the shutter 300a, and the reverse insertion preventive rib 102a abuts against the shutter 300a, and the insertion of the cartridge 300 is impeded, and complete insertion into the holder 100 is not realized. The cartridge 300 is inserted halfway in the holder 100, and at the rear end of the disk holder 104, the inside protrusion 104f is pushed open by the side of the cartridge 300, and the outside protrusion 104e projects to the side of the holder 100 to be engaged with the side hole 8h of the base 8, so that the move of the holder 100 into the device is restrained.

When the cartridge 300 is pulled out of the holder 100, the restraint of the holder 100 is released in the reverse procedure of this operation.

(Embodiment 2)

FIG. 23 shows, in the disk loading device in embodiment 1, an example of displaying the type and storage state of the media in a display panel 21, immediately after inserting the media in the holder 100, as being judged by shutter opening means and its position detecting means of the cartridge 300 provided in the holder 100, and holding means (holding mechanism) and its posture detecting means of the bare disk 301.

FIG. 23 (a) shows character display of liquid crystal or the like in the panel 21, and FIG. 23(b) shows a case of adding other display function such as LED to the panel 21.

(Embodiment 3)

Figure 24:
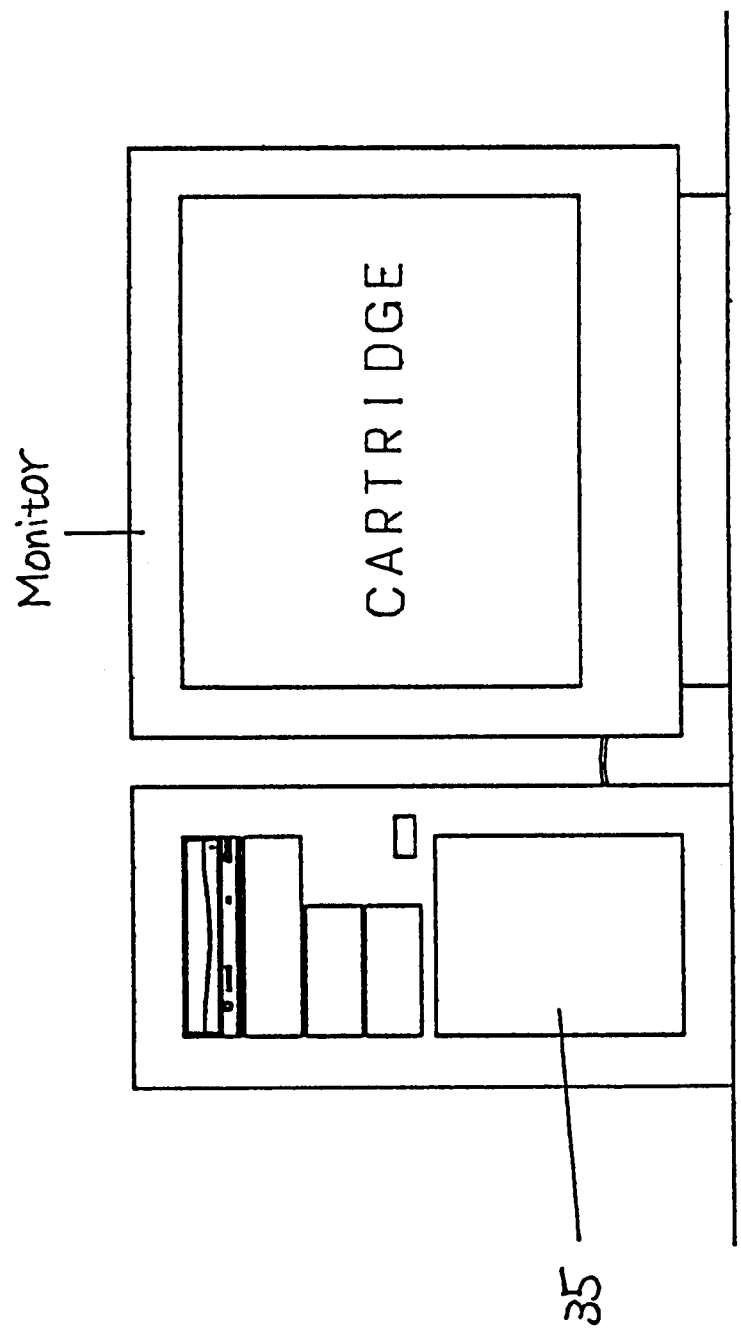
FIG. 24 is a front view of a personal computer in embodiment 3 of the invention.

FIG. 24 shows, in the disk loading device in embodiment 1, an example of displaying the type and storage state of the media in external output display means, immediately after inserting the media in the holder 100, as being judged by shutter opening means and its position detecting means of the cartridge 300 provided in the holder 100, and holding means and its posture detecting means of the bare disk 301.

From the disk loading device, it is displayed in an external monitor through a personal computer 35.

(Embodiment 4)

Figure 25:
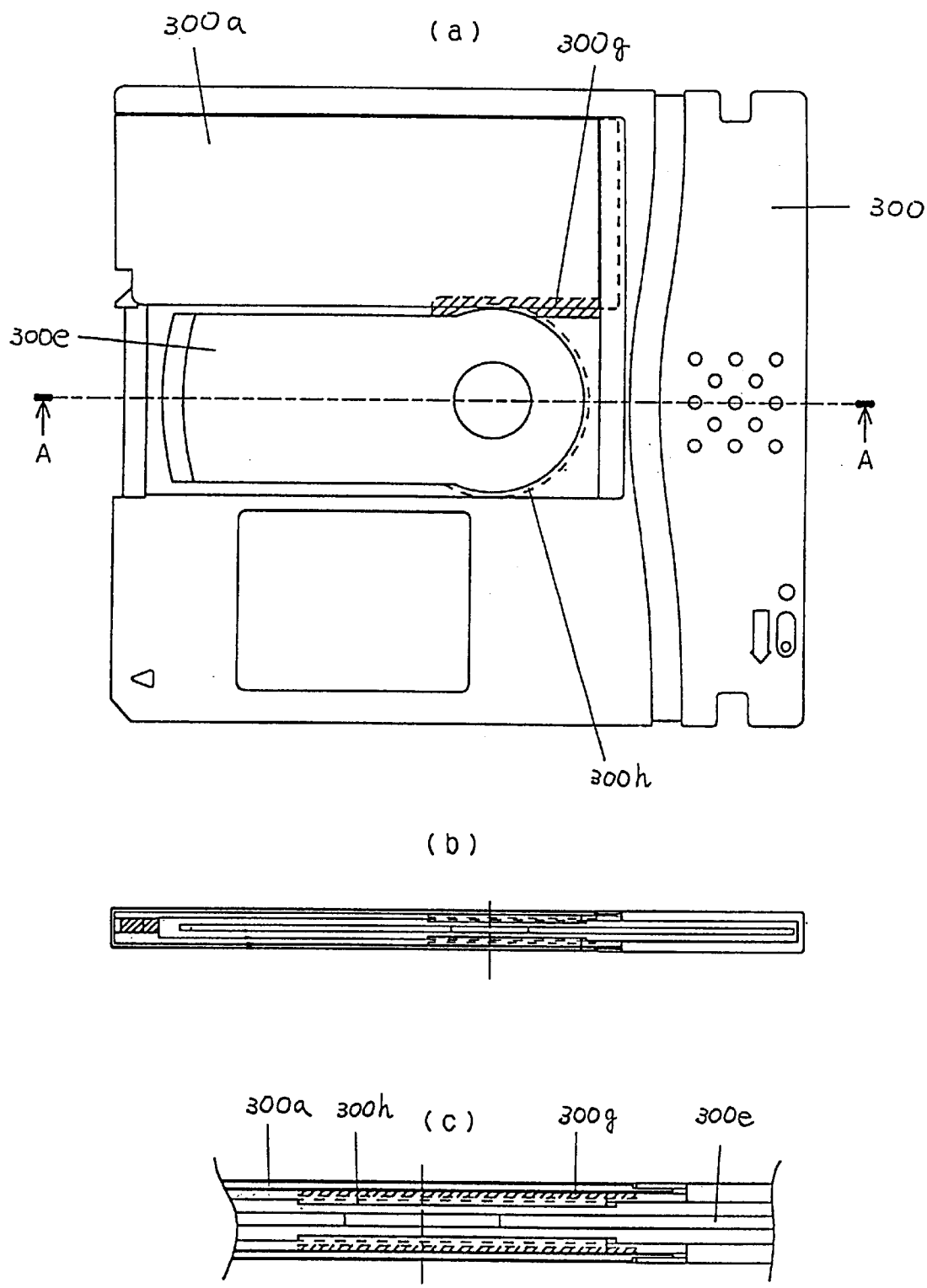
FIG. 25(a) is a plan view of a cartridge in embodiment 4 of the invention.
FIG. 25(b) is its sectional side view.
FIG. 25(c) is a magnified sectional view of its essential parts.

FIG. 25, relating to the cartridge 300 used in the disk loading device in embodiment 1, shows a gap is provided in the overlapping portion 300g with the cartridge 300 when the shutter 300a is opened.

FIG. 25(a) is a plan view in the case of one-side opening type of the cartridge 300, and the gap 300g is provided at both face and back sides. In the case of two-side opening type of the cartridge 300, the gap 300g is provided also at the opposite side of the central line A—A(four positions in total). FIG. 25(b) shows a sectional view along the central line A—A of the cartridge 300, and FIG. 25(c) is its partially magnified view.

At the inner circumferential side of the cartridge 300, a projecting ring 300h for receiving the disk 300e is provided, and this is the closest position of the cartridge 300 and disk 300e. If this portion is deformed due to warp or other effect of the shutter 300a, the disk 300e and cartridge 300 contact with each other, and powder or other defect occurs, which may lead to malfunction.

As shown in FIG. 25(c), by forming the gap 300g in the cartridge 300, the effect of the shutter 300a on the ring 300h can be avoided.

In this embodiment, the gap 300g is formed outside of the cartridge 300, but it is obvious that the same effects are expected when the gap 300g is provided inside of the shutter 300a.

(Embodiment 5)

Figure 26:
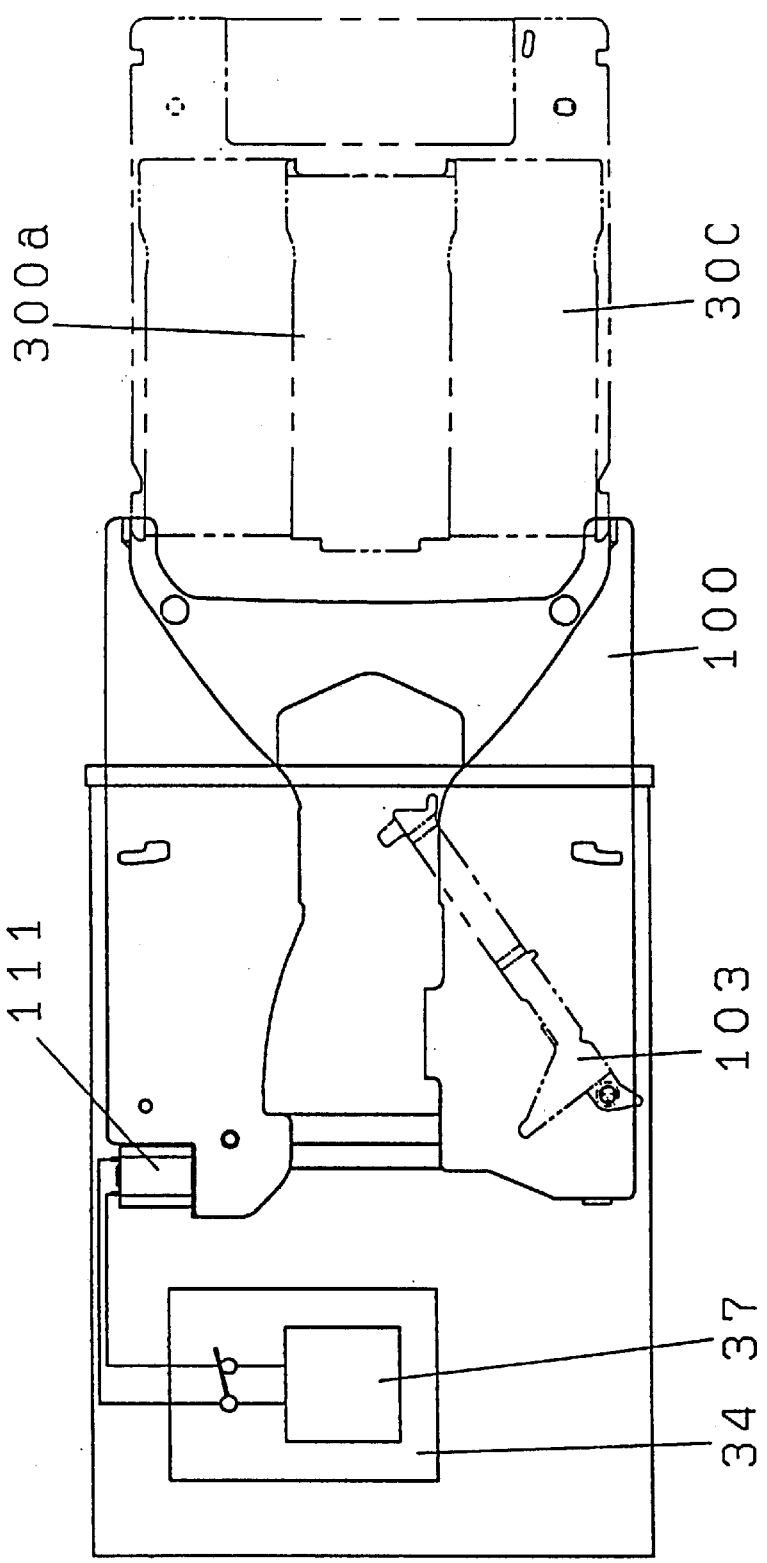
FIG. 26 is a plan view when inserting a cartridge in a holder in embodiment 5 of the invention.

FIG. 26 is a plan view when inserting the cartridge 300 into the holder 100 in embodiment 1. That is, while media is not inserted yet in the holder 100, the both ends of the loading motor 111 are shorted by the MPU 34 (see FIG. 10) to restrain electromagnetically, so that the holder 100 can be firmly held in the base 8.

Figure 27:
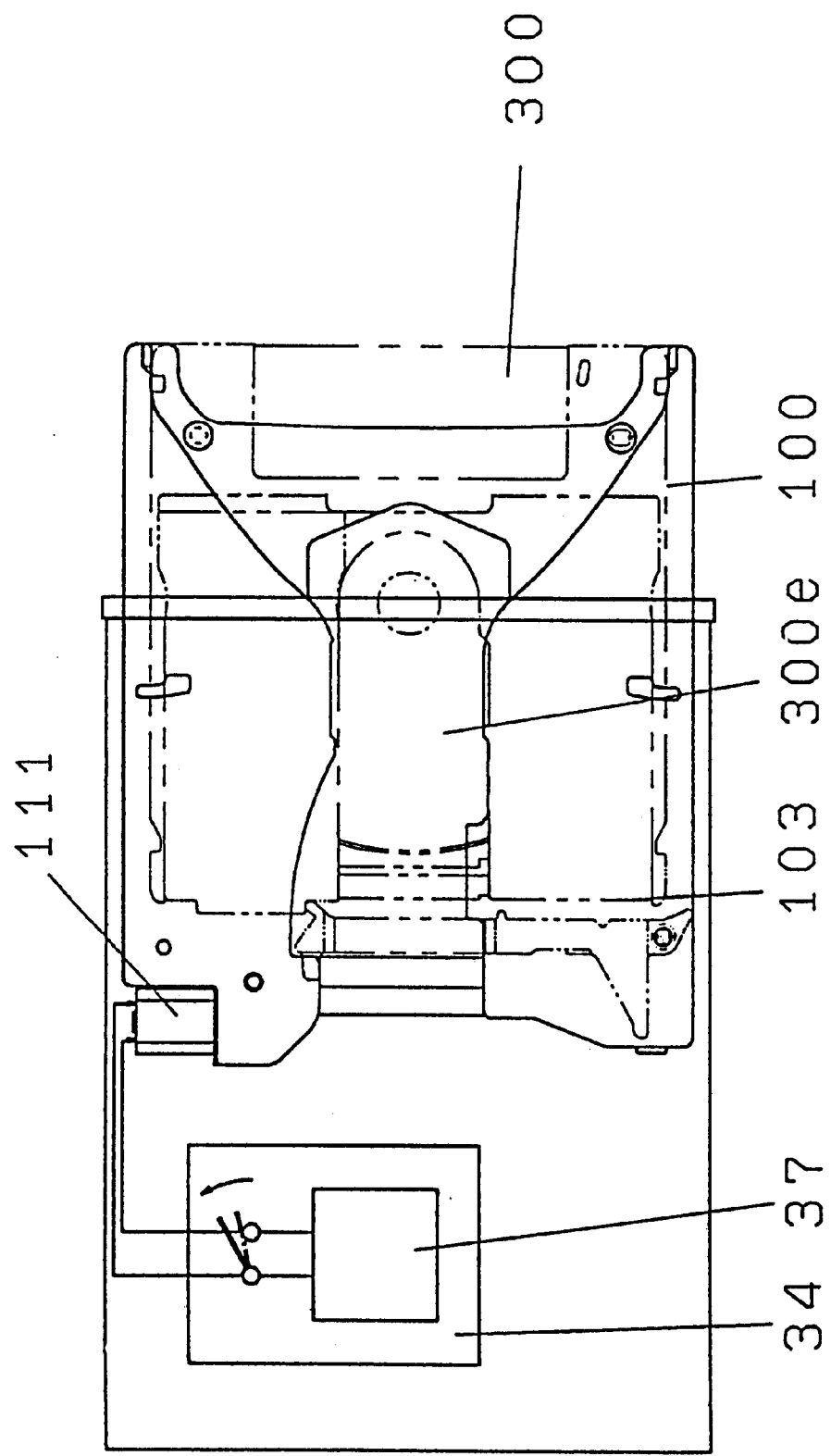
FIG. 27 is a plan view upon completion of insertion of the cartridge into the holder.

FIG. 27 is a plan view of completion of insertion of the cartridge 300 in the bolder 100. By the two switches 114 and 115 in the holder 100, when the cartridge 300 is completely inserted into the holder 100, the MPU 34 clears the electromagnetic restraint by opening the both ends of the loading motor 111, so that the holder 100 may be easily transferred into the base 8.

(Embodiment 6)

Figure 28:
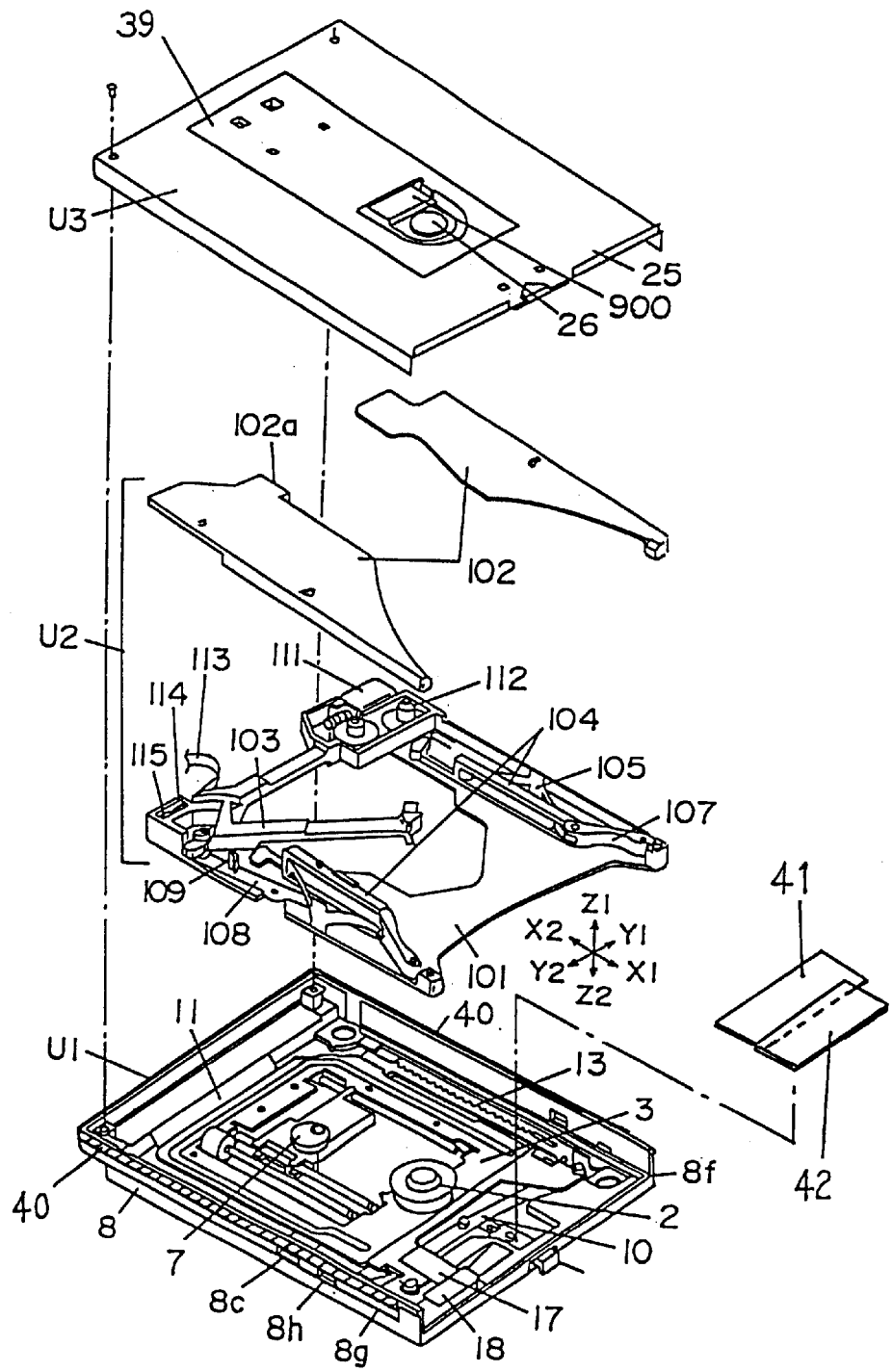
FIG. 28 is a perspective exploded view showing a constitution of a disk loading device in embodiment 6 of the invention.

FIG. 28 is a perspective exploded view of a disk loading device having a dust-proof structure. That is, in the base 8, as a dust-proof measure, a dust-proof cover 39 is provided in a top plate 25 as shown in the drawing. To enhance the air tightness with the top plate 25, moreover, a seal 40 is provided in three directions except for the opening, and a dust-proof sheet 41 and a dust-proof cover 42 are provided in order to prevent invasion of dust or smoke from the gap between the base 8 and the stopper 36. The dust-proof sheet 41 is made of an elastic material of low gas permeability, such as artificial leather or dust collecting filter, and it is adhered to the chassis 3, and it encloses the base 8 together with the dust-proof cover 42 adhered to the base 8. If no consideration is given to disassembling of the disk loading mechanism, omitting the dust-proof cover 42, the dust-proof sheet 41 may be directly adhered to the chassis 3 and base 8.

Figure 29:
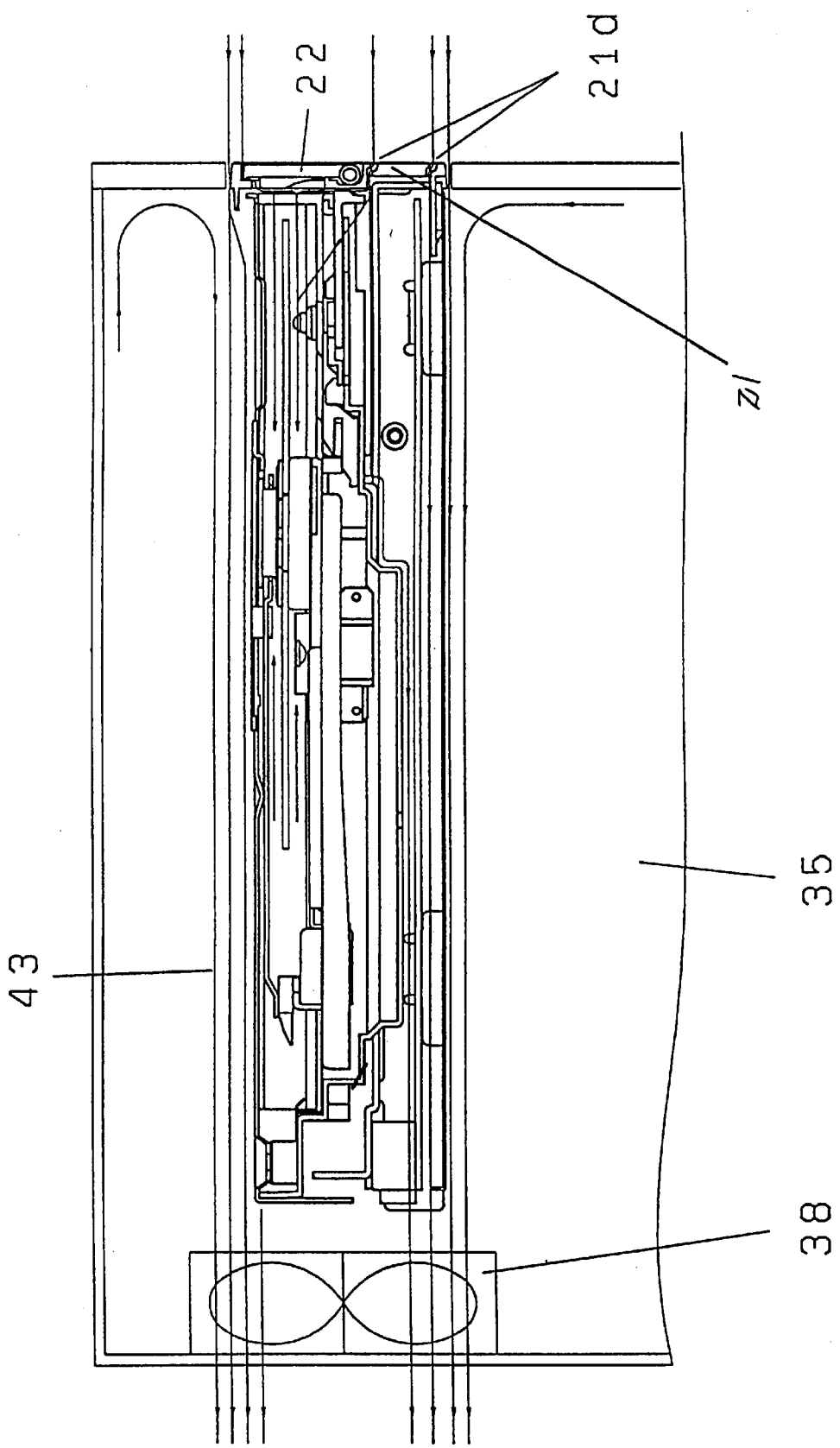
FIG. 29 is a side view when installing the disk loading device in a personal computer.

FIG. 29 is a side view of storing the disk loading device of the invention in the personal computer 35. In the diagram, by rotation of both fan motor 38 and disk motor 2, a flow of air, so-called, an air stream 43 is formed. By the air stream 43, through an air intake hole 21d of the panel 21, the gap between the panel 21 and casing of the personal computer 35, and the junction of the panel 21 and shutter 22, dust or smoke may invade into the recording and reproducing disk (the disk 300e in the cartridge and the bare disk 301) and optical head 7, and the recording and reproducing side of the disk and the lens are contaminated in a long course of time.

Figure 30:
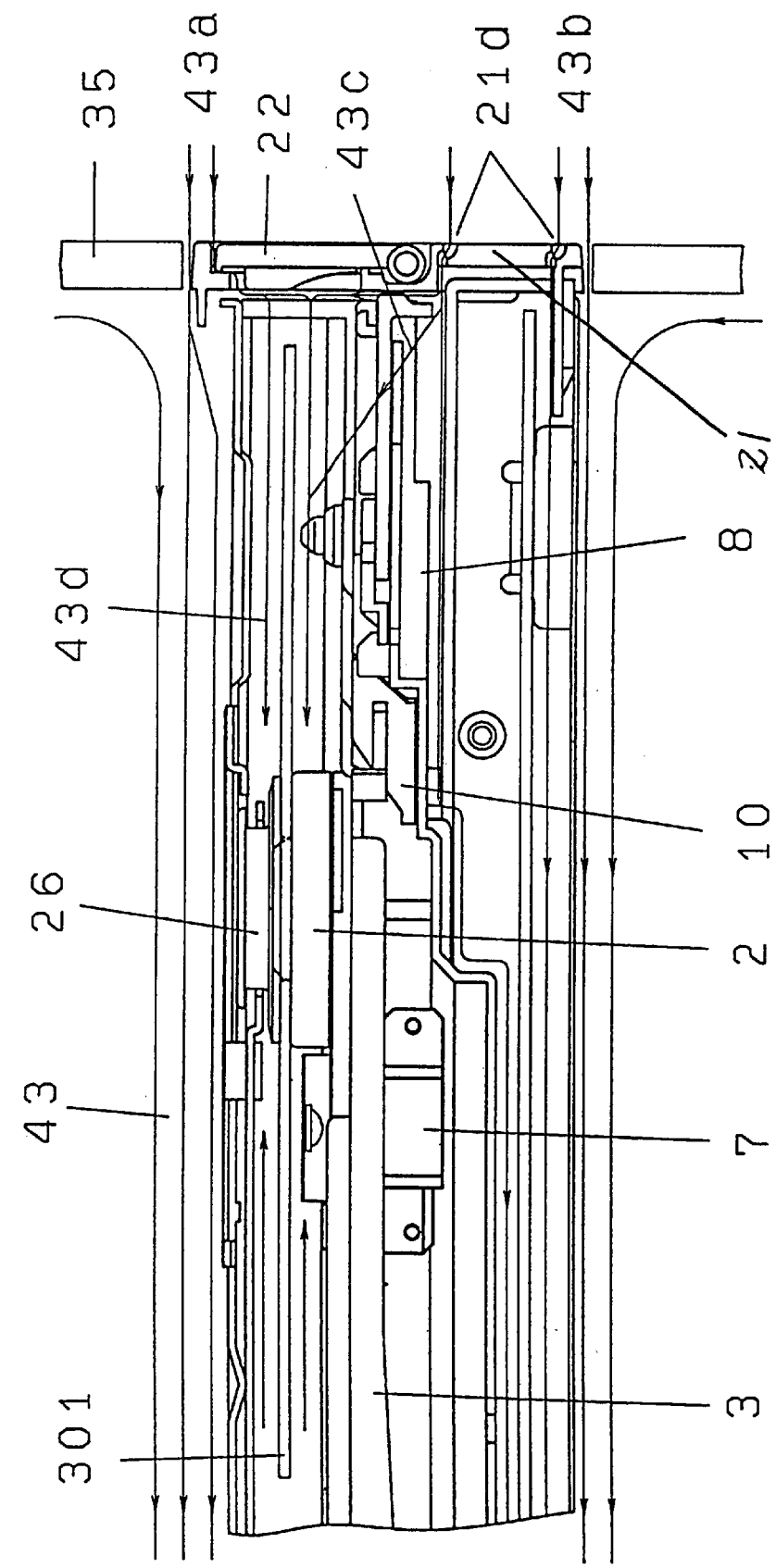
FIG. 30 is a partially magnified side view of air stream flowing in a disk loading device without dust-proof measure, and FIG. 31 a partially magnified side view of air stream flowing in the device with dust-proof measure

FIG. 30 is a partially magnified view of the side view of the air stream flowing in the disk loading device before taking the dust-proof measure. An air stream 43a is a flow entering from the junction of the upper part of the panel 21 and the shutter 22, and is attracted by an air stream 43d caused by pressure difference due to rotation of the disk motor 2, thereby conveying the smoke or dust into the device. An air stream 43b is a flow led in from the air intake hole 21d at the lower side of the panel 21, and cools the mounted parts on the circuit board 20. An air stream 43c is a flow reaching the disk motor 2 through the gap between the base 8 and the stopper 36 from the air intake port 21d at the upper side of the panel 21, and is attracted by the air stream 43d caused by pressure difference due to rotation of the disk motor 2, thereby conveying the smoke or dust into the device.

To enhance the dust-proof performance, it is important that these air streams are cut off so as not reach up to the recording and reproducing side of the recordable disk and the optical head 7, and to enhance the air tightness of the disk loading device.

Figure 31:
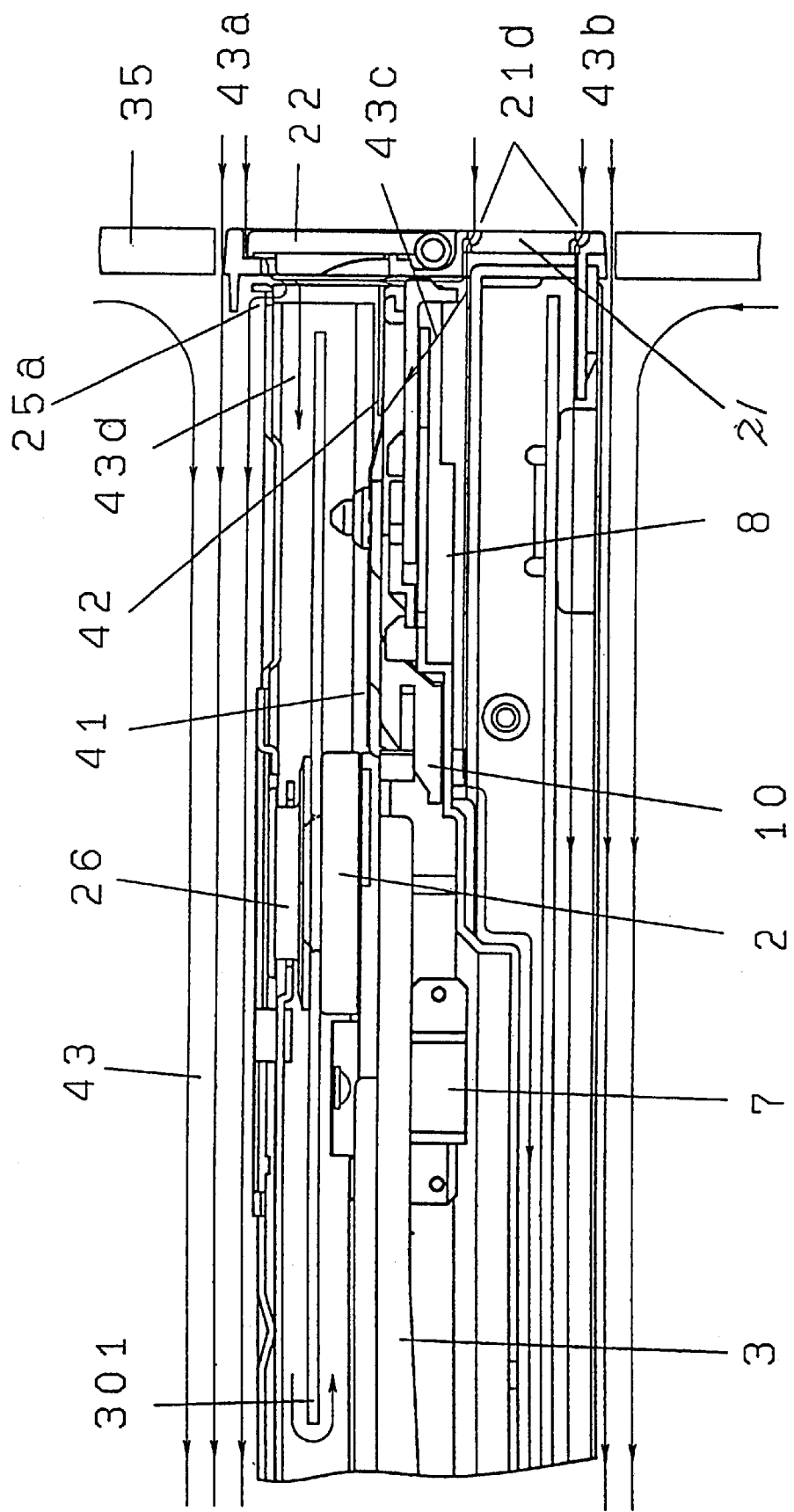

FIG. 31 is a partially magnified view of the side view of the air stream flowing in the disk loading device after taking the dust-proof measure. By the cover 39 and seal 40 shown in FIG. 8, the air tightness between the base 8 and top plate 25 is enhanced.

A ventilation hole 25a is provided in the portion adjacent to the panel 21 of the top plate 25, and by using the air stream of the fan motor 38 of the personal computer stronger than the air stream caused by the pressure difference inside and outside of the device by rotation of the recordable disk, dust or smoke invading from the panel 21 is discharged outside of the disk loading device, so that the time-course contamination of the recording and reproducing side of the disk and the lens can be prevented.

By interposing the dust-proof sheet 41 and dust-proof cover 42 between the air intake hole 21d of the panel 21 and the disk motor 2, the dust or smoke sucked toward the disk motor 2 due to negative pressure in the inside by rotation of the recordable disk is shut off, and the time-course contamination of the recording and reproducing side of the disk and the lens can be prevented.

According to the invention, as shown in FIG. 31, the air stream 43a invading through the junction between the upper part of the panel 21 and the shutter 22 is discharged out of the disk loading device through the ventilation hole 25a. The air stream 43c reaching up to the disk motor 2 through the gap of the base 8 and stopper 36 from the air intake hole 21d at the upper side of the panel 21 is shut off by the dust-proof sheet 41 and dust-proof cover 42. As a result, the air stream 43d formed by pressure difference due to rotation of the disk motor 2 is only slight, so that the life of the disk loading device due to effects of dust or smoke can be extended.

(Embodiment 7)

Embodiment 7 relates to transfer means of a holder for holding a cartridge or a bare disk (hereinafter called a disk tray), and is described specifically by referring to the following diagrams. The entire constitution of the disk loading device is same as in embodiment 1, and description of individual details is omitted herein.

First, the outline of the entire constitution of the disk loading device of this embodiment is given below.

Figure 32:
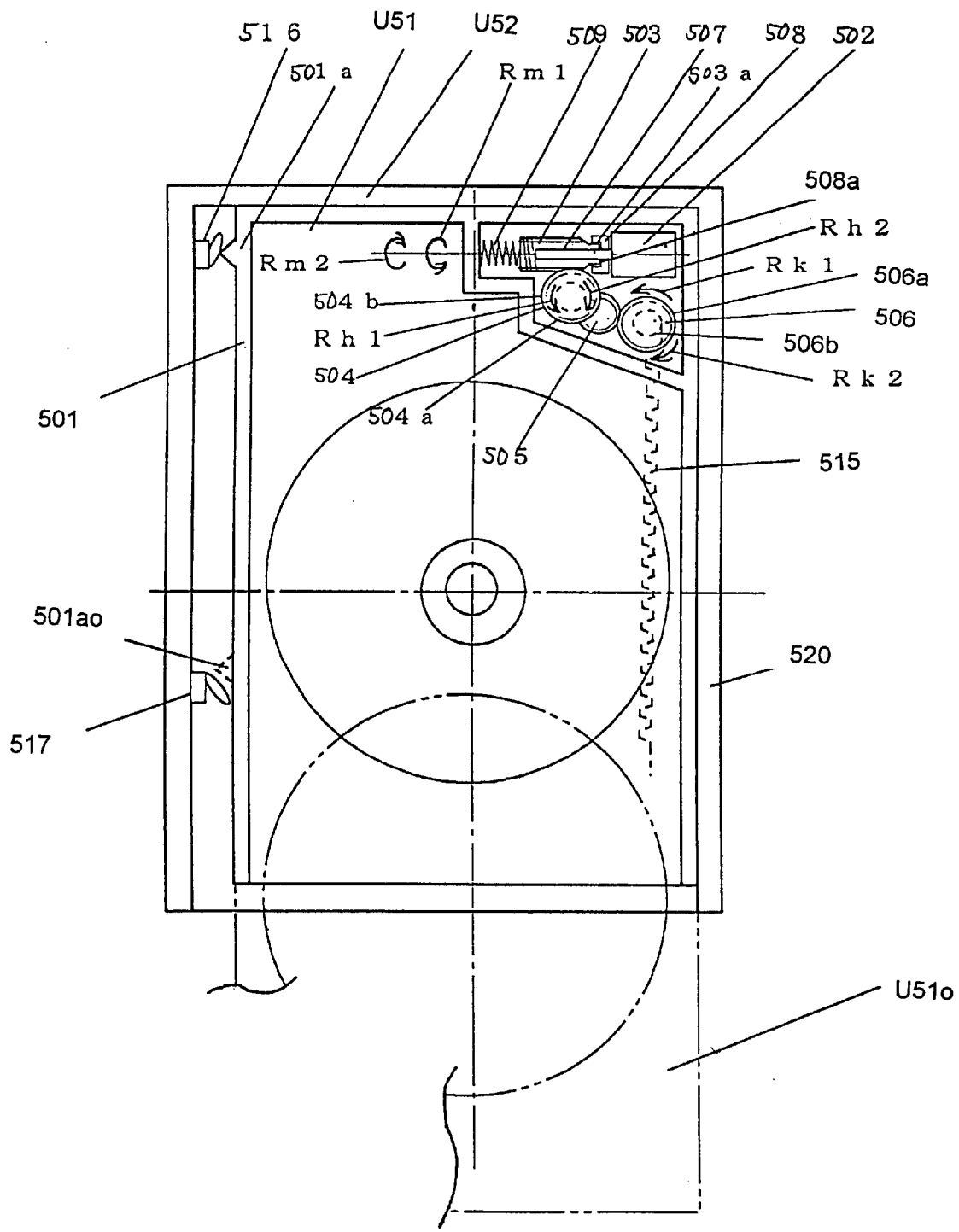
FIG. 32 is a plan view showing an outline constitution of an entire disk loading device in embodiment 7 of the invention.
Figure 33:
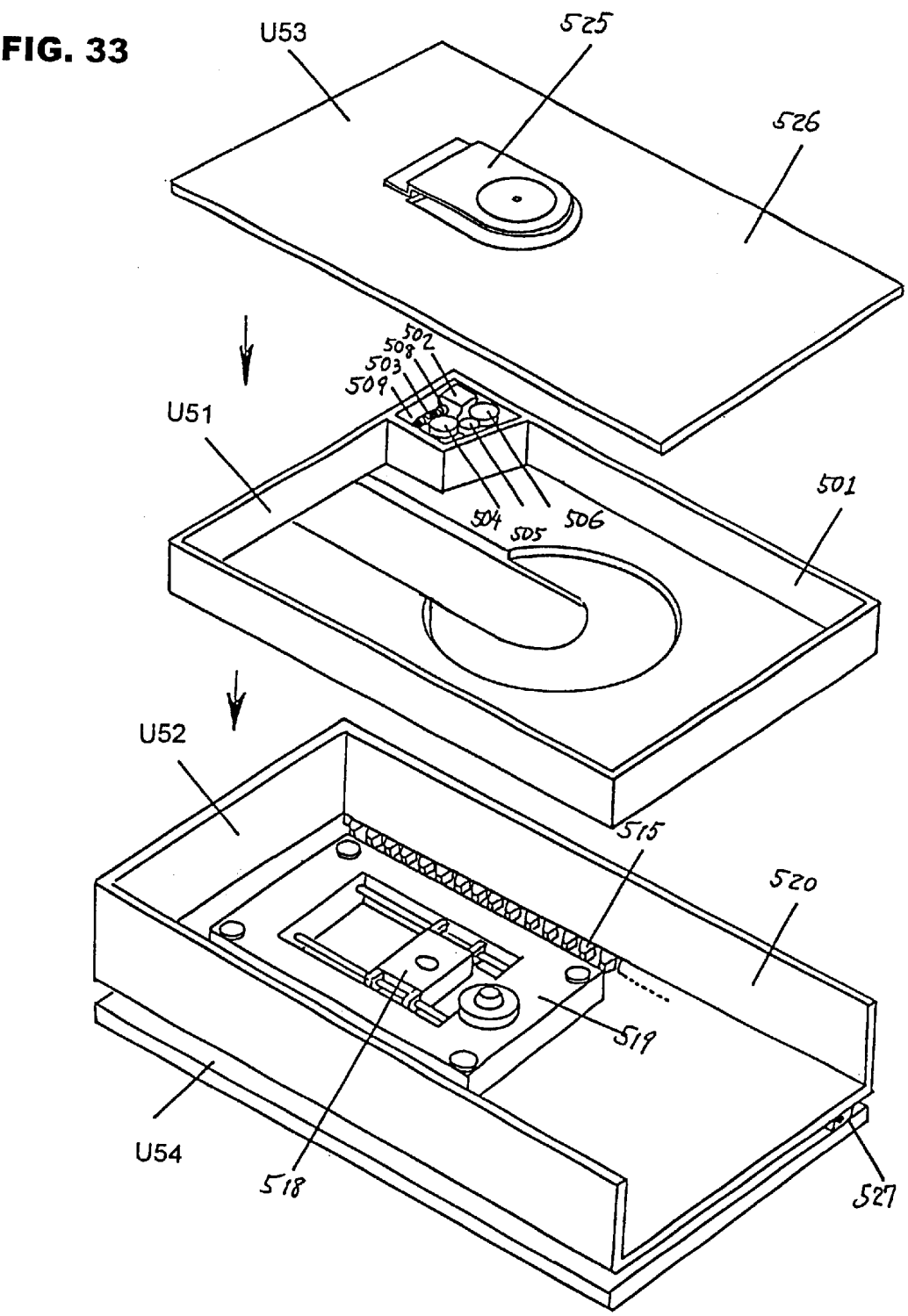
FIG. 33 is a perspective exploded view showing the assembled state of essential blocks of the device.

FIG. 32 is an overall plan structural view showing the outline of constitution of loading mechanical parts of the disk loading device, and FIG. 33 is a perspective exploded view showing the assembled state of the principal structural blocks for composing the disk loading device.

In FIG. 32 and FIG. 33, reference numeral U51 denotes a disk tray unit for transferring the media to a specified position, and U52 is a head unit for guiding the disk tray unit U51, and recording or reading data in the media (not shown), and the entire unit including its transport mechanism. Reference numeral U53 is a damper unit including a pressing part of the upper part of the media and a clamper mechanism for clamping the disk, and U54 is a circuit board for controlling the action of the disk loading device and the recording and reading action of data in the media.

The disk tray unit U51 comprises a disk tray 501 for mounting media, and transfer means for transferring the disk tray unit U51 into the disk tray 501, and the transfer means includes a loading motor 502 as the drive source of the transfer mechanism of the disk tray unit U51, a worm gear 503 for transmitting the first stage of the gear system for transmitting the drive force of the loading motor 502 to outside, a worm wheel 504 to be meshed with the worm gear 503 and having a stepped spur gear coaxially, helical teeth 504a to be meshed with the worm gear 503 of the worm wheel 504, worm wheel plain teeth 504b of the spur gear side of the worm wheel 504, a middle idler gear 505 to be meshed with the worm wheel plain teeth 504b, a drive gear 506 to be meshed with the middle idler gear 505 having other stepped spur gear coaxially with the spur gear, upper teeth 506a meshed with the middle idler gear 505 out of the drive gear 506, lower teeth 506b meshed with next stage gear of the drive gear 506, a motor rotary shaft 507 of the loading motor 502, drive force transmitting means 508 for transmitting the drive force of the loading motor 502 to the worm gear 503 through the motor rotary shaft 507, a worm thrusting spring 509 for thrusting the worm gear 503 to the loading motor 502 side in the axial direction of the motor rotary shaft 507, an engaging pawl 503a fixed on the worm gear 503 to be engaged with the drive force transmitting means 508, and an engaging hole 508a provided in the drive force transmitting means 508 in which the engaging pawl 503a is inserted.

The main body unit U52 includes a rack 515 to be meshed with the drive gear 506, an insertion completion detecting switch 516 for detecting insertion completion of the disk tray unit U51, a discharge completion detecting switch 517 for detecting discharge completion of the disk tray unit U51, a head unit 518 for recording or reading data in the media, and a base 520 for guiding the disk tray unit U51 having members of a transport mechanism 519 for transporting the head unit 518 installed inside.

The disk tray 501 has an insertion detecting pawl 551a for pressing and actuating the insertion completion detecting switch 516.

The damper unit U53 has a damper 525 for clamping the disk, and a top plate 526 for mounting the damper 525 and pressing the top of the media.

The circuit board U54 has an eject button 527 for instructing insertion and discharge action of the disk tray unit U51.

The drive system in FIG. 32 and FIG. 33 is described in detail below.

Figure 34:
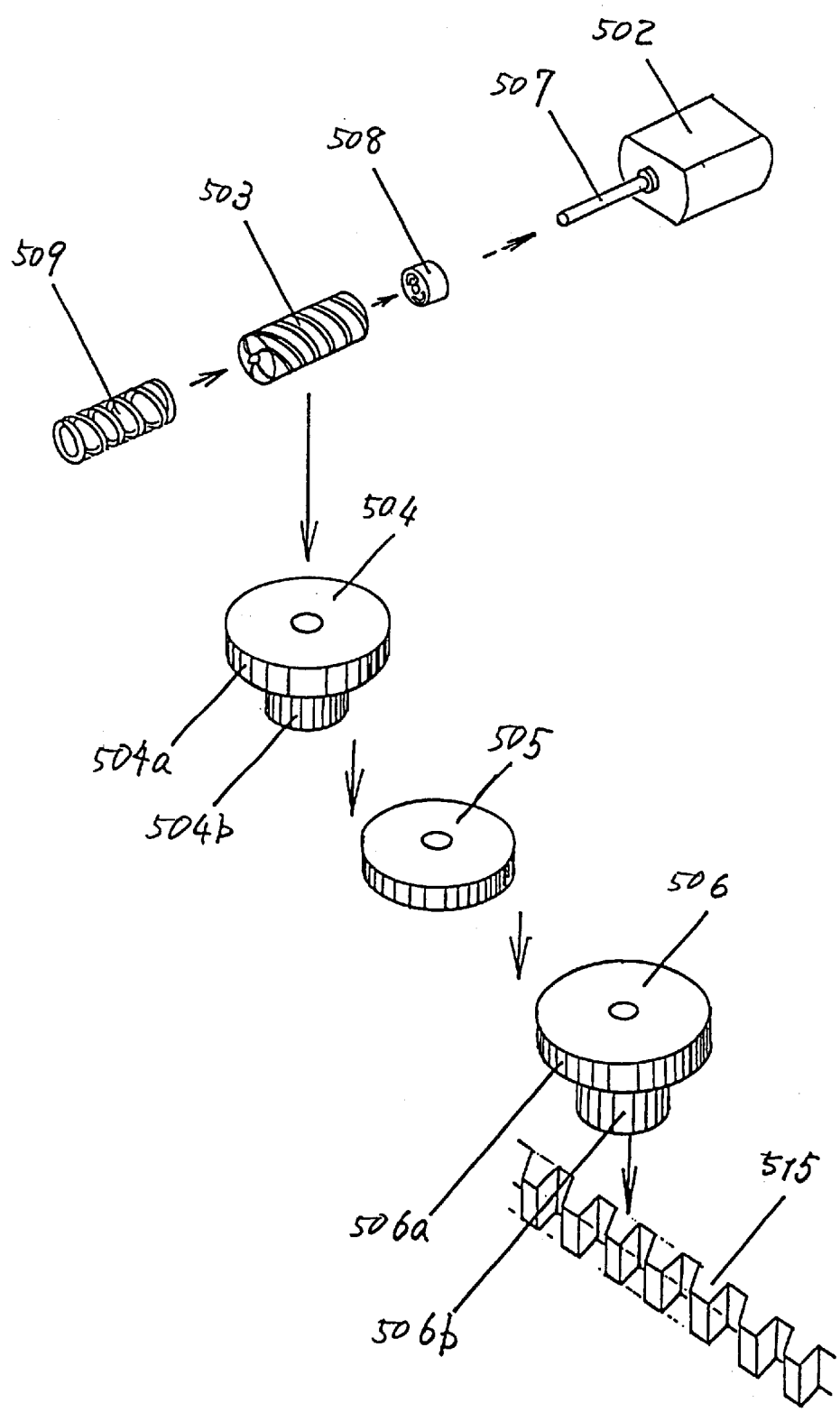
FIG. 34 is a perspective exploded view showing a loading drive system of the device.
Figure 35:
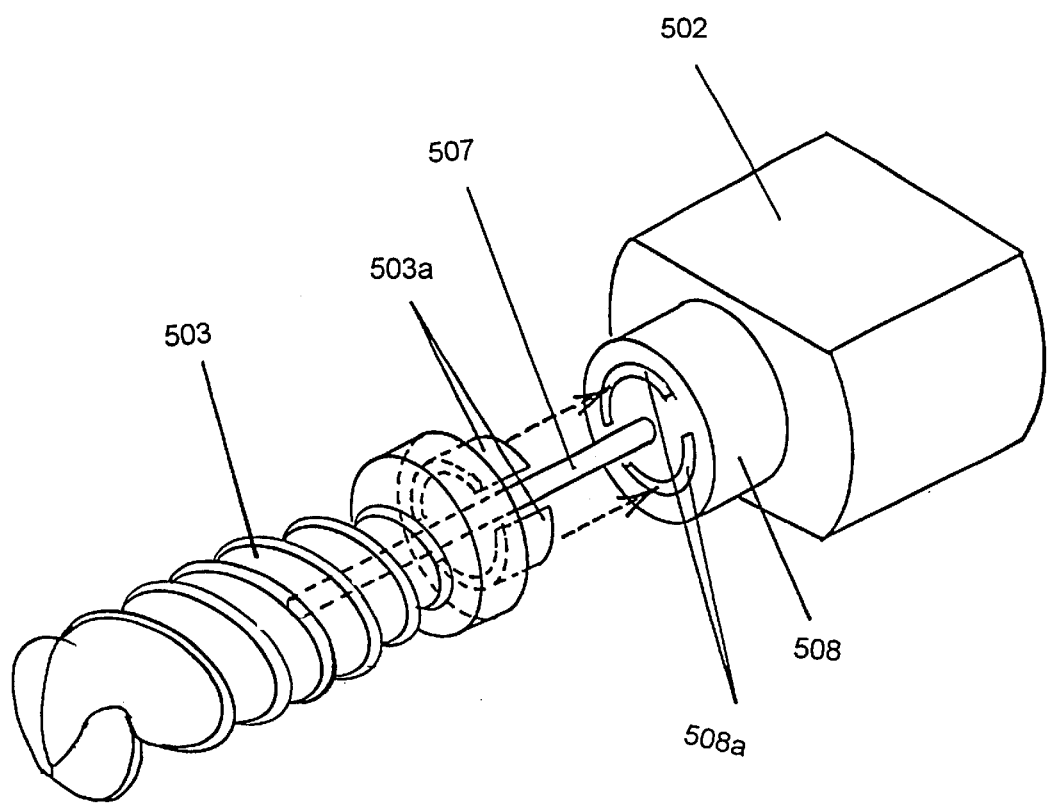
FIG. 35 is a perspective view of essential parts showing the relation of engagement for transmitting the rotary drive force to the worm gear of the device through driving force transmitting means.

The loading motor 502, worm gear 503, worm wheel 504, middle idler gear 505, drive gear 506, motor rotary shaft 507, drive force transmitting means 508, and worm thrusting spring 509 are assembled in the configuration as shown in FIG. 34 and FIG. 35, and at this time the worm gear 503, motor rotary shaft 507 and drive force transmitting means 508 are assembled in the configuration as shown in FIG. 35.

That is, in FIG. 35, the drive force transmitting means 508 is press-fitted into the motor rotary shaft 507, and the torque of the motor rotary shaft 507 is transmitted to the drive force transmitting means 508 almost by 100% owing to this press-fitting. The worm gear 503 is rotatably supported on the motor rotary shaft 507. In this constitution, when the engaging pawl 503a is engaged with the engaging hole 508a, the drive force of the drive force transmitting means 508 is transmitted to the worm gear 503. In this embodiment, the worm gear 503 has two bars of worm, and the advance angle of the worm gear 503 is 18.5 degrees. The worm gear 503, worm wheel 504, middle idler gear 505, and drive gear 506 are made of polyacetal resin.

In the present invention, the number of bars, advance angle and material of the worm gear are not particularly specified as far as the worm gear 503 can be driven by driving of the worm wheel 504.

The action of each part is described below.

First, the discharge action of the disk tray unit U51 is explained.

Discharge action start of the disk tray unit U51 is instructed by pressing the eject button 527 to send a signal to the circuit board U54. As a result, as shown in FIG. 32, the loading motor 502 is rotated and driven in the direction of Rm1. At this time, the worm wheel 504 is driven in the direction of Rh1, and the drive gear 506 in Rk1, and the lower teeth 506b and rack 515 are meshed with each other, and the disk tray unit U5I is sent out to the position of U51o (partially shown by twin dot chain line). As a result, the insertion detecting pawl 501a of the disk tray 501 is moved up to the position of 501ao (indicated by broken line), and the discharge completion detecting switch 517 is actuated, and the disk loading device recognizes the completion of discharge, stops rotation and drive of the loading motor 502, and terminates the discharge action of the disk tray unit U51.

When discharge action of the disk tray unit U51 is over, the disk tray unit U51 is exposed outside from the disk loading device, and the user can put the media at specified position of the disk try 501 or take out the media on the disk tray.

The insertion action of the disk tray unit U51 is described below.

When the loading motor 502 is rotated and driven in the direction of Rm2, the worm wheel 504 is driven in the direction of Rh2 and the drive gear 506 in Rk2, and as being meshed with the rack, the disk tray unit U51 is inserted. After insertion of the disk tray unit U51, the insertion detecting pawl 501a of the disk tray 501 actuates the insertion completion detecting switch 516, and the disk loading device recognizes completion of insertion, stops rotation and drive of the loading motor 502, and terminates the insertion action of the disk tray unit U51.

Start of insertion action of the disk tray 501 is instructed, same as in the discharge action, by pressing the eject button 527 to send a signal to the circuit board, or by inserting the disk tray unit U51 manually in the insertion direction, and a signal telling stop of action of the discharge completion detecting switch 517 by the insertion detecting pawl 501a is sent to the circuit board U54. The operation for starting insertion manually is done by human force, and hence its operating force is preferred to be, for example, about 1 kgf or less.

When the insertion action of the disk tray 501 is finished, the head unit 508 is transported by the transport mechanism 519, and the data on the disk (not shown) is sought, recorded, or read.

Figure 36:
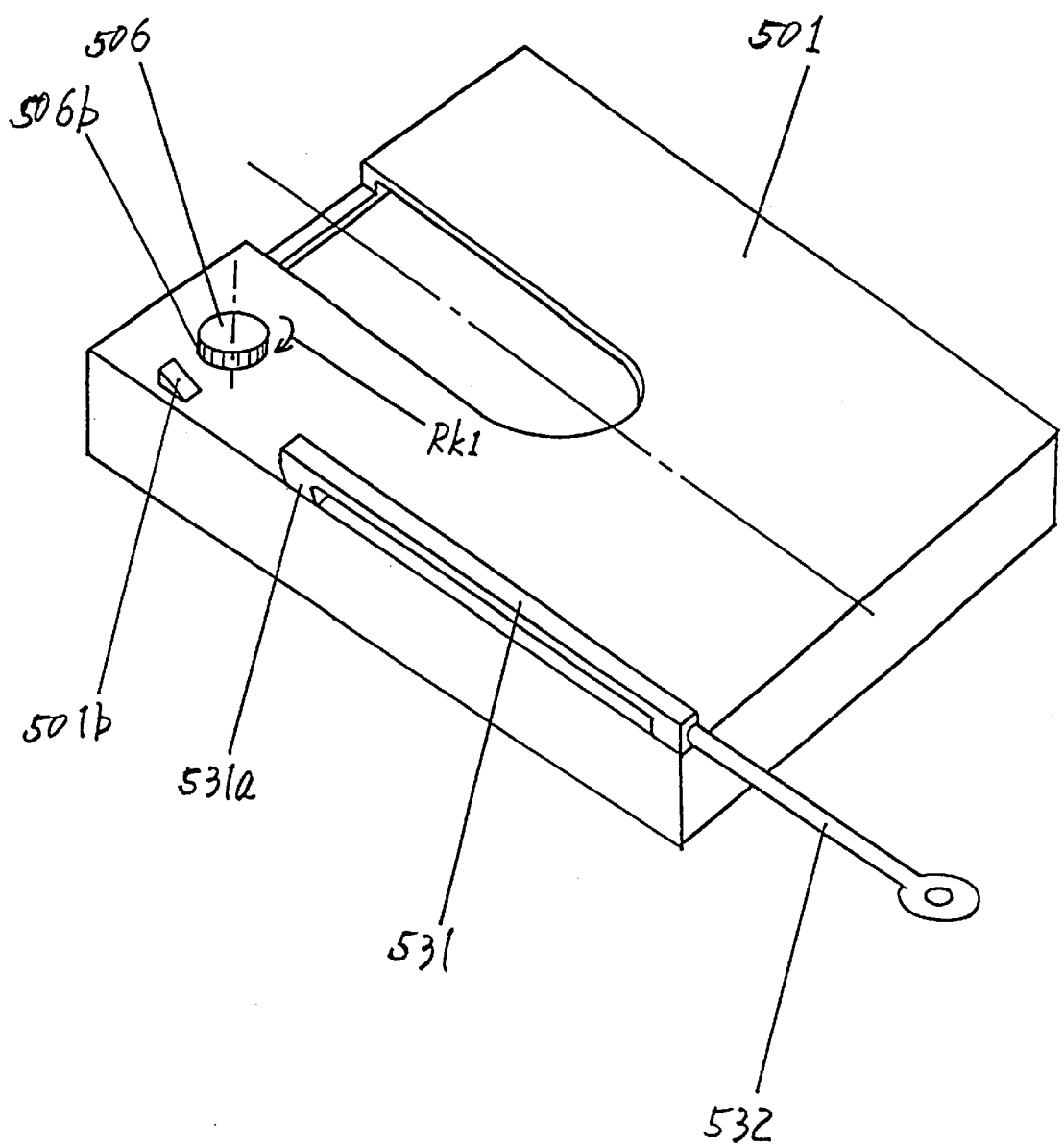
FIG. 36 is a perspective view showing the state of having a discharge lever in power off state at the, back side of the disk tray of the device.
Figure 37:
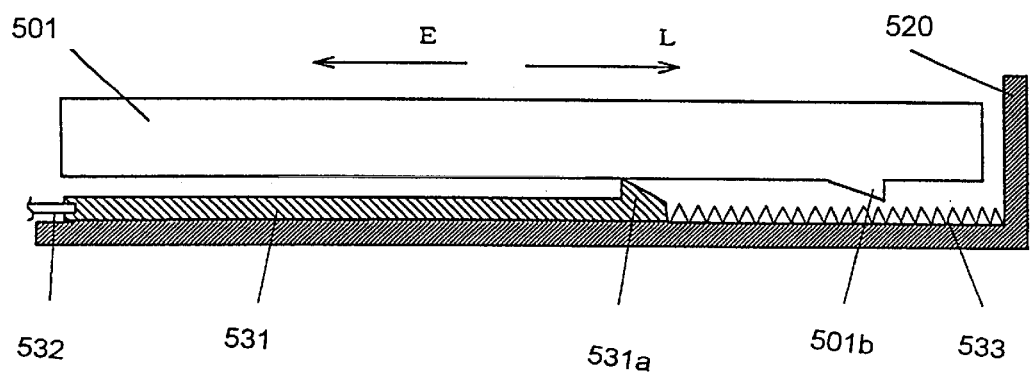
FIG. 37 and FIG. 38 are schematic diagrams showing the action of discharging the disk tray by the discharge lever.
Figure 38:
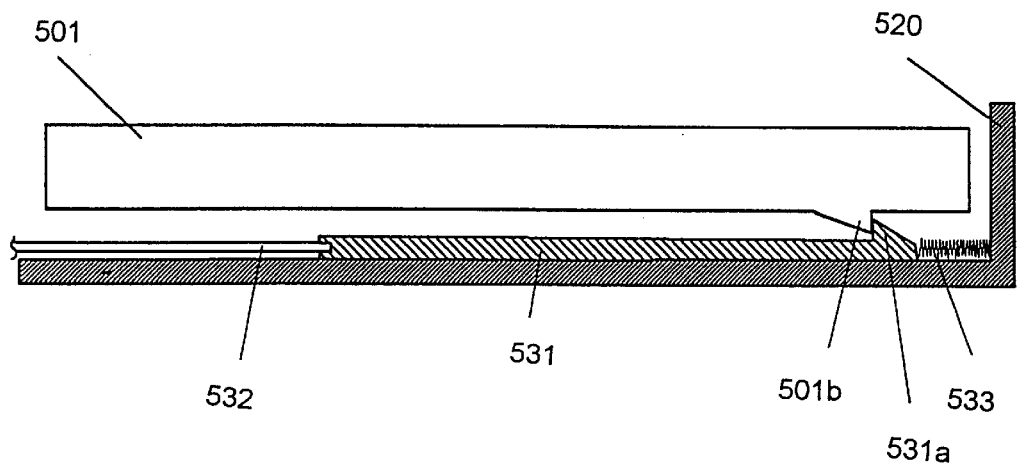

Next is described means for discharging the disk tray unit U51 in power off state of the disk loading device by reference to FIG. 36 to FIG. 38.

In FIG. 36, the disk tray 501 comprises a power off mode discharge lever 531 for pulling out and discharging the disk tray unit U51 in power off state, and a power off mode discharge pin 532 which is a tool for pressing the power off mode discharge lever 531 from outside in power off state, and also includes a tray pawl 501b and a lever pawl 531a for engaging between the disk tray 501 and the power off mode discharge lever 531 in power off state. In FIG. 37 and FIG. 38, reference numeral 533 is a power off mode discharge spring for pushing back the power off mode discharge lever 531.

In this constitution, the action of the means for discharging the disk tray unit U51 in power off state is described below.

When discharging the disk tray unit U51 in power off state, the user of the disk loading device pushes the power off mode discharge lever 531 by using the power off mode discharge pin 532 in the direction of L shown in FIG. 37 until the lever pawl 531a is engaged with the tray pawl 501b by resisting the spring force of the power off mode discharge spring 533. The spring force of the power off mode discharge spring 533 is, in this embodiment, 1 kgf at maximum in action. When the lever pawl 531a is engaged with the tray pawl 501b, as shown in FIG. 38, the disk tray unit U51 is moved in the direction of E by the spring force of the power off mode discharge spring 533, and is discharged from the disk loading device.

Figure 39:
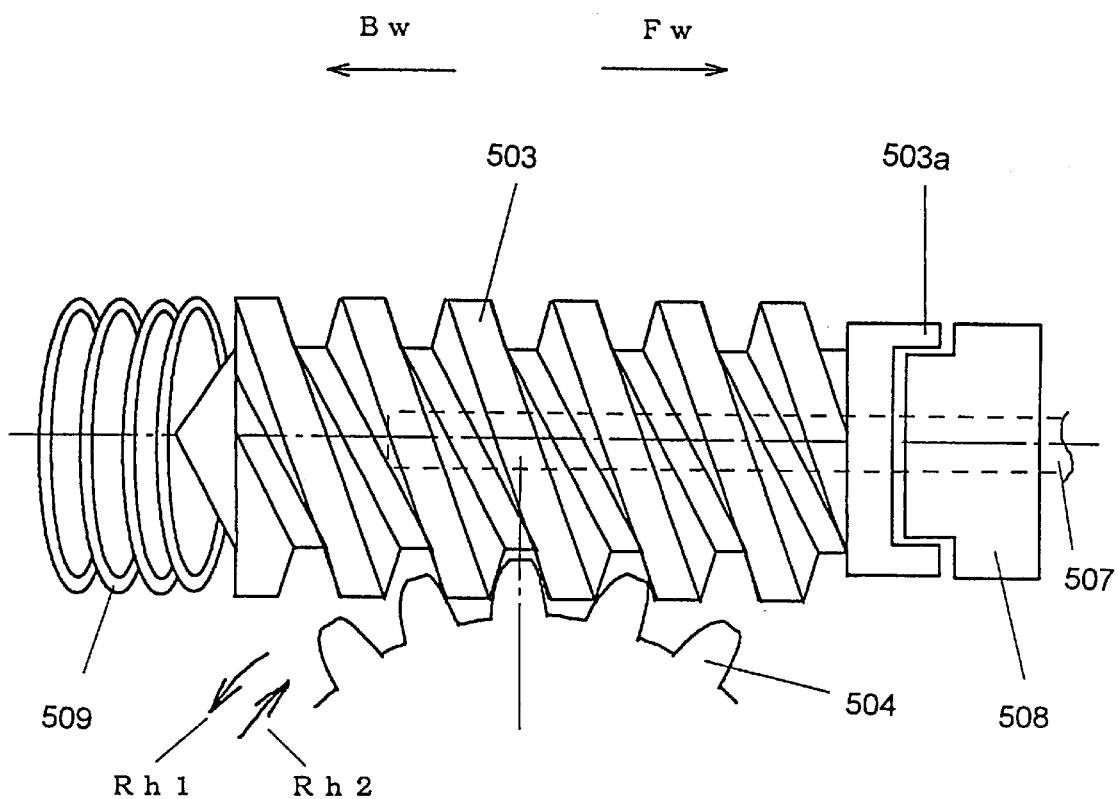
FIG. 39 is a drawing for explaining the meshing action of the worm gear and worm wheel of the device.

Next, in the discharge action and insertion action of the disk tray unit U51, the operation of the worm gear 503 and worm wheel 504 is explained by referring to FIG. 32 and FIG. 39.

When the disk tray unit U51 is discharged by the drive force of the loading motor 502, the motor rotary shaft 507 and worm gear 503 rotate in the direction of Rm1, and receive the axial force in the direction of Fw by the reaction from the worm wheel 504 while transmitting drive force to the worm wheel 504 in the direction of Rh1.

When inserting the disk tray unit U51 manually in the insertion direction, by meshing of the rack 515 and lower teeth 506b, the drive gear 506 is driven in the direction of Rk2, and the worm wheel 504 is driven in the direction of Rh2. At this time, too, the worm gear 503 receives the axial force in the direction of Fw from the worm wheel 504.

When the disk tray unit U51 is inserted by the drive force of the loading motor 502, the motor rotary shaft 507 and worm gear 503 rotate in the direction of Rm2, and receive the axial force in the direction of Bw by the reaction from the worm wheel 504 while transmitting drive force to the worm wheel 504 in the direction of Rh2. At this time, the spring force of the worm thrusting spring 509 is increased in the force in the direction of Fw, as compared with the case in which the worm gear 503 does not receive axial force from the worm wheel 504.

When discharging the disk tray unit U51 in power off state, by meshing of the rack 515 and lower teeth 506b, the drive gear 506 is driven in the direction of Rk1, and the worm wheel 504 is driven in the direction of Rh1. At this time, too, the worm gear 503 receives an axial force in the direction of Bw from the worm wheel 504.

Figure 40:
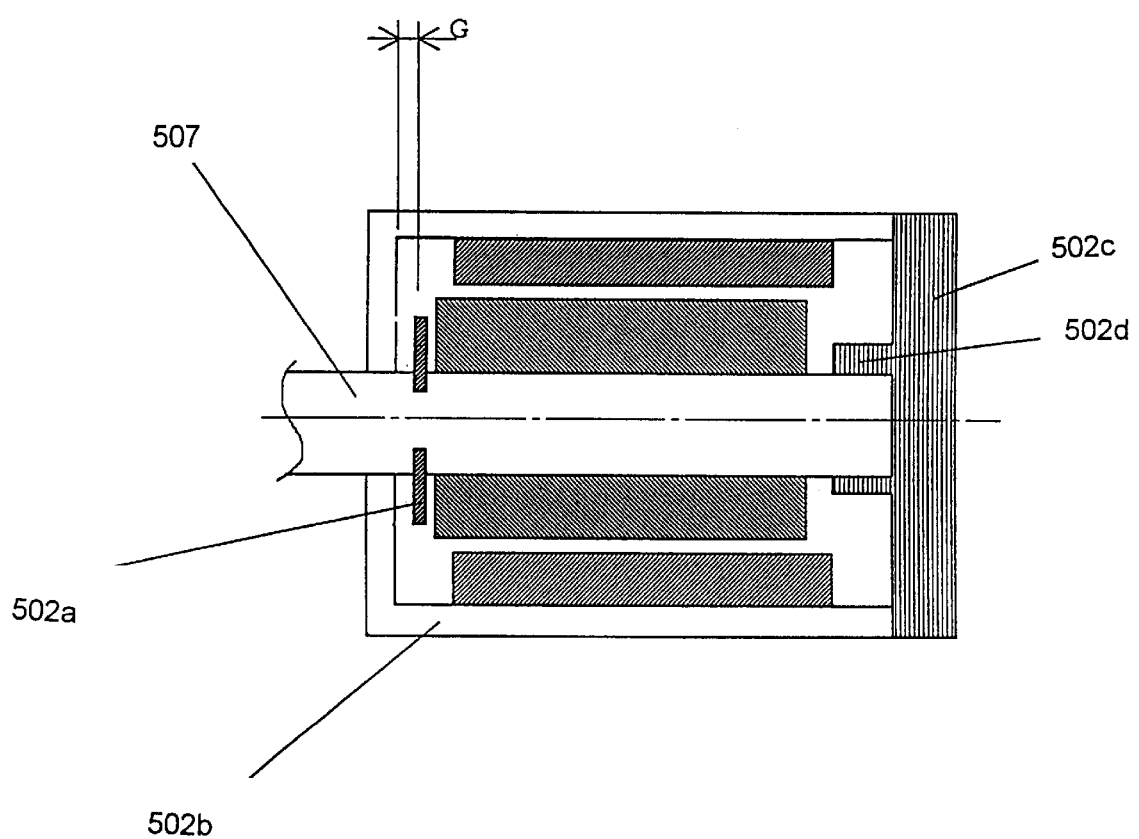
FIG. 40 is a sectional schematic view of loading motor of the device.

The internal structure of the loading motor 502 is, in the case of a DC motor, for example, generally as shown in FIG. 40. That is, the loading motor 502 comprises a stop ring 502a restrained in the axial direction on the motor rotary shaft 507 by a stop groove, a casing 502b as an outer shell of the entire loading motor, a cover 502c for covering the opposite side opening of the projecting side of the motor rotary shaft 507 of the casing 502b, and a thrust bearing 502d for defining the opposite end of the projecting side from the casing 502b of the motor rotary shaft 507 in the axial direction. In FIG. 40, the magnetic circuit (comprising magnet, coil, etc.) for generating a rotary drive force is not identified with reference numeral, and the brush for detecting the rotary phase of the rotating element such as motor rotary shaft, and others are not shown.

When the worm gear 503 is driven from the worm wheel 504 side and the motor rotary shaft 507 receives an axial force in the direction of the thrust bearing 502d, a bearing structure is formed, so that the motor rotary shaft 507 is not overloaded due to sliding in the axial direction. There is, however, a limit in the axial force that can be received by the bearing 502d, and its axial force is desired to be as small as possible.

In the case of a DC motor, usually, there is a gap G of about 0.05 to 0.5 mm between the stop ring 502a and casing 502b as shown in FIG. 40. Therefore, when the motor rotary shaft 507 receives an axial force at the projecting side from the casing 502b, if the motor rotary shaft 507 moves in the axial direction for the portion of this gap G, the both abut against each other to build up a bearing action, and a secure bearing structure is not formed. Accordingly, the motor rotary shaft 507 is overloaded due to thrust sliding, and hence the driving load increases. Further, the stop ring 502a usually does not have enough axial force enduring force for withstanding the axial force sufficiently, and, as a result, when the motor rotary shaft 507 receives the axial force at the projecting side from the casing 502b, the stop ring 502a may be broken depending on the strength of the load, and the loading motor 502 is broken down. In the motor rotary shaft 507, therefore, the axial force must not be applied in this direction until the stop ring 502a contacts with the casing 502b.

In this embodiment, accordingly, using a worm thrusting spring 509, the motor rotary shaft 507 is thrust in the direction of the loading motor 502, and it is intended to prevent axial force from being applied to the motor rotary shaft 507 at the projecting side from the casing 502b.

Supposing not to have the constitution of the worm gear 503 and drive force transmitting means 508 as in the embodiment, that is, in the case of direct coupling of the worm gear and motor rotary shaft as in an ordinary case, the spring force of the worm thrusting spring 509 must be controlled so as not to move the worm gear 503 in the gap G. Or, if the spring force of the worm thrusting spring 509 is excessively strong, it may exceed the limit of the axial force to be withheld by the bearing 502d in the loading motor 502, and therefore the spring force is desired to be as small as possible. To satisfy these two conditions, the spring force of the worm thrusting spring 509 must be controlled very strictly, and in consideration of fluctuations of the spring, it is hard to set in favorable conditions. More specifically, for example, if the worm thrusting spring 509 usable in this constitution has the spring constant of about 10 to 20 gf/mm, the worm gear 503 should not move the gap G of about 0.05 to 0.5 mm. In this spring, if the free length is about 10 mm, the fluctuation width is about 2 to 5 mm. In this case, the fluctuation of spring force is as much as 40 to 100 gf. On the other hand, the usual withstanding axial force in action of the bearing 502d of the loading motor 502 applicable in this embodiment is about 100 gf. That is, as compared with the withstanding axial force, the fluctuation of the spring force is extremely large, which is not practicable.

By contrast, by employing the worm gear 503 and drive force transmitting means 508 of the embodiment, it is not particularly required to control the spring force of the worm thrusting spring 509 so as not to move the worm gear 503 through the gap G in the axial direction, and the degree of freedom of the spring force is extended, and defects due to fluctuations can be reduced.

Next, in the case of difficulty of forced rotation of motor rotary shaft 507 from outside due to trouble of the loading motor 502 or the like, the discharge action of the disk tray unit U51 in power off state is explained by reference to FIG. 36 to FIG. 38, FIG. 41, and FIG. 42.

Figure 41:
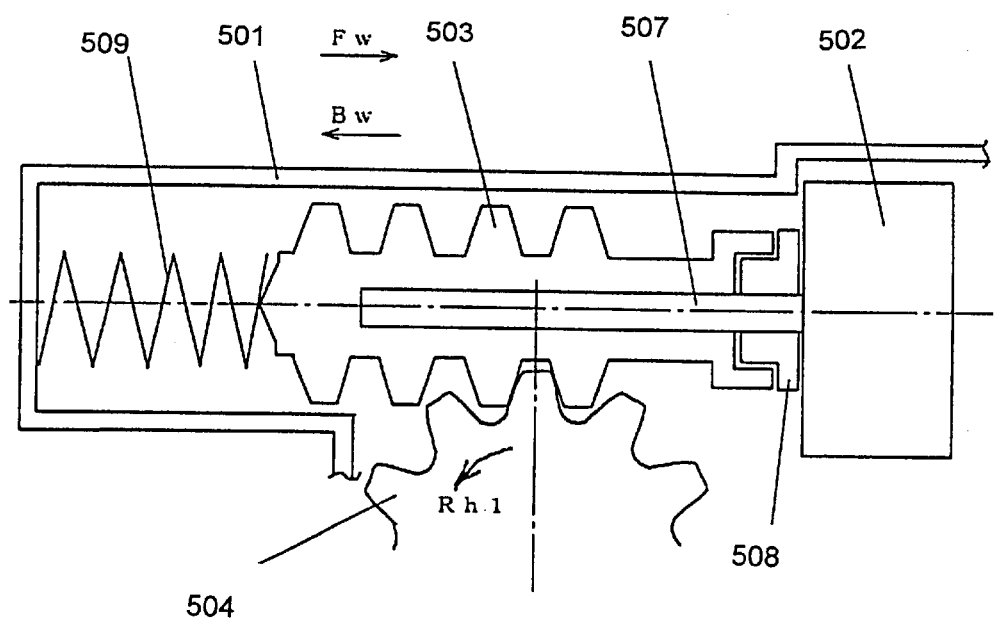
FIG. 41 and FIG. 42 are partial side views showing the move of the worm gear in the axial direction when inserting the disk tray of the device.
Figure 42:
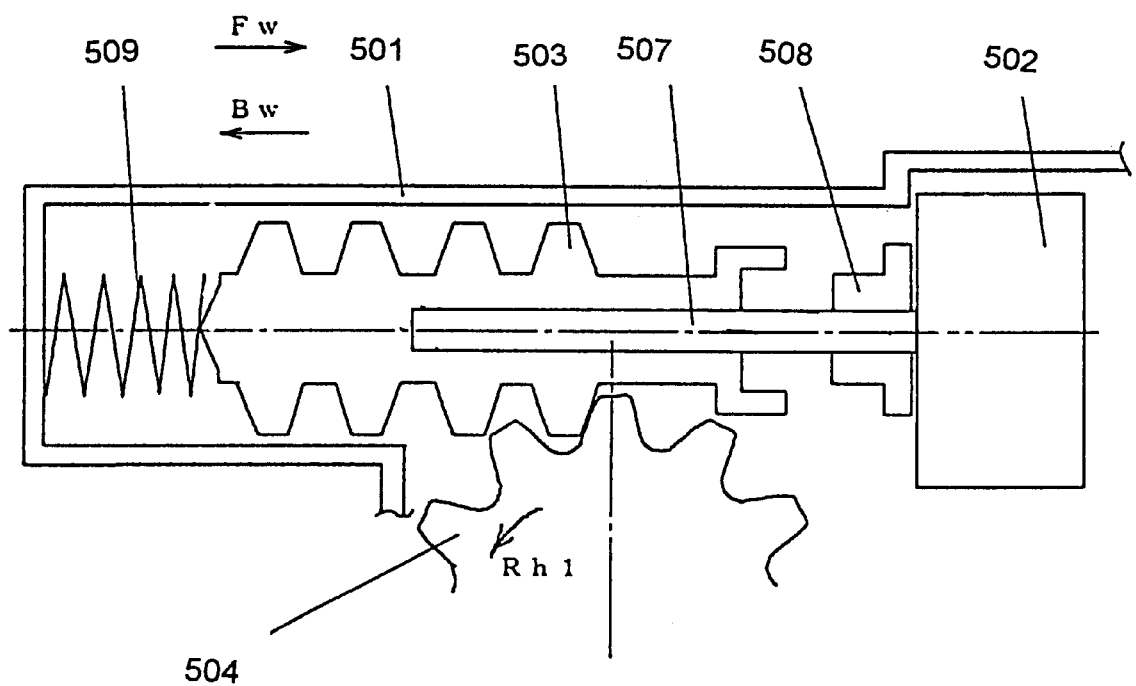

As described specifically in FIG. 37 and FIG. 38, when the user of the disk loading device pushes the power off mode discharge lever 531 by using the power off mode discharge pin 532 in power off state to compress the power off mode discharge spring 533, and the lever pawl 531a is engaged with the tray pawl 501b, the disk tray unit U51 moves in the direction of E by the spring force of the power off mode discharge spring 533, and thereby the drive gear 506 is driven in the direction of Rk1 by means of the rack 515. As a result, the worm wheel 504 is driven in the direction of Rh1, when a large torque is required for driving the motor rotary shaft 507, the worm gear 503 is engaged with the drive force transmitting means 508, and the torque is increased, so that the worm gear 503 cannot be rotated in the rotating direction of the motor rotary shaft 507 by means of the worm wheel 504. Hence, the state of the worm gear 503 initially arranged in the configuration as shown in FIG. 41 is changed to FIG. 42, in which the worm gear 503 is moved by deflecting the worm thrusting spring 509 until the position where the worm gear 503 is no longer meshed with the worm wheel 504 in the direction of the worm gear 503 departing from the loading motor 502. That is, meshing of the worm gear 503 and worm wheel 504 is cleared, and the worm wheel 504 is set free to rotate. Therefore, the disk tray unit U51 can be discharged easily. Thus, even in power off state, the disk tray unit U51 can be discharged without difficulty.

In this constitution, the worm thrusting spring 509 is used, but this constitution is necessary only when it is hard to rotate the motor rotary shaft 507 by force from outside due to trouble of the loading motor 502 or the like, in order to discharge the disk tray unit U51 in power off state, and the invention is not limited to this constitution alone. If it is hard to rotate the motor rotary shaft 507 by force from outside due to trouble of the loading motor 502 or the like, as far as the situation of discharging the disk tray unit U51 in power off state does not occur, the worm thrusting spring 509 is not particularly needed. By keeping a proper gap from the leading end of the worm gear 503, by installing a member for fixing to define the axial force of the worm gear 503, when the worm gear 503 is driven from the worm wheel 504 driven from the side closer to the output stage, the motor rotary shaft 507 is prevented from being directly loaded with the axial force. Therefore, if the worm gear 503 receives the axial force at the projecting side from the casing 502b of the loading motor, it is possible to prevent overload due to thrust sliding from being applied to the motor rotary shaft 507 due to collision of the stop ring 502a and casing 502b. Hence, breakage of the stop ring 502a is also prevented.

Below is described the processing at the end of tooth height of the worm gear 503. Generally, meshing of the worm gear 503 and worm wheel 504 is as shown in FIG. 39, in which the teeth of the worm are sufficiently present before and after the meshing position. This is intended to exclude the imperfect portion in meshing of the worm gear 503 and worm wheel 504.

The disk loading device in the embodiment is intended to reduce the size or thickness, and in the arrangement of the series of gear trains, in consideration of this point, it is required to arrange in a minimum dimension as far as possible.

Figure 43:
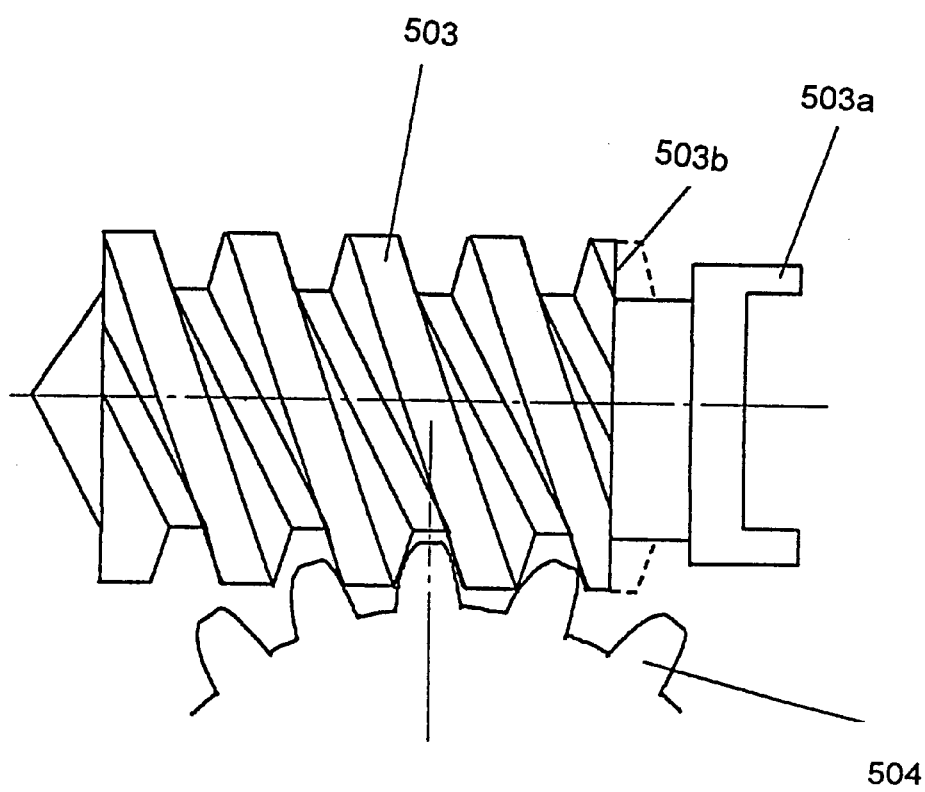
FIG. 43 is a partial side view for explaining the end shape of the worm gear when the meshing position of the worm gear and worm wheel of the device is set in the end gap of the worm gear, and meshing with the worm wheel at this time.

For this purpose, however, as assumed in FIG. 43, if the meshing position of the worm gear 503 and worm wheel 504 is set at the end of the worm gear near the engaging pawl 503a, the worm gear end portion is shaped like the end 503b in FIG. 43, and it is different from the desired tooth surface of the worm gear, and it is shaped as being cut off vertically to the axis at this position. In this case, if meshed at the position of the end portion 503b, there is a portion not meshed with the gear normally as intended, and it is hard to transmit the drive force smoothly, and the drive load may increase.

Figure 44:
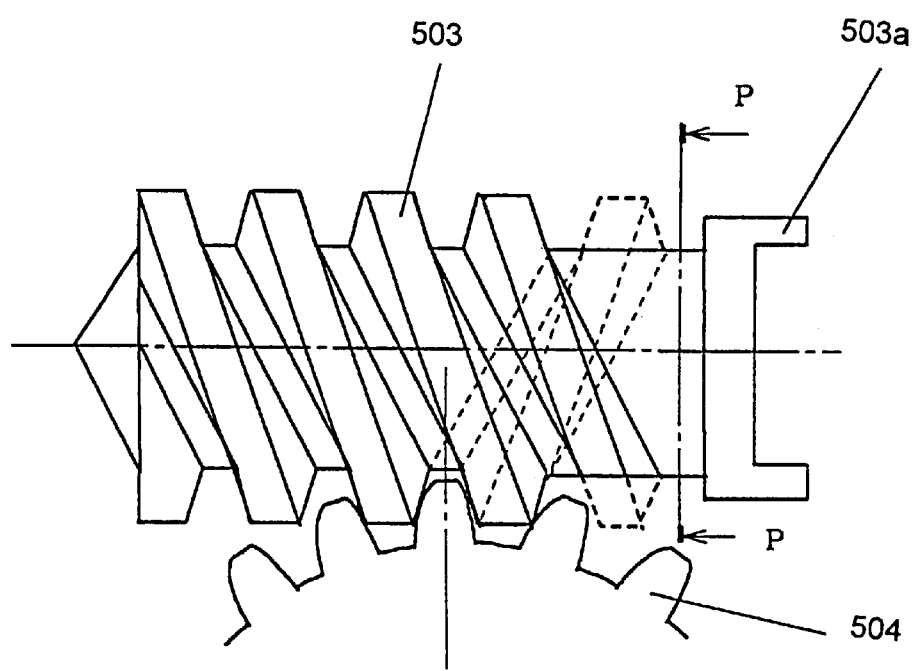
FIG. 44 is a partial side view showing the end shape of the worm gear of the device and the meshing state with the worm wheel at this time.
Figure 45:
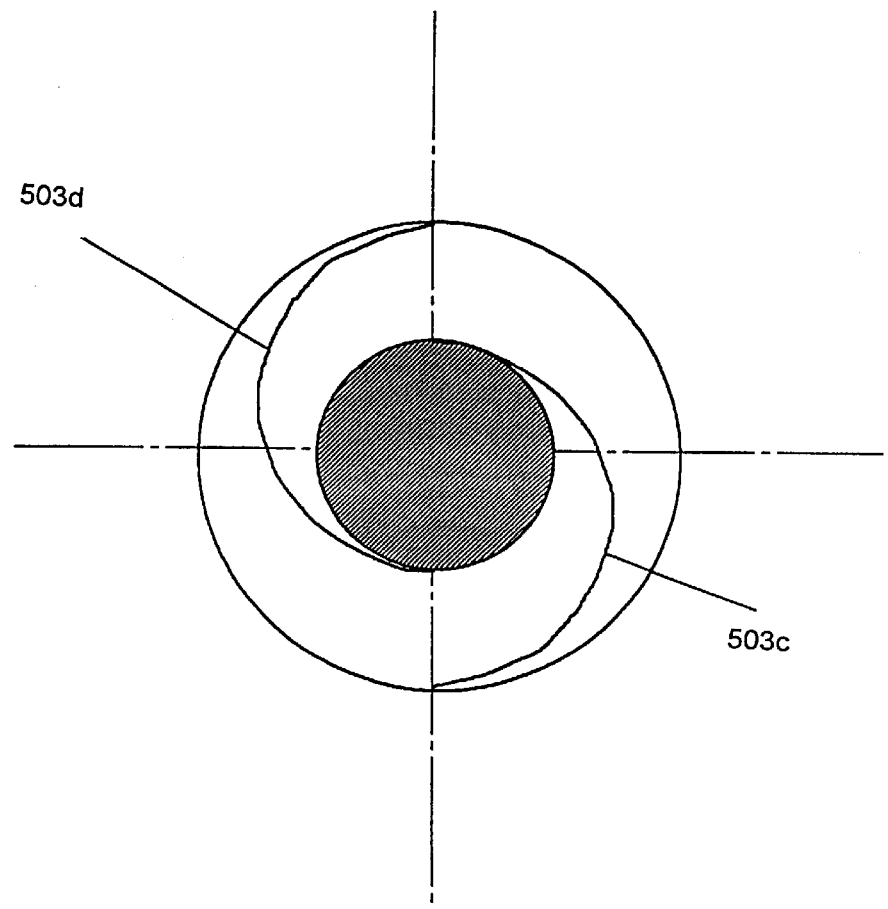
FIG. 45 is a partial sectional view of the tooth tip state of the root portion of the worm gear showing section P—P in FIG. 44.

In the embodiment of the invention, as shown in FIG. 44, the worm gear end portion is not cut off vertically to the axis, but, as shown in FIG. 45, two bars of tooth tip are shaped like 503c, 503d, and the tooth tip is gradually converged from the portion near the end. In this case, the converging shape is the tooth tip only, and the worm gear tooth surface is same as the normal tooth profile. Accordingly, when the worm wheel 504 is engaged with the worm gear 503, they are not meshed at other than the specified tooth surface, and normal gear meshing is not sacrificed. Therefore, smooth transmission of drive force is not impeded, and the drive load is not increased.

In the embodiment, the same effects are obtained if the meshing relation of the lower teeth 506b of the drive gear 506 and the rack 515 is reverse, that is, instead of discharging when the drive gear 506 is driven in the direction of Rk1 and inserting when driven in the direction of Rk2, if it is designed to insert when the drive gear 506 is driven in the direction of Rk1 and discharge if driven in the direction of Rk2.

In the embodiment, the loading motor 502 and drive gear train are assembled in the disk tray unit U51, but the invention is not limited to this, but the same effect is obtained when they are assembled in the main body unit U52.

(Embodiment 8)

Other mode of discharge of the disk tray unit U51 in power off state in embodiment 7 is explained in FIG. 34 and FIG. 46 to FIG. 48. The parts not shown in these drawings are same as in embodiment 7.

Figure 46:
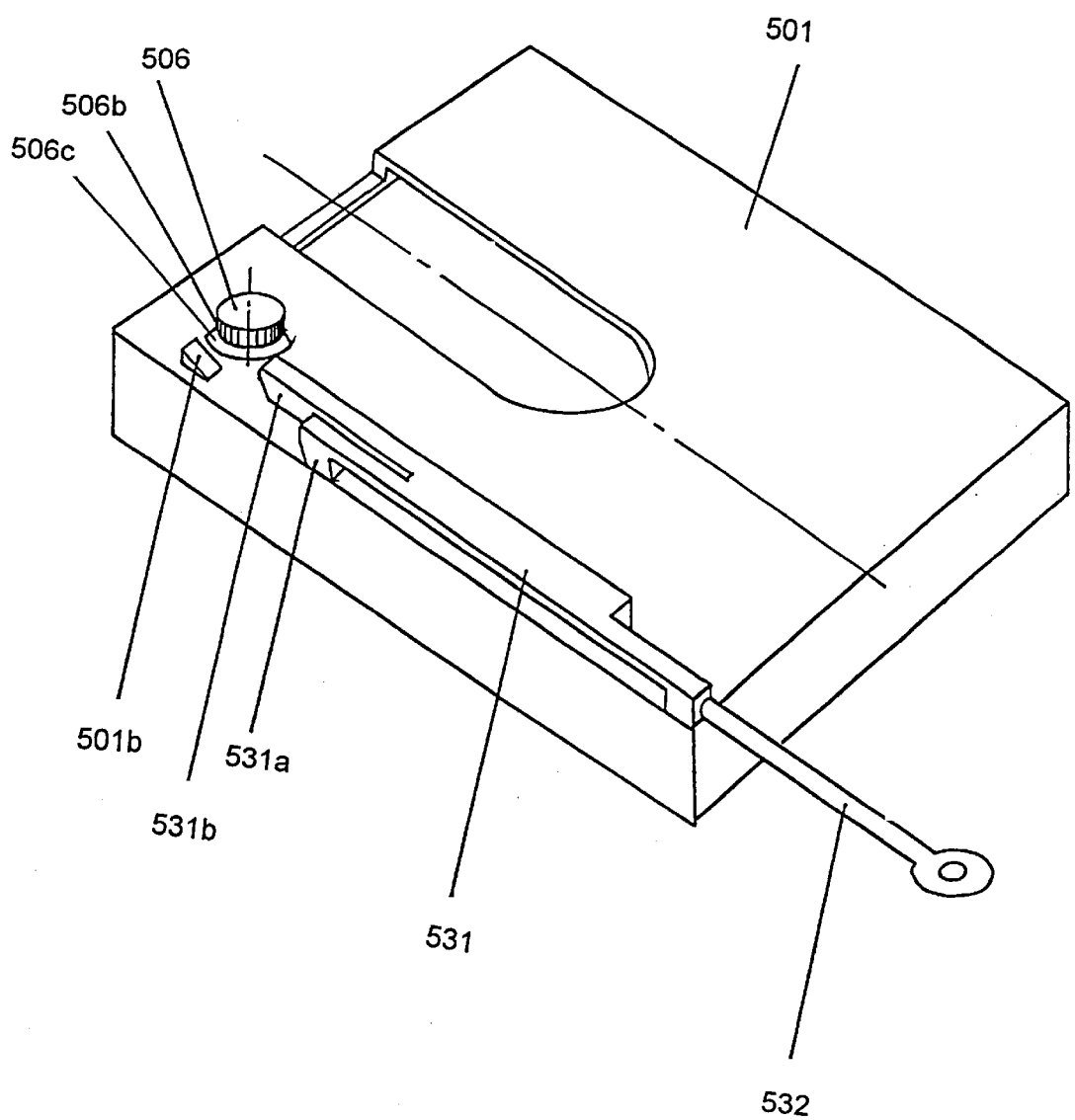
FIG. 46 is a perspective view of the back side of the disk tray showing the discharge lever in power off state in other embodiment of the device.
Figure 47:
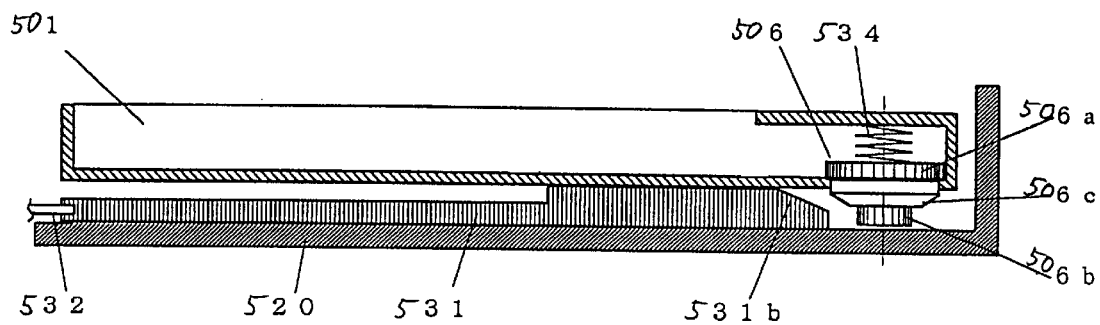
FIG. 47 and FIG. 48 are schematic views showing the operation of releasing the drive gear from the rack and discharging when discharging the disk tray by the discharge lever.
Figure 48:
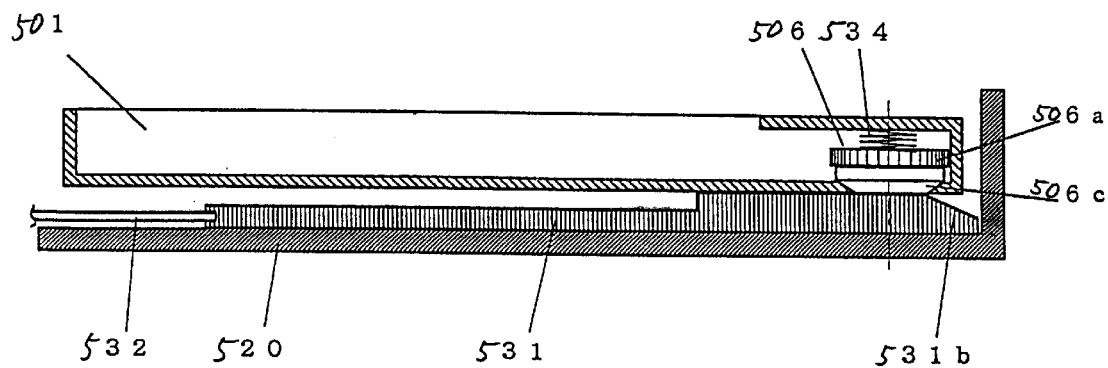
Figure 49:
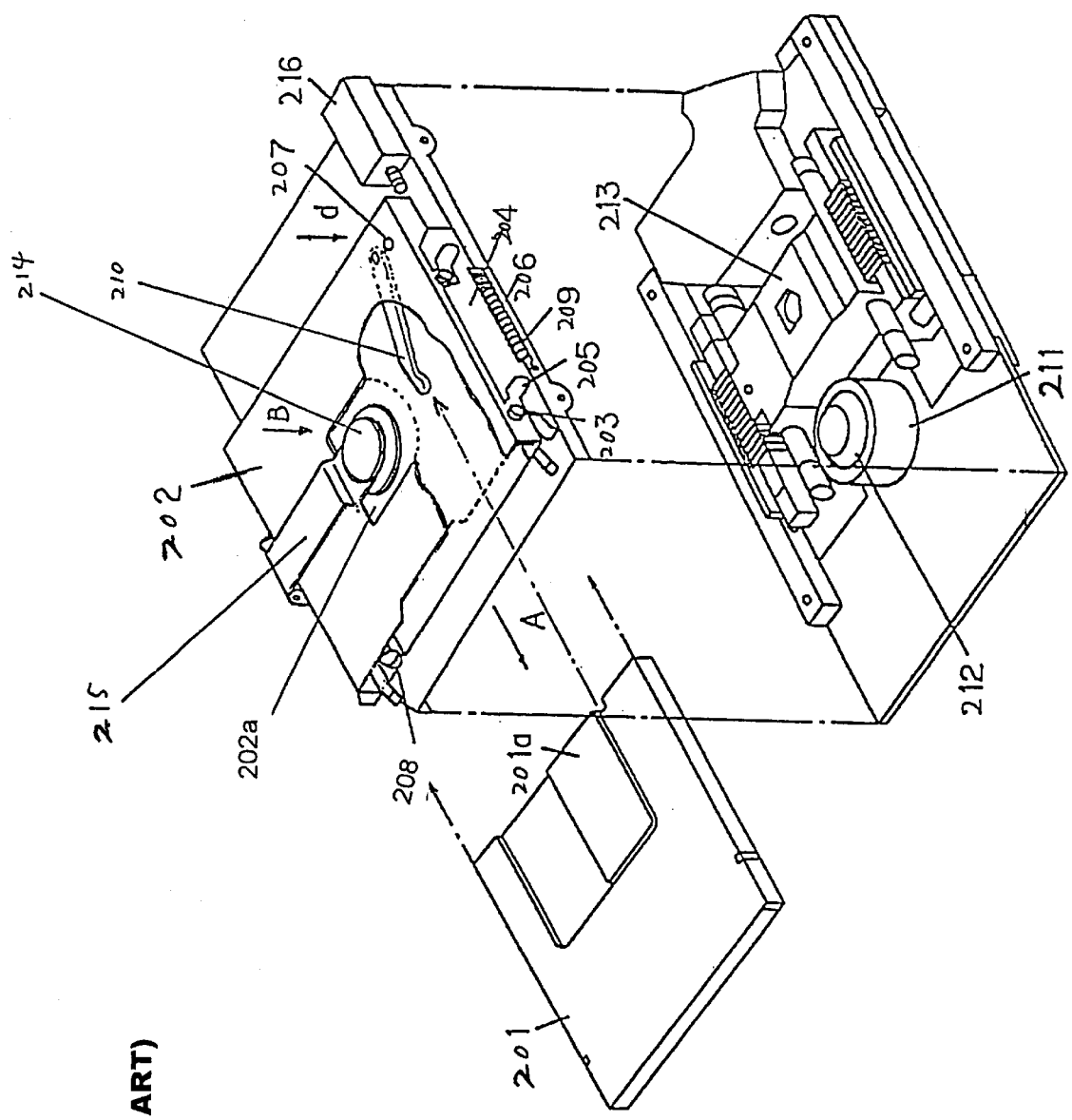
FIG. 49 is a partially cut-away perspective exploded view of an essential mechanism of a disk loading device in prior art 1, FIGS. 50(*a*) and (*b*) are side views of the same essential mechanism.
Figure 50:
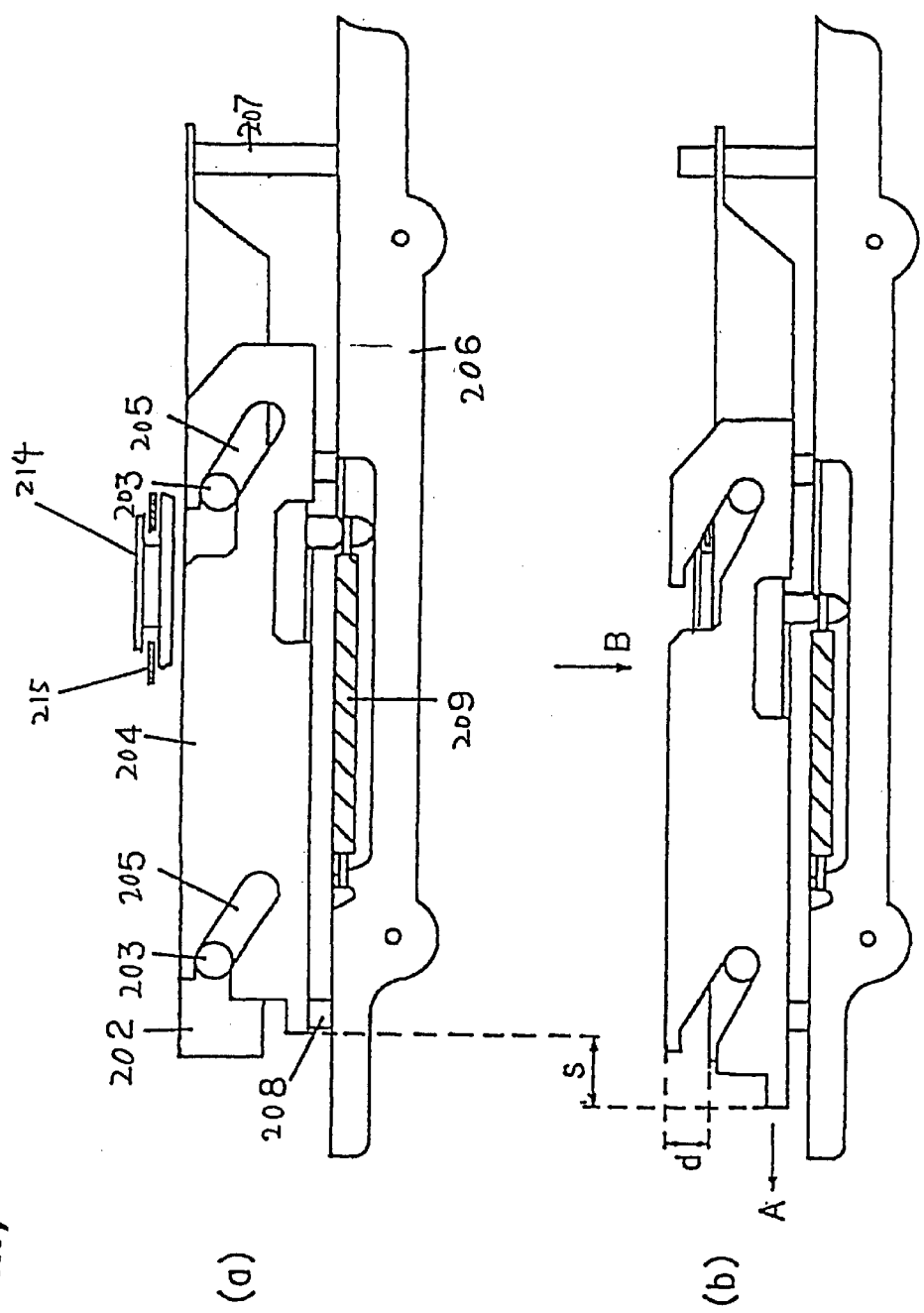
Figure 51:
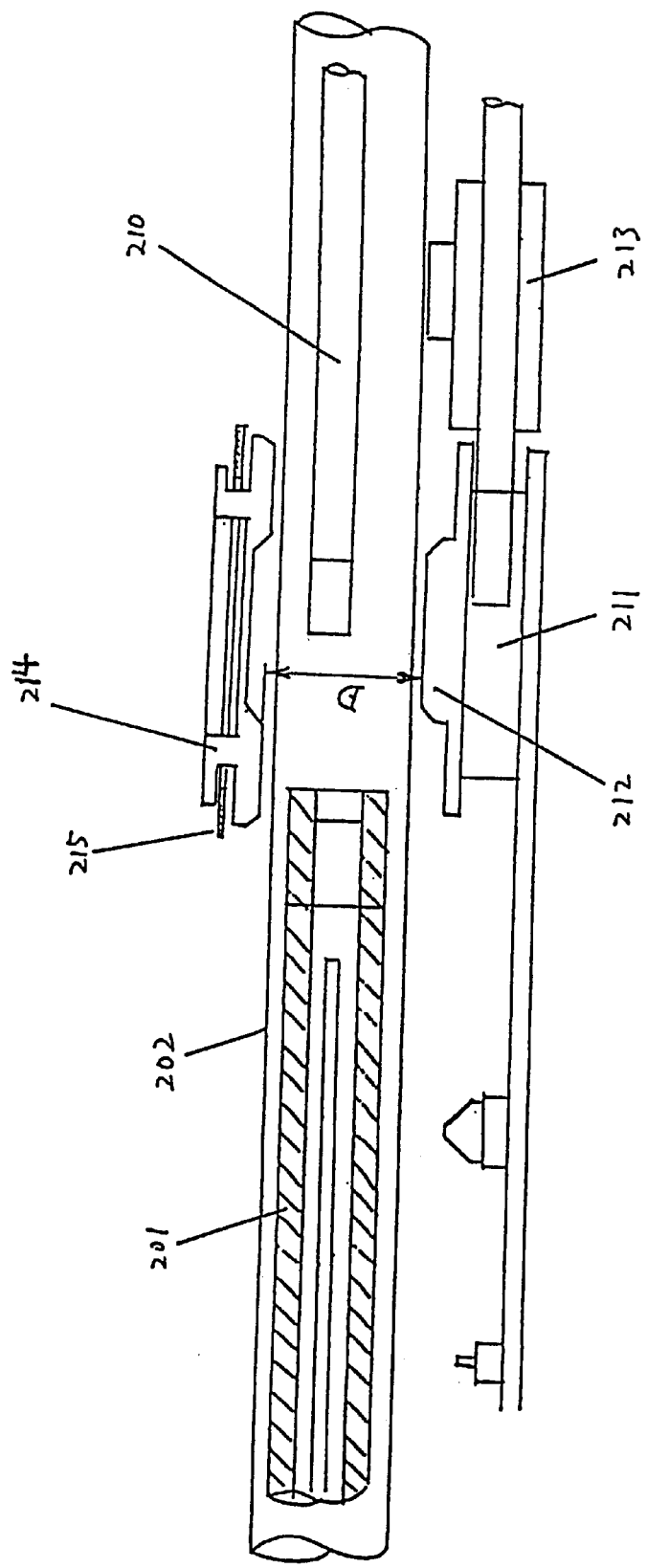
FIG. 51 is a schematic view showing a dimensional relation in the thickness direction of the essential mechanism.
Figure 52:
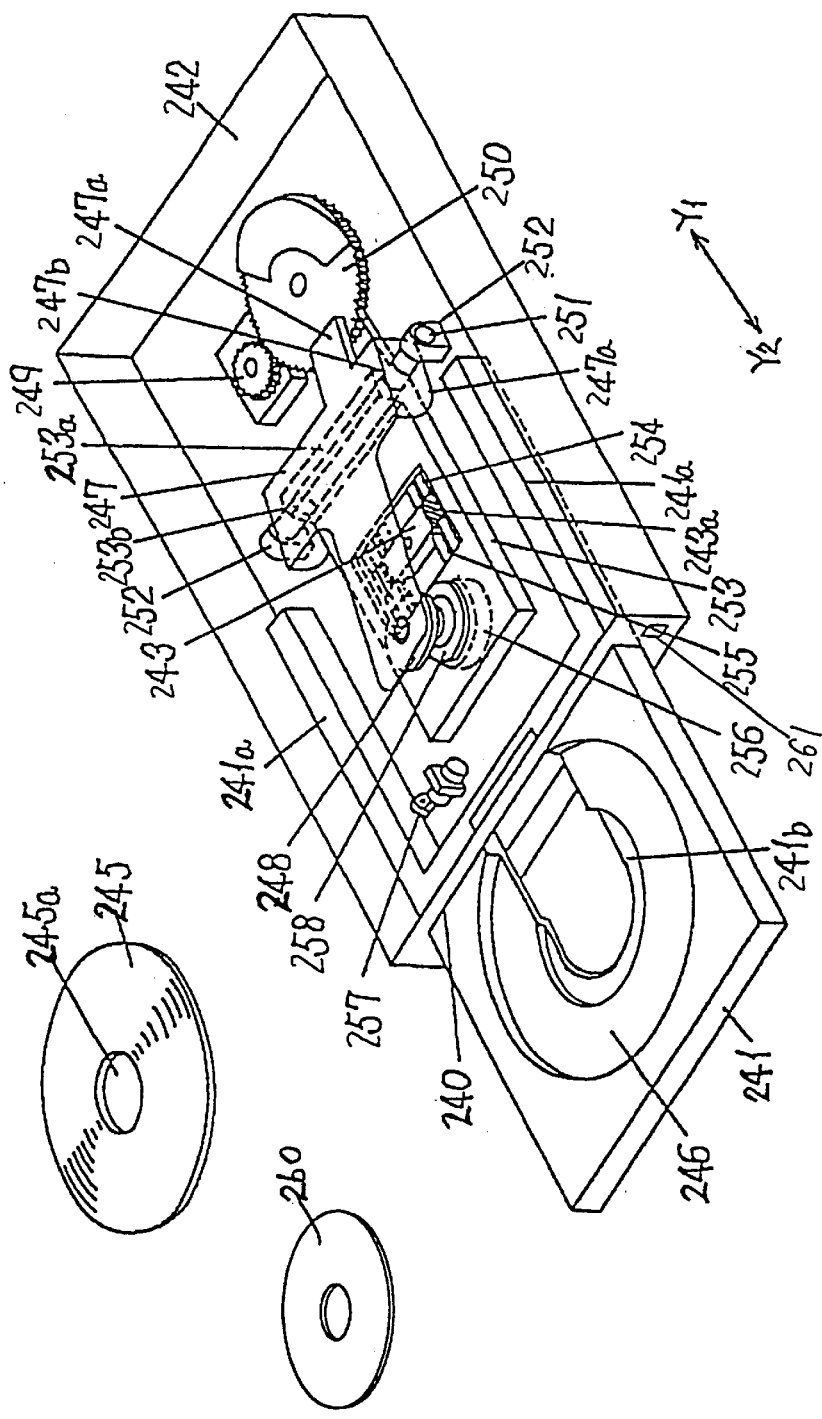
FIG. 52 is a see-through perspective view of a disk loading device in prior art 2, and FIG. 53(*a*), (*b*), and (*c*) are sectional side view of the same device.
Figure 53:
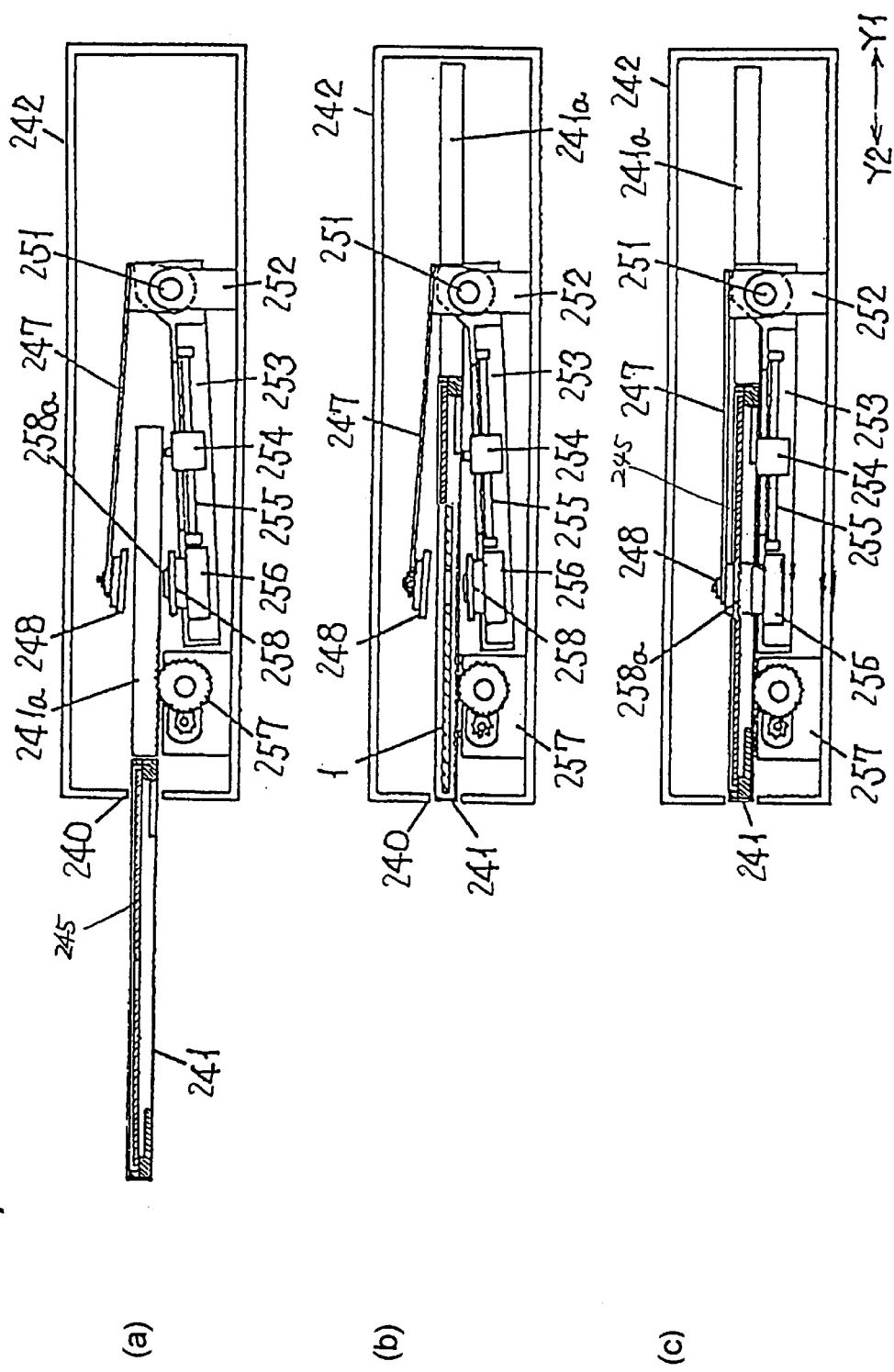

In FIG. 46 to FIG. 48, the disk tray 501 includes a drive gear thrusting spring 534 for thrusting the drive gear 506 in the axial direction, a taper portion 506c of the drive gear 506, and a gradient 531b for lifting this taper portion when the power off mode discharge lever 531 is pushed in.

Same as in the foregoing embodiment 7, when the disk loading device is in power off state, the user pushes in the power off mode discharge lever 531 by using the power off mode discharge pin 532 to compress the power off mode discharge spring 533. At this time, the taper portion 506c is pushed into the inner side of the disk tray unit U51 while compressing the drive gear thrusting spring 534 by the gradient 531b, and meshing of the upper teeth 506a of the drive gear 506 and middle idler gear 505, and lower teeth 506b and rack 515 is cleared. Near the end of this stroke, the lever pawl 531a and tray pawl 501b are engaged with each other. As a result, the disk tray unit U51 receives a force in the discharge direction and is discharged by the spring force of the power off mode discharge spring 533 regardless of the drive system.

According to this embodiment, whether the drive load is increased or not due to breakage of gear or abnormality in the drive system, the disk tray unit U51 can be discharged in power off state.

Similarly, the drive gear 506 can be moved in the plane direction at the position orthogonal to the rotary shaft of the drive gear 506 by manipulation of the power off mode discharge lever 531, and nearly the same effects if the meshing of the upper teeth 506a and the middle idler gear 505 or rack 515 is cleared, and the drive gear 506 is thrust by the drive gear thrusting spring in the direction of meshing of the drive gear 506 with the upper teeth 506a, or with the middle idler gear 505.

In the foregoing embodiments, the format of the media is not limited to the disk alone, or the cartridge type containing a disk by an outer shell, or the like. Also, the diameter of the disk is not particularly specified. Methods of recording and reading (reproducing) mainly include phase change method, magneto-optical method, other optical recording method, and magnetic recording method, but the invention is not intended to specify the recording and reading methods particularly.

As clear from the description of the foregoing embodiments, the disk loading device of the invention comprises a holder for holding a cartridge or a bare disk, shutter opening means of cartridge and its position detecting means, and holding means of bare disk and its posture detecting means, all provided in the holder, and therefore, immediately after being contained in the holder, it is possible to judge whether it is cartridge or bare disk and detect whether the media is installed normally or not, by these two detecting means.

Further comprising the transfer means for moving the holder in and out through an opening at the front side of the device and rotary driving means of the recordable disk, the device can judge the type, whether cartridge or bare disk, immediately after being held in the holder, and detects whether the media is installed normally or not, and therefore the action specification of the transfer means or rotary driving means can be changed depending on the result of detection.

For example, immediately after putting the media in the holder, the lens of the optical head can be changed over, or the starting procedure can be changed over, so that the loading time can be shortened. It is also possible to detect abnormality, and by prohibiting driving of the motor, breakage of the device can be prevented.

By adding display means such as LED or liquid crystal panel for displaying the type or state of the media installed in the holder to the device, it is possible to judge whether the type is cartridge or bare disk, and display whether the media is installed correctly or not, immediately after being installed in the holder.

Similarly adding output means for displaying the type or state of the media installed in the holder in an external display device such as monitor or TV to the device, it is possible to judge whether the type is cartridge or bare disk, and display whether the media is installed correctly or not in the external display device, immediately after being installed in the holder.

When the cartridge is inserted in the holder, the shutter of the cartridge is opened by the shutter opening means provided in the holder. By installing defining means for arresting mounting in other than specified direction of cartridge in the opening of the cartridge appearing when the cartridge is installed in the holder in specified direction, in the disk loading device handling cartridges of plural different shapes, insertion of cartridge in wrong direction or wrong side can be prevented.

Further, comprising a holder for holding a cartridge or a bare disk, transfer means for moving the holder in or out of the device through an opening at the front side of the disk loading device, a device shutter provided in the opening, and a stopper as limiting means for abutting against the device shutter in collaboration with the transfer means, when the holder is put in the disk loading device, the stopper and the protrusion provided in the device shutter are at confronting positions while maintaining a specified gap, and when the holder is discharged from the disk loading device, the stopper and the protrusion of the device shutter depart from each other, and therefore when inserting or discharging the holder, the action of the device shutter is not disturbed, or when intentionally opening the device shutter after the holder is put in the disk loading device, the stopper and the protrusion of the device shutter abut against each other, so that the opening action of the device shutter can be limited.

Moreover, comprising a holder for holding a cartridge or a bare disk, transfer means for moving the holder in or out of the device through an opening at the front side of the disk loading device, a device shutter provided in the opening, and a stopper as limiting means for abutting against the device shutter in collaboration with the transfer means, when the holder is put in the disk loading device, the stopper and the protrusion provided in the device shutter are at confronting positions while maintaining a specified gap, and when the holder is discharged from the disk loading device, the stopper and the protrusion of the device shutter depart from each other, and moreover when the closing action of the device shutter is blocked in the midst of entry of the holder into the disk loading device, the protrusion of the device shutter is positioned on the track of the stopper in holder entry process, and therefore when inserting or discharging the holder, the action of the device shutter is not disturbed, or when intentionally blocking the closing action of the device shutter in the midst of storing the holder in the disk loading device, the stopper and the protrusion of the device shutter abut against each other, so that the loading action of the holder by the transfer means is arrested, and the action of the transfer means may be stopped or inverted by the state detecting means such as microcomputer.

Also, when composing the device shutter and the stopper through an elastic member such as vibration absorbing rubber, the abutting distance between the device shutter and the limiting means is provided with a variation portion of the posture due to the elastic element, and therefore it is secure to limit the opening action of the device shutter, or stop or invert the transfer means.

In the cartridge, by forming a gap near the opening of the cartridge where the cartridge and shutter abut against each other when the shutter of the cartridge opens, it is possible to avoid collision between the inside of the cartridge opening and the disk stored in the cartridge due to deflection of the shutter.

In the disk loading device of the invention, comprising a holder for holding a cartridge or a bare disk, shutter opening means of the cartridge, its position detecting means, holding means for holding the bare disk, and its posture detecting means, all being disposed in the holder, immediately after being put in the holder, the two detecting means judge whether it is a cartridge or a bare disk, and detects whether the media is installed correctly or not, thereby changing the drive specification of the transfer means, so that the arresting force of the holder is optimized depending on the media.

As a result, for example, by designing the drive mechanism extremely lightly, and decreasing the holder operating force when pushing in the holder or holder discharge force when forcing out the media in power off state, by increasing the holder arresting force only when the media is not put in the holder, it is possible to hold the holder firmly in the disk loading device, and the loading mechanism of excellent controllability is realized.

In the same device, by changing the arresting force of the holder by the transfer means when media is not mounted and when media is mounted completely, the sense of stability when mounting the media on the holder is increased, and it feels light when manipulating the holder after mounting of media.

When, preferably, a mechanical restraining mechanism is used in the arresting mechanism of the transfer means, the certainty and reliability when arresting the holder may be enhanced.

Also by using an electromagnetic restraining mechanism by shorting both ends of the drive motor as the arresting mechanism of the transfer means, the holder can be arrested securely without increasing the cost.

By making use of the electromagnetic induction of the drive motor, a large arresting force can be obtained when the holder is moved quickly, and a small arresting force when moved slowly, so that the quality of holder operation can be enhanced.

Still more, comprising a holder for holding media, transfer means for transferring the holder, and a casing holding the disk rotating means of media, and having an opening for moving in and out and containing the holder by the transfer means, a ventilation hole is provided in the top lid at the opening side of the casing, and this casing is assembled into the main body of a personal computer, so that dust and smoke entering from the opening can be discharged out of the casing through the ventilation hole, by making use of an air stream of the fan incorporated in the personal computer, stronger than the air stream caused by pressure difference between inside and outside of the casing by rotation of the disk, and therefore time-course contamination of the recording side of the disk and lens can be prevented.

Also comprising a holder for holding media, transfer means for transferring the holder, disk rotating means for rotating the media, a casing having a opening for containing the holder, and a dust-proof member disposed between the opening and the disk rotating means, by rotating the disk by the rotating means, the pressure becomes negative in the disk loading device, so as to suck dust and smoke toward the center of the motor, and therefore contamination of the recording and reproducing side of the disk and the lens in the time course can be prevented by the dust-proof member disposed in this passage.

An elastic material is used in the dust-proof member, and therefore contamination of the recording and reproducing side of the disk and the lens in the time course can be prevented without impeding the action of the transfer means.

A material of low gas permeability is used as the dust-proof member, so that the passage of dust or smoke into the recording and reproducing side of the disk and the lens can be shut off.

When a filter used as the dust-proof member, entry of dust or smoke into the recording and reproducing side of the disk and the lens can be shut off.

According to the constitution of the invention, the motor rotary shaft of the loading motor does not receive the axial force at the projecting side from the casing, which prevents breakage of the stop ring in the loading motor, or, if not broken, increase of driving load due to collision between the stop ring and casing.

In the case of trouble of the loading motor or the like, if a large toque is needed for driving the motor rotary shaft from outside, the disk tray can be discharged smoothly in power off state.

For reduction of size and thickness of the disk loading device, if the space efficiency is enhanced by disposing the meshing position of the worm gear and worm wheel near the terminal end of the teeth at the root of the worm gear, when the worm wheel is meshed with the worm gear, they are not meshed on other than the specified tooth surface, and failure of normal gearing is avoided. Therefore, without blocking smooth transmission of drive force, increase of driving load can be prevented.

Even if the driving load is increased due to abnormality in the driving system, such as breakage of the gear, the disk tray can be discharged in power off state.

What is claimed is:

1. A disk loading device for handling recordable media, said disk loading device comprising:

a holder for holding a cartridge containing a recordable disk;

shutter opening means for opening a shutter of the cartridge;

position detecting means for detecting the position of said shutter opening means;

holding means for holding a bare disk inside of said holder; and posture detecting means for detecting the posture of said holding means, wherein the state of the cartridge or the bare disc contained in said holder can be detected by said position detecting means and said posture detecting means, and wherein said disk loading device is adapted for use in both a horizontal position and a vertical position.

2. A disk loading device as claimed in claim 1, further comprising:

transfer means for moving said holder in and out of a front side opening of said holder; and rotary driving means for the recordable media, wherein the action of said transfer means or said rotary driving means is dependent upon whether the cartridge or the bare disk is positioned in said holder.

3. A disk loading device as claimed in claim 1, further comprising display means for indicating whether the cartridge or the bare disk is positioned in said holder, and indicating the state of the cartridge or the bare disk.

4. A disk loading device as claimed in claim 1, further comprising output means for outputting the type and state of the recordable media contained in said holder.

5. A disk loading device as claimed in claim 1, wherein said holding means comprises:

a first disk holding member movably mounted on a first side of said holder, said first disk holding member defining a slit for receiving a circumferential edge portion of the bare disc;

a first plate spring disposed between an inner peripheral surface of said holder and said first disk holding member;

a first inlet lever pivotally supported in said holder and connected to said first disk holding member;

a second disk holding member movably mounted on a second side of said holder, said second disk holding member defining a slit for receiving a circumferential edge portion of the bare disc;

a second plate spring disposed between another inner peripheral surface of said holder and said second disk holding member; and a second inlet lever pivotally supported in said holder and connected to said second disk holding member.

6. A disk loading device for handling recordable media including a bare disk and a cartridge containing a disk, said disk loading device comprising:

a holder including a holder case and a holder cover mounted on said holder case to define a space for receiving a bare disk or a cartridge, said holder including an inlet at a first end thereof;

a shutter opener pivotally mounted in said holder for opening a shutter of the cartridge upon insertion thereof in said holder;

a position detecting device for detecting a position of said shutter opener;

a first disk holding member movably mounted along a first side of said holder, said first disk holding member defining a slit for receiving a circumferential edge portion of the bare disc upon insertion thereof in said holder;

a first plate spring disposed between an inner peripheral surface of said holder and said first disk holding member;

a first inlet lever pivotally supported in said holder adjacent said holder inlet, said first inlet lever being connected to said first disk holding member;

a second disk holding member movably mounted along a second side of said holder, said second disk holding member defining a slit for receiving the circumferential edge portion of the bare disc;

a second plate spring disposed between another inner peripheral surface of said holder and said second disk holding member;

a second inlet lever pivotally supported in said holder adjacent said holder inlet, said second inlet lever being connected to said second disk holding member; and a position detector for detecting a position of at least one of said first and second disk holding members.

7. A disk loading device as claimed in claim 6, further comprising:

a base unit including rotary driving means for selectively driving the recordable media held in said holder; and a transfer mechanism for moving said holder relative to said base unit.

8. A disk loading device as claimed in claim 6, further comprising a display for indicating whether the cartridge or the bare disk is positioned in said holder, and indicating the state of the cartridge or the bare disk.

9. A disk loading device as claimed in claim 6, further comprising output means for outputting the type and state of the recordable media held in said holder.

10. A disk loading device as claimed in claim 6, wherein said position detecting device includes a switch, and said shutter opener includes a protrusion that engages said switch at a specific angular orientation of said shutter opener.

11. A disk loading device as claimed in claim 6, further comprising a linkage plate that is rotatable in response to rotational movement of one of said inlet levers, wherein said linkage plate operates said position detector upon rotational movement of said one inlet lever.

* * * * *